(12) United States Patent
Tanizawa et al.

(10) Patent No.: US 7,266,286 B2
(45) Date of Patent: Sep. 4, 2007

(54) EDITING SYSTEM AND METHOD AND DISTRIBUTION MEDIUM

(75) Inventors: Seiji Tanizawa, Kanagawa (JP); Satoru Tobita, Kanagawa (JP); Hideaki Miyauchi, Tokyo (JP); Kazushi Sato, Kanagawa (JP); Keiji Hirai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1079 days.

(21) Appl. No.: 09/992,101

(22) Filed: Nov. 14, 2001

(65) Prior Publication Data

US 2002/0031334 A1    Mar. 14, 2002

Related U.S. Application Data

(63) Continuation of application No. 09/285,339, filed on Apr. 2, 1999, now Pat. No. 6,356,701.

(30) Foreign Application Priority Data

Apr. 6, 1998  (JP) ................................ 10-093632

(51) Int. Cl.
*H04N 5/93* (2006.01)
(52) U.S. Cl. ..................... 386/52; 386/96; 348/462; 704/278

(58) Field of Classification Search .................. 386/4, 386/39, 52, 54, 96, 98, 99, 102; 348/515, 348/462, 500; 704/267, 278, 260
See application file for complete search history.

(56) References Cited

U.S. PATENT DOCUMENTS

| 4,612,569 | A | | 9/1986 | Ichinose |
| 5,386,493 | A | * | 1/1995 | Degen et al. ............... 704/267 |
| 5,548,346 | A | | 8/1996 | Mimura et al. |
| 5,761,537 | A | * | 6/1998 | Sturges et al. ............. 348/500 |
| 5,805,761 | A | * | 9/1998 | Ikeda ........................ 386/54 |
| 6,356,701 | B1 | * | 3/2002 | Tanizawa et al. ............. 386/52 |

* cited by examiner

*Primary Examiner*—Thai Q. Tran
*Assistant Examiner*—Christopher Onuaku
(74) *Attorney, Agent, or Firm*—Frommer Lawrence & Haug LLP; William S. Frommer; Thomas F. Presson

(57) ABSTRACT

Temporarily storing audio data to be reproduced in the block form, temporarily storing synthesized audio data in the block form, generating and supplying a reference signal, and calculating the first address of the block of audio data, the editing system of the present invention enables identifying the buffering position of the recording signal and then matching the position to the reproduced signal, resulting in quick editing.

3 Claims, 72 Drawing Sheets

FIG. 9

ZBR TABLE (NTSC)

| ZONE | CYLINDER ADDRESS | NUMBER OF SECTORS | |
|---|---|---|---|
| 1 | 0001-0500 | 567 | (OUTER CIRCUMFERENCE) |
| 2 | 0501-1000 | 544 | |
| 3 | 1001-1500 | 536 | |
| 4 | 1501-2000 | 518 | |
| 5 | 2001-2500 | 498 | |
| 6 | 2501-3000 | 480 | |
| 7 | 3001-3500 | 480 | |
| 8 | 3501-4000 | 462 | |
| 9 | 4001-4500 | 442 | |
| 10 | 4501-5000 | 424 | |
| 11 | 5001-5500 | 416 | |
| 12 | 5501-6000 | 393 | (INNER CIRCUMFERENCE) |

FIG. 10

ZBR TABLE (PAL)

| ZONE | CYLINDER ADDRESS | NUMBER OF SECTORS | |
|---|---|---|---|
| 1 | 0001-0500 | 561 | (OUTER CIRCUMFERENCE) |
| 2 | 0501-1000 | 534 | |
| 3 | 1001-1500 | 525 | |
| 4 | 1501-2000 | 501 | |
| 5 | 2001-2500 | 480 | |
| 6 | 2501-3000 | 459 | |
| 7 | 3001-3500 | 459 | |
| 8 | 3501-4000 | 445 | |
| 9 | 4001-4500 | 431 | |
| 10 | 4501-5000 | 415 | |
| 11 | 5001-5500 | 409 | |
| 12 | 5501-6000 | 391 | (INNER CIRCUMFERENCE) |

FIG. 13B

| LOGICAL SECTOR | CYLINDER | MEDIA | LOGICAL SECTOR |
|---|---|---|---|
| 0 | 0 | 0 | 0 |
| 1 | 0 | 0 | 1 |
| 2 | 0 | 0 | 2 |
| 3 | 0 | 0 | 3 |
| 4 | 0 | 0 | 4 |
| 5 | 0 | 0 | 5 |
| 6 | 0 | 0 | 6 |
| 7 | 0 | 0 | 7 |
| .... | .... | .... | .... |

| LOGICAL SECTOR | CYLINDER | MEDIA | LOGICAL SECTOR |
|---|---|---|---|
| $L_{ki}$ | $CYL_{ki}$ | $MED_{ki}$ | $SEC_{ki}$ |

FIG. 14

| DATA NO. | DISK ID | LOGICAL SECTOR | SIZE |
|---|---|---|---|
| p | $D_{kp}$ | $L_{kp}$ | $S_{kp}$ |
| k | $D_{k1}$ | $L_{k1}$ | $S_{k1}$ |
| | $D_{k2}$ | $L_{k2}$ | $S_{k2}$ |
| | : | : | : |
| | $D_{kn}$ | $L_{kn}$ | $S_{kn}$ |

| FRAME NO. | DISK ID | START LOGICAL SECTOR | SECTOR SIZE | |
|---|---|---|---|---|
| 1 | 1<br>2<br>3<br>4<br>5 | 0<br>599600<br>0<br>599600<br>0 | 567<br>393<br>567<br>393<br>567 | ← PARITY DATA (P1)<br>← FIRST SUBBLOCK DATA (S1-1)<br>← SECOND SUBBLOCK DATA (S1-2)<br>← THIRD SUBBLOCK DATA (S1-3)<br>← FOURTH SUBBLOCK DATA (S1-4) |
| 2 | 2<br>3<br>4<br>5<br>6 | 0<br>599600<br>0<br>599600<br>0 | 567<br>393<br>567<br>393<br>567 | ← PARITY DATA (P2)<br>← FIRST SUBBLOCK DATA (S2-1)<br>← SECOND SUBBLOCK DATA (S2-2)<br>← THIRD SUBBLOCK DATA (S2-3)<br>← FOURTH SUBBLOCK DATA (S2-4) |
| 3 | 3<br>4<br>5<br>6<br>1 | 600<br>599200<br>600<br>599200<br>600 | 567<br>393<br>567<br>393<br>567 | ← PARITY DATA (P3)<br>← FIRST SUBBLOCK DATA (S3-1)<br>← SECOND SUBBLOCK DATA (S3-2)<br>← THIRD SUBBLOCK DATA (S3-3)<br>← FOURTH SUBBLOCK DATA (S3-4) |
| 4 | 4<br>5<br>6<br>1<br>2 | 600<br>599200<br>600<br>599600<br>600 | 567<br>393<br>567<br>393<br>567 | ← PARITY DATA (P4)<br>← FIRST SUBBLOCK DATA (S4-1)<br>← SECOND SUBBLOCK (S4-2)<br>← THIRD SUBBLOCK DATA (S4-3)<br>← FOURTH SUBBLOCK DATA (S4-4) |
| ...... | ...... | ...... | ...... | |

304

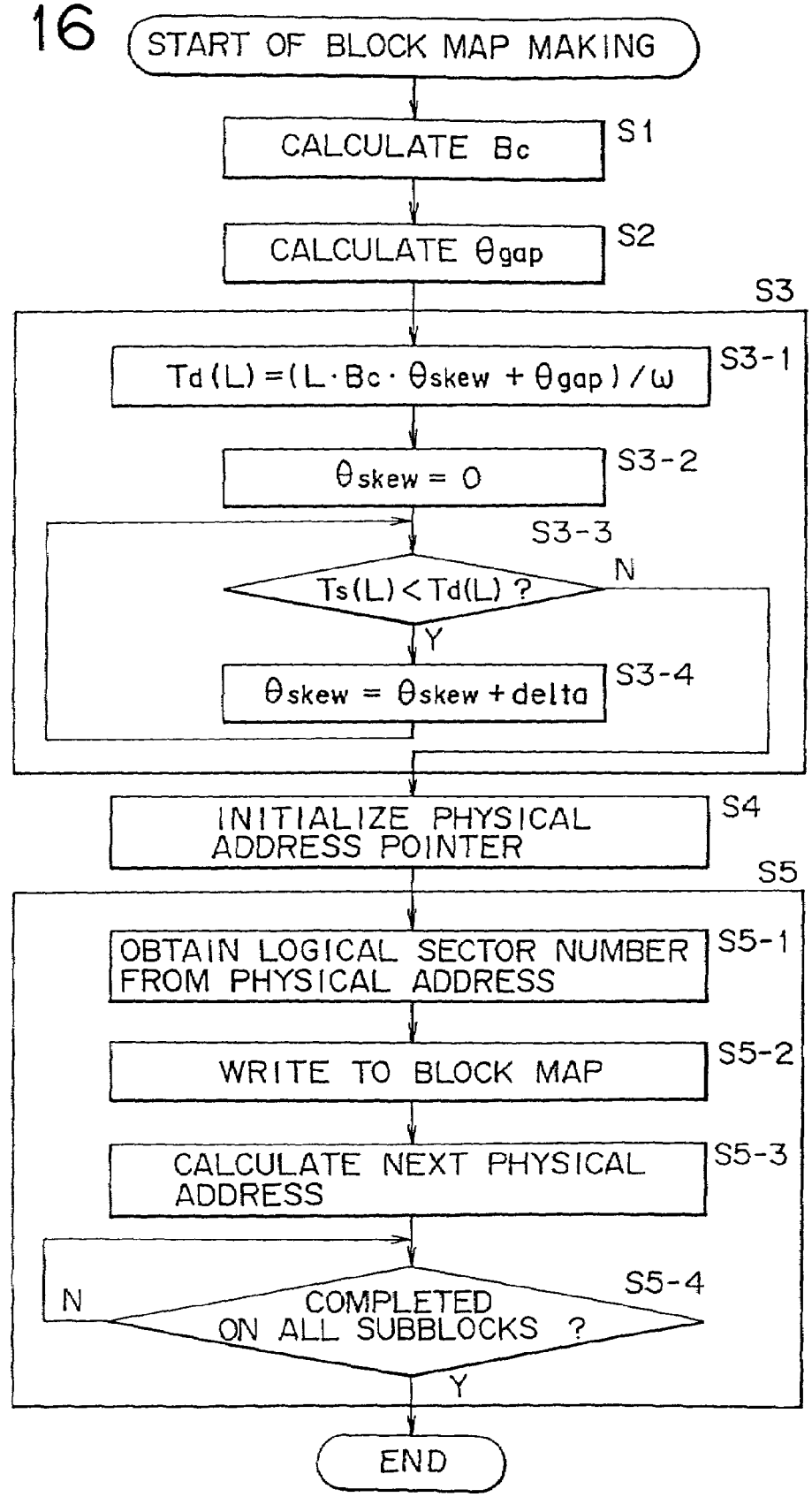

F I G. 23
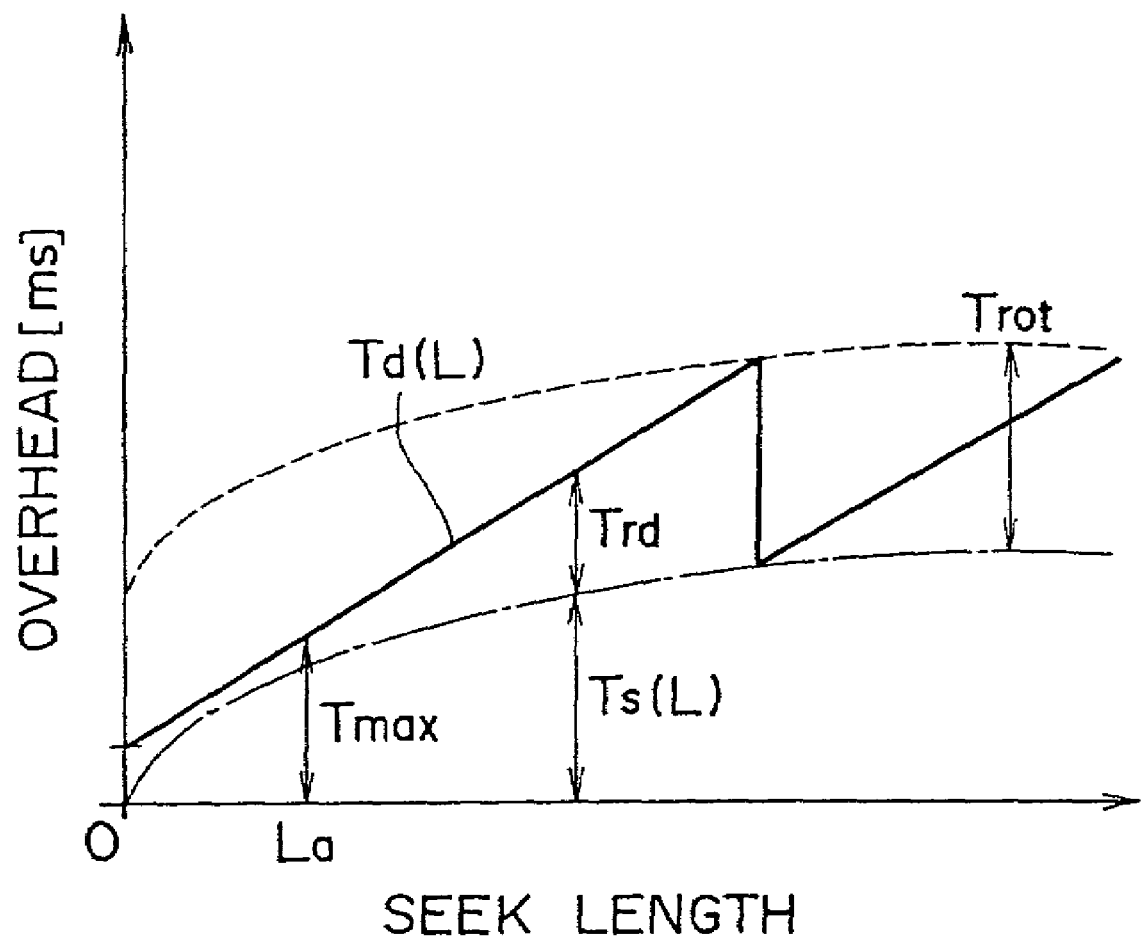

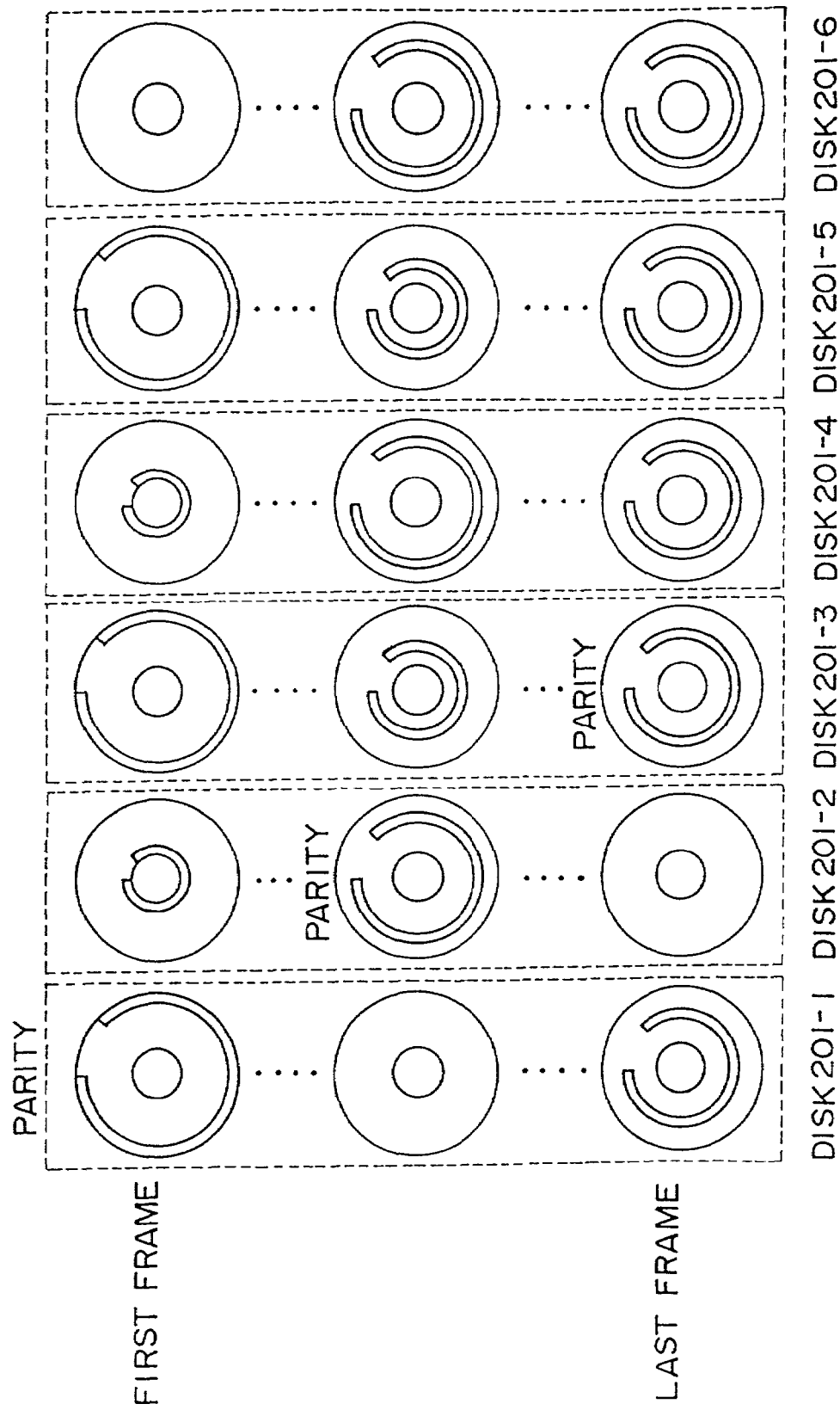

10 BITS ↔ 32 BITS CONVERSION

8 BITS ↔ 32 BITS CONVERSION

64 BITS (DMAC) ↔ 32 BITS

DMA COMMAND
(NO ERROR AT TIME
OF REPRODUCTION)

DMA COMMAND
(ERROR AT TIME OF
REPRODUCTION

F I G. 48

| DATA NUMBER (PACKET TRASFER BLOCK) | 0 | 1 | 2 | 3 | 4 | 5 | 6 | ... |
|---|---|---|---|---|---|---|---|---|
| SELECTOR 451 | A | A | A | A | A | A | A | |
| SELECTOR 455 | A | A^B | A^B | A^B | A | A^B | A^B | |
| INPUT DATA | 0 | 1 | 2 | 3 | 4 | 5 | 6 | |
| DELAY ELEMENT 403 | 0 | 0^1 | 0^1^2 | 0^1^2^3 | 4 | 4^5 | 4^5^6 | |
| PARITY DATA OUTPUT | 0 | 0^1 | 0^1^2 | 0^1^2^3 | 4 | 4^5 | 4^5^6 | |

PARITY TO BE FOUND

PARITY GENERATION

FIG. 49A

| DATA NUMBER (PACKET TRASFER BLOCK) | 0 | 1 | 2(P) | 3 |
|---|---|---|---|---|
| DELAY ELEMENT 401-1 | 1 | 1 | 1 | 0 |
| DELAY ELEMENT 401-2 | 1 | 1 | 0 | 1 |
| DELAY ELEMENT 401-3 | 1 | 0 | 1 | 2NG |
| DELAY ELEMENT 401-4 | 0 | 1 | 2NG | 3 |
| DELAY ELEMENT 402 | 0 | 0^1 | 0^1^P | 0^1^P^3=2 |
| DELAY ELEMENT 403 | 1 | 1 | 1 | 1 |
| SELECTOR 452 | A | A | A | A |
| SELECTOR 453 | A | A | A | A |
| SELECTOR 454 | A | A^B | A^B | A^B |
| SELECTOR 455 | B | B | B | B |
| OUTPUT | 1 | 1 | 1 | 1 |

DATA CORRECTION

FIG. 49

| FIG 49A | FIG. 49B |
|---|---|

FIG. 49B

| 4 | 5 | 6(P) | 7 | 8 | 9 | 10 |
|---|---|---|---|---|---|---|
| 1 | 2NG | 3 | 4 | 5 | 6NG | 7 |
| 2NG | 3 | 4 | 5 | 6NG | 7 | 8 |
| 3 | 4 | 5 | 6NG | 7 | 8 | 9 |
| 4 | 5 | 2 | 7 | 8 | 9 | 10 |
| 4 | 4^5 | 4^5^P | 4^5^P^7=6 | 8 | 8^9 | 8^9^10 |
| A | A | A | A | 6 | 6 | 6 |
| A | A | [B] | A | B | B | B |
| B | B | B | B | A | A | [B] |
| A | A^B | A^B | A^B | B | A^B | B |
| 0 | 1 | 2 (CORECTED) | 3 | 4 | 5 | 6 (CORECTED) |

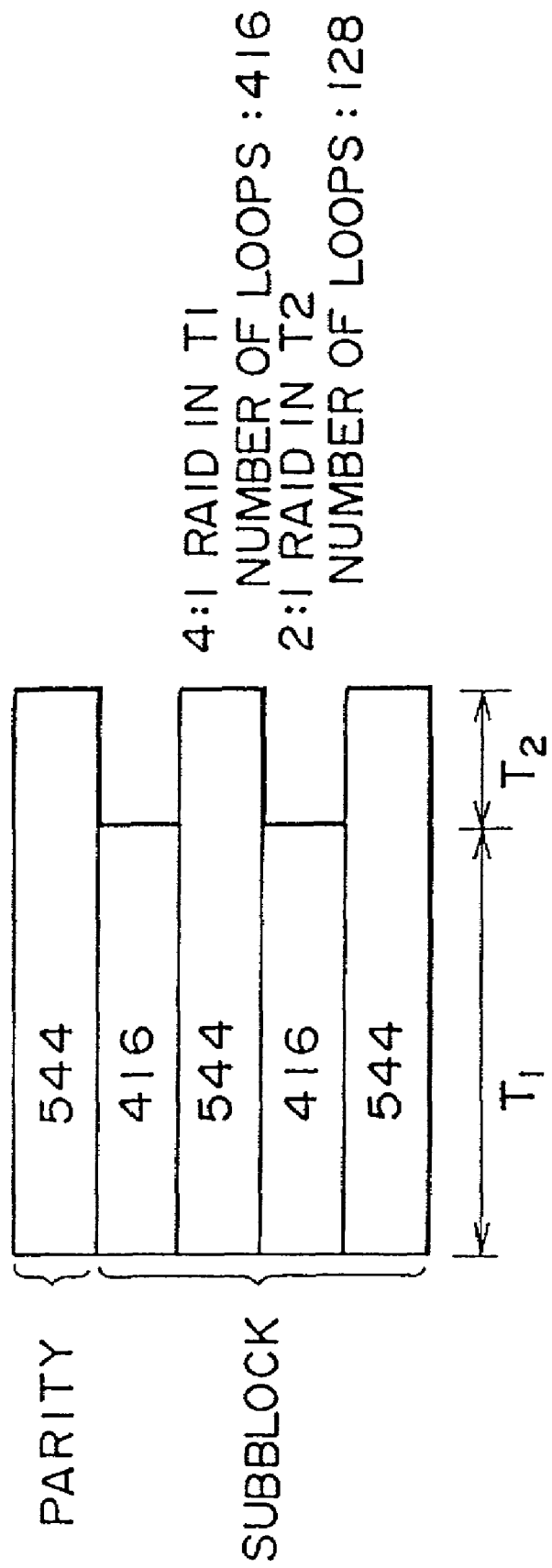

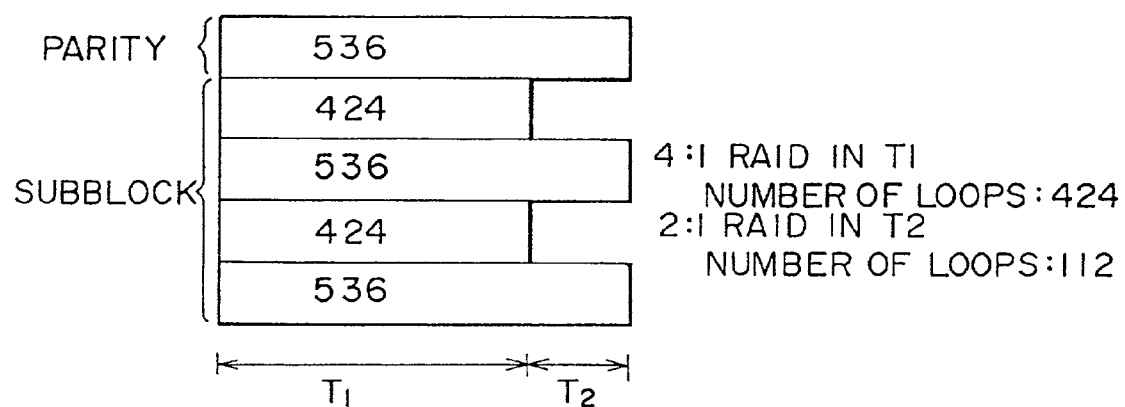
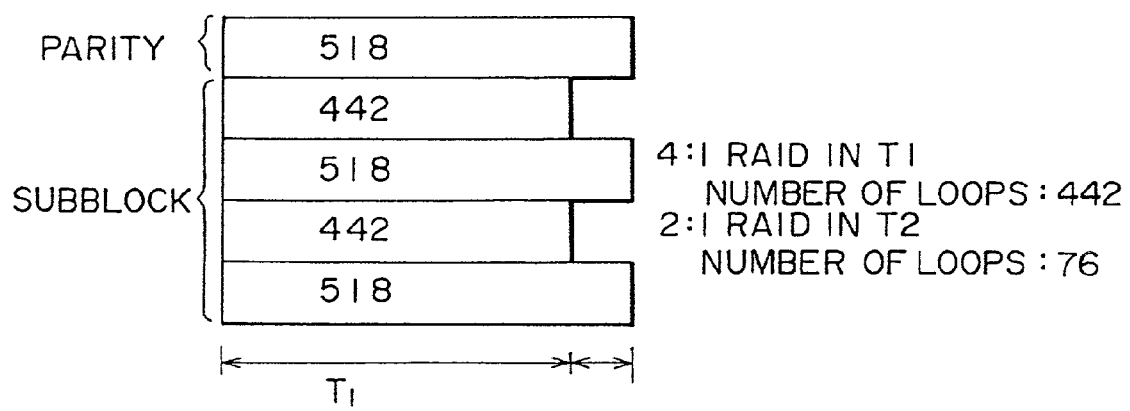

FIG. 62

| | FIG.62A |
|---|---|
| | FIG.62B |

FIG. 62A

| FRAME SIGNAL \ DISK ID | 1 | 2 | 3 |
|---|---|---|---|
| 1 | P1 (OUTER) | S1-1 (INNER) | S1-2 (OUTER) |
| 2 | | P2 (OUTER) | S2-1 (INNER) |
| 3 | S3-4 (OUTER) | | P3 (OUTER) |
| 4 | S4-3 (INNER) | S4-4 (OUTER) | |
| 5 | S5-2 (OUTER) | S5-3 (INNER) | S5-4 (OUTER) |
| 6 | S6-1 (INNER) | S6-2 (OUTER) | S6-3 (INNER) |
| 7 | P7 (OUTER) | S7-1 (INNER) | S7-2 (OUTER) |
| 8 | | P8 (OUTER) | S8-1 (INNER) |
| 9 | S9-4 (OUTER) | | P9 (OUTER) |
| 10 | S10-3 (OUTER) | S10-4 (OUTER) | |
| ... | ... | ... | ... |

FIG. 62B

| 4 | 5 | 6 |
|---|---|---|
| S1 3(INNER) | S1-4(OUTER) | S2-4(OUTER) |
| S2 2(OUTER) | S2-3(INNER) | S3-3(INNER) |
| S3 1(INNER) | S3-2(OUTER) | S4-2(OUTER) |
| P4 (OUTER) | S4-1(INNER) | S5-1(INNER) |
| | P5 (OUTER) | P6 (OUTER) |
| S6 4(OUTER) | S7-4(OUTER) | |
| S7 3(INNER) | S8-3(INNER) | S8-4(OUTER) |
| S8 2(OUTER) | S9-2(OUTER) | S9-3(INNER) |
| S9 1(INNER) | S10-1 | S10-2(OUTER) |
| P10 (OUTER) | ... | ... |

FIG.63
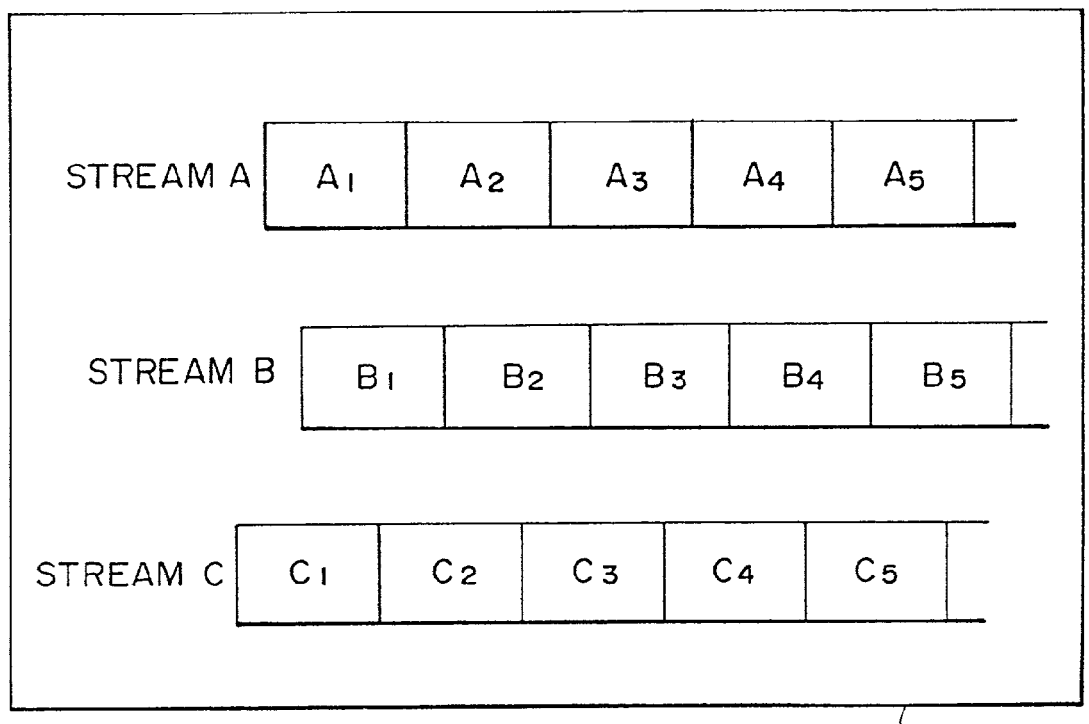
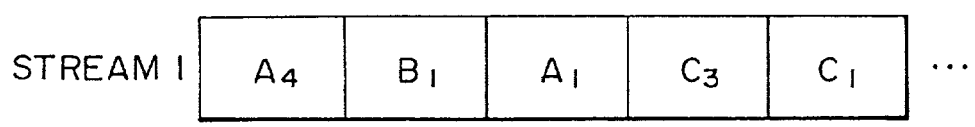
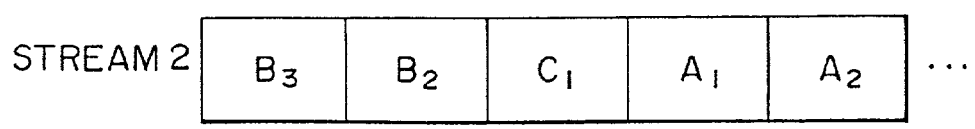

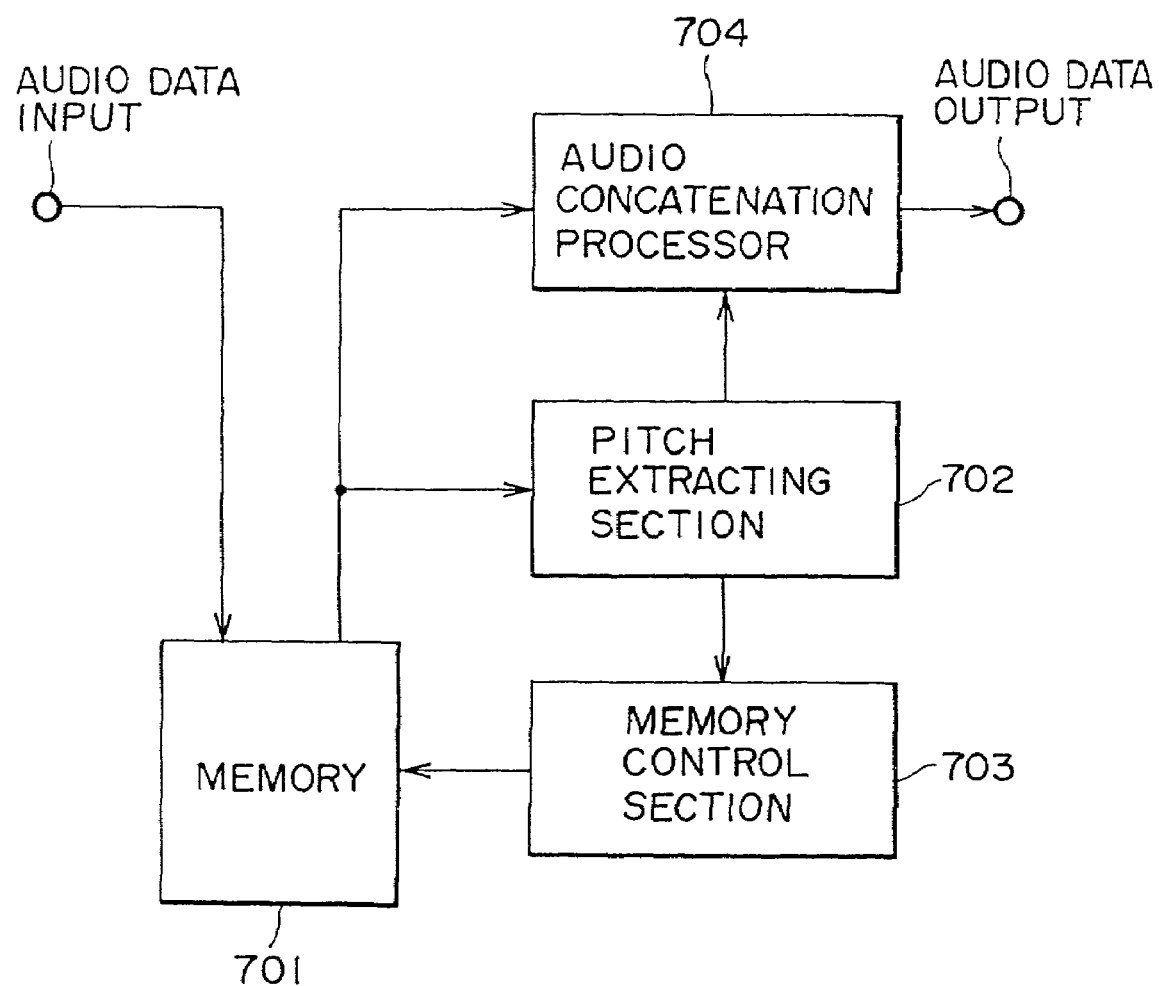
F I G. 76

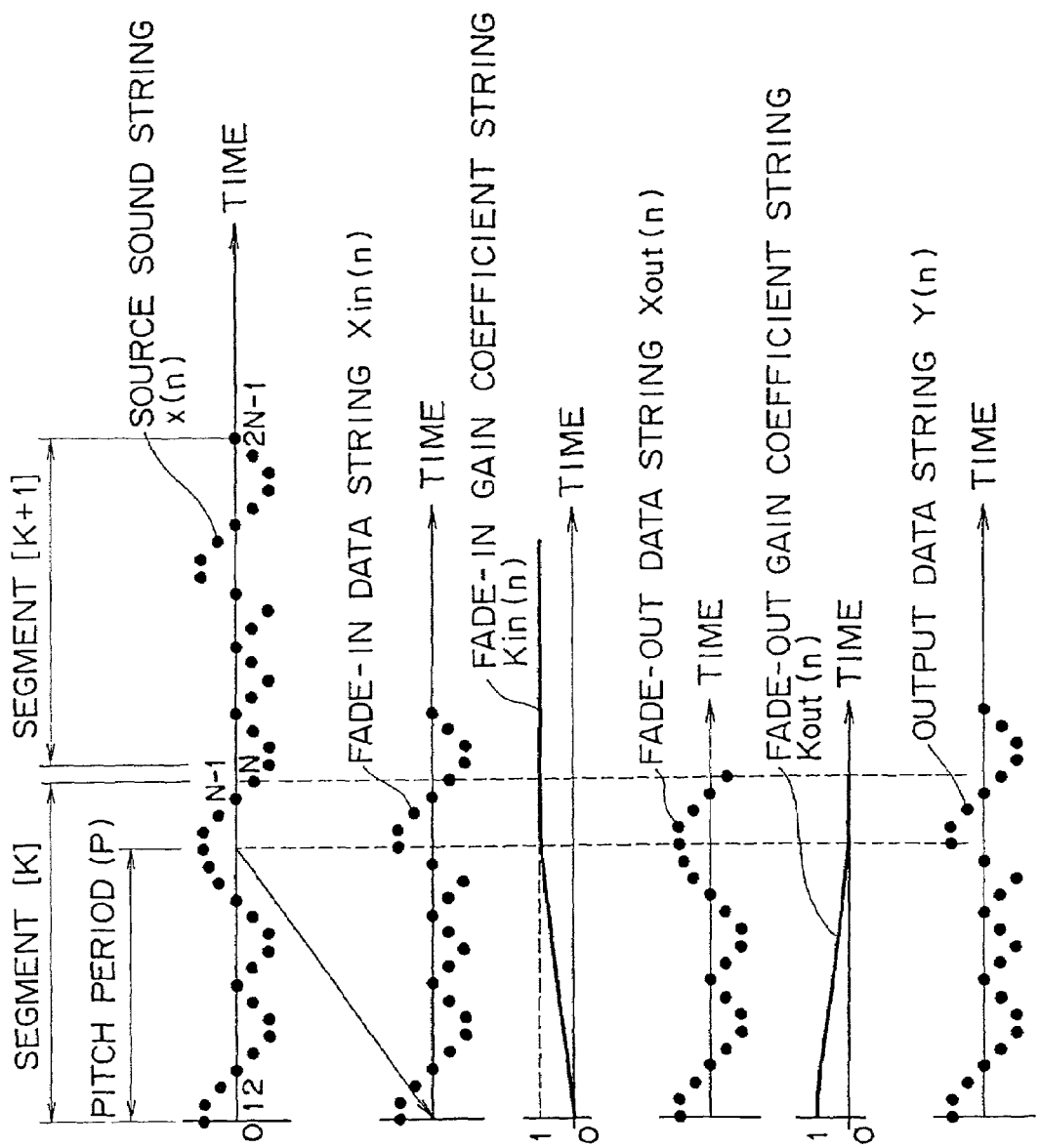
F I G. 79A
F I G. 79B
F I G. 79C
F I G. 79D
F I G. 79E
F I G. 79F

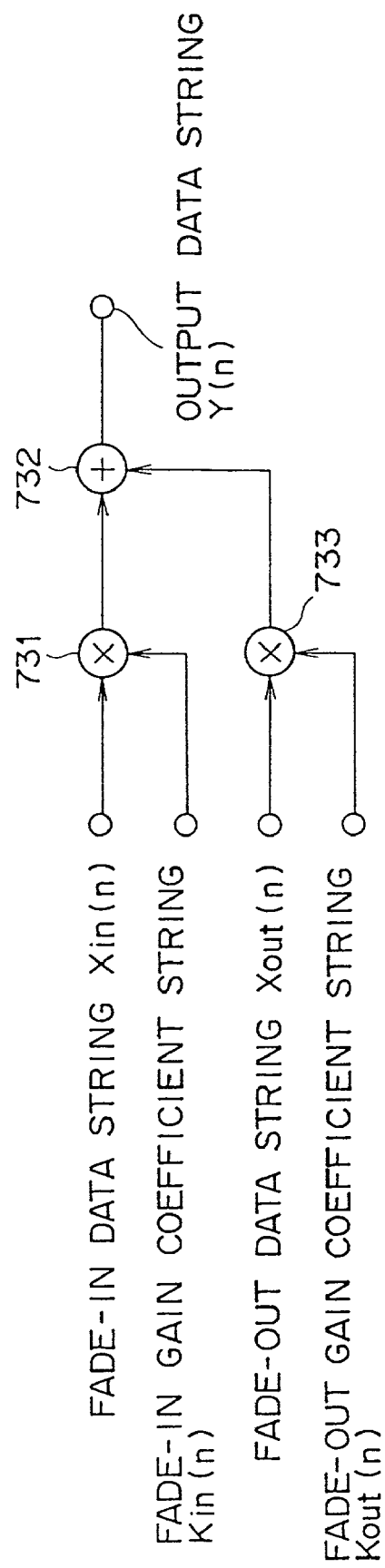

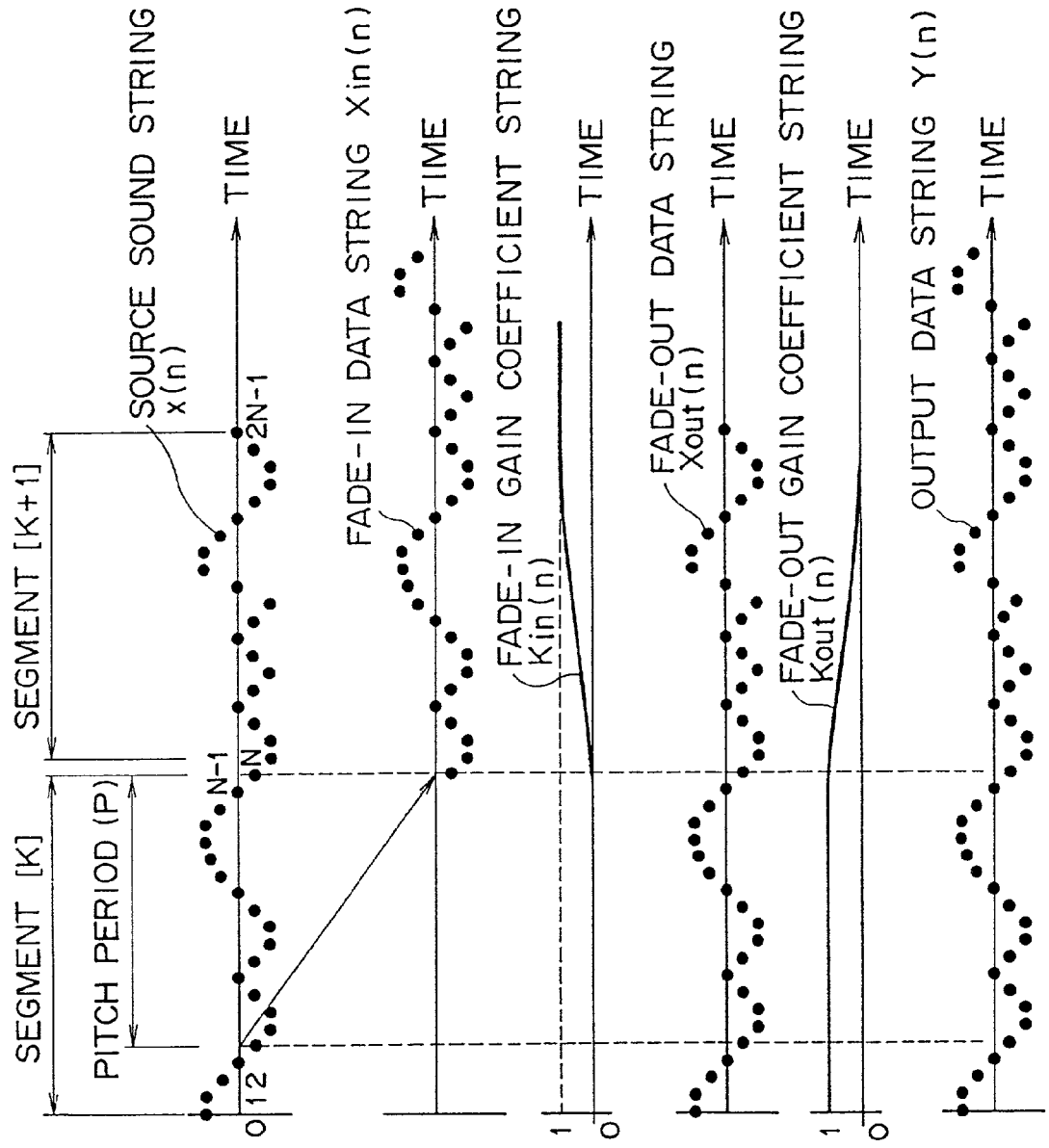

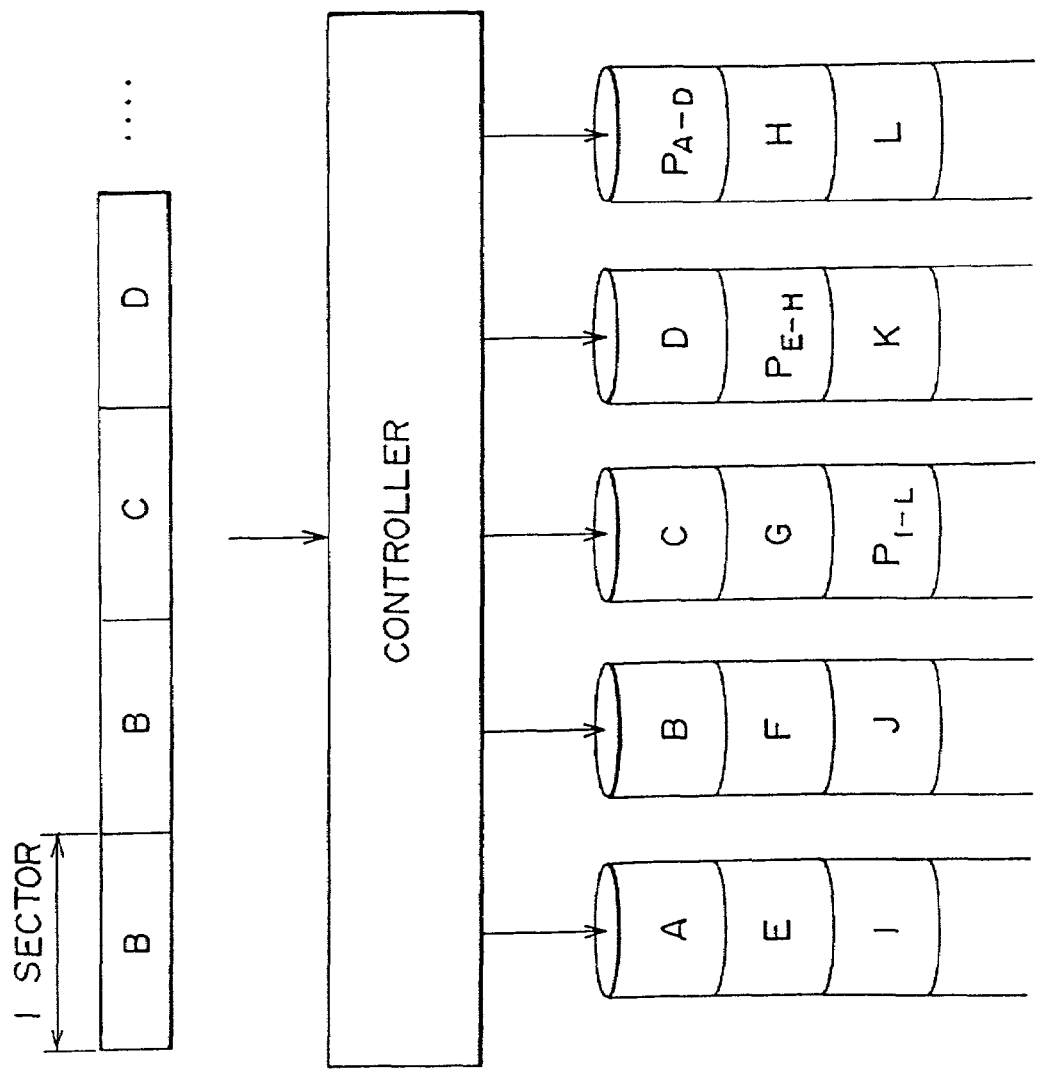

EDITING SYSTEM AND METHOD AND DISTRIBUTION MEDIUM

This is a Continuation of application Ser. No. 09/285,339 filed Apr. 2, 1999 now U.S. Pat. No. 6,356,701.

BACKGROUND OF THE INVENTION

1. Field of the Invention

This invention relates to an editing system and method and a distribution medium and more particularly to an editing system and method and a distribution medium which are capable of quick editing.

2. Description of the Related Art

In recent years, various computer systems have been developed rapidly, consumers have become eager to require enhanced external memory with the development of computer systems. The device that had developed in response to the request is a disk array unit. A disk array unit has a plurality of built-in disk devices therein to enlarge the capacity, in which disk array unit disk devices are operated in parallel to speed up reading operation and writing operation and error correction data is involved to improve the reliability.

When the data is stored in a disk array unit, the data is divided into a plurality of subblocks, error correction data is generated for each subblock, all the subblocks and error correction data are written in separate disk devices respectively.

On the other hand, when the data is read out from a disk array unit, a plurality of subblocks and error correction data are read out simultaneously from disk devices in which subblocks and error correction data, components of the data, are stored, the original data is re-structured from the read out subblocks, and the data is sent out as it is if no error is contained. When, if any subblock can not be read out normally because of damage of a recording area where the subblock is stored, the correct data is restored using other subblocks which are read out normally and error correction data and the restored data is sent out.

In the case of a disk array unit, even if one disk device is damaged completely, it is possible to restore the data by a procedure in which the damaged disk device is replaced with a new disk device and the data in other disk devices are used.

Some different types of disk array unit which involves error correction data have been known. Professor David A Patterson, UC Barclay School, classified the type into 5 classes, and proposed a new term namely level of RAID (Redundant Arrays of Inexpensive Disks). Summary of this proposal is described herein under.

RAID-1 is the class which doubles the data of a disk device, and alternatively called as mirrored disk. In a RAID-1, the quite same data are stored in two disk devices. In a RAID-2 or 3, the input data is divided in bit unit or byte unit, and divided data are stored in a plurality of disk devices. Hamming code is used in RAID-2, and parity is used in RAID-3 respectively as the error correction data. In a RAID-4 or RAID-5, the data is interleaved in sector unit. In a RAID-4, parity is stored in one disk device, on the other hand, in a RAID-5, parity is stored in a plurality of disk devices dispersedly.

RAID-3 and RAID-5 are used most popularly for the general disk array unit out of these RAID levels. FIG. 82 show an exemplary structure of a RAID-3 type disk array unit, and FIG. 83 shows an exemplary structure of a RAID-5 type disk array unit.

In the RAID-3 type disk array unit shown in FIG. 82, the input data is divided in byte unit, and the data divided in byte unit are stored in a plurality of disk devices. The parity is stored in a pre-determined disk device as the error correction data. Herein, parities P1-4 corresponding to the data having the number 1 to 4 stored in a plurality of disk devices and parities P5-8 corresponding to the data having the number 5 to 8 are stored.

In the RAID-5 type disk array unit shown in FIG. 83, the input data is divided in sector unit, these data are interleaved and stored in a plurality of disk devices dispersedly. In this case, data A, E, and I are stored in the first disk device, data B, F, and J are stored in the next disk device, data C, G, and parities PI-L corresponding to data I to L are stored in the next disk device. Data D, K, and parities PE-H corresponding to data E to H are stored in the next disk device, and parities PA-D corresponding to data A to D and data H and L are stored in the last disk device.

Recent development of computer system provides computers with the function to involve images and sound which are typical of multimedia data, a storage for these multimedia is some times referred as multimedia server. Because a large capacity and high transfer rate are required for a multimedia server, it is mostly realized in the form of disk array unit as a hardware system. An emphasis is placed on average processing performance for conventional computer server, on the other hand, an emphasis is placed on suppression of the worst value of the time required to complete processing for multimedia server.

For example, in the case of dynamic image, the motion is step-wise unless 30 images are displayed sequentially with a certain interval per second. The capacity of a disk device is insufficient for the motion, and if audio data becomes insufficient, then sound is interrupted and harsh noise is generated. Guaranty of upper limit time that processing is completed within the time at worst case is referred as guaranty of real-time. The guaranty of real-time is important for the multimedia server.

However, in the device explained above, video data and audio data cannot be processed quickly in real time and considerable time is required for editing even if the above device is used for the editing system, and so quick editing is impossible.

Moreover, when an audio signal is reproduced from the device explained above and a part thereof is updated in synchronism with the reproduced signal, it has been difficult to identify the buffering position of the recording signal and then match the position to the reproduced signal because the reproduced signal (old data) and recording signal (new data) are temporarily recorded respectively to independent buffers and the recording signal is delayed from the reproduced signal.

Moreover, the device explained above also has a problem that it is difficult to synthesize and record a plurality of reproduced signals in their arbitrary combinations.

Further, when video and audio signals are reproduced simultaneously at arbitrary positions on the above-mentioned device, a deviation of audio signal reproduction occurs due to the difference between the video frame frequency and the audio sampling frequency.

SUMMARY OF THE INVENTION

The present invention has been proposed considering such background and therefore it can identify the buffering position of the recording signal and then match the position to the reproduced signal.

According to the present invention of the editing system, temporarily storing audio data to be reproduced in the block form, temporarily storing synthesized audio data in the block form, generating and supplying a reference signal, and calculating the first address of the block of audio data enable identifying the buffering position of the recording signal and then matching the position to the reproduced signal.

Further, according to the present invention of the editing system, generating a reference signal, calculating the first address of the block of recording signals, and distributing and synthesizing arbitrary audio data enable recording of arbitrary combinations in arbitrary locations.

Moreover, according to the present invention of the editing system, generating a reference signal, calculating the first address of the block of recording signals, and detecting the first phase of the block of the recording signals enable preventing the deviation of audio signals from video signals.

According to the present invention, an editing system comprises reproducing means for reproducing original audio data recorded in randomly accessible recording media and outputting the reproduced audio data through reproduction buffers; recording means for recording insert audio data supplied from the outside in the recording media through recording buffers; and control means for controlling the reproducing means and the recording means so that the insert audio data is recorded in a location where the original audio data is recorded and for determining storing addresses of the recording buffers for buffering the insert audio data based on the difference between the addresses of said reproduction buffers and the addresses of said recording buffers at the identical time.

According to the present invention, an editing method comprises a first storing step of temporarily storing audio data to be reproduced in the block form; a receiving step of receiving the input of audio data to be synthesized; a synthesizing step of synthesizing the reproduced audio data and the audio data received in the receiving step; a second storing step of temporarily storing the audio data synthesized in the synthesizing step in the block form; a reference signal generating step of generating a reference signal to supply the reference signal in the first and second storing steps; and an calculating step of calculating the first address of the block of the audio data stored in the second storing step.

According to the present invention, a distribution medium for providing a program which controls an editing system to perform a process comprises a first storing step for temporarily storing the audio data to be reproduced in the block form; a receiving step of receiving the input of audio data to be synthesized; a synthesizing step of synthesizing the reproduced audio data and the audio data received in the receiving step; a second storing step of temporarily storing the audio data synthesized in the synthesizing step in the block form; a reference signal generating step of generating a reference signal to supply the reference signal in the first and second storing steps; and an calculating step of calculating the first address of the block of the audio data stored in the second storing step.

BRIEF DESCRIPTION OF THE DRAWINGS

FIG. 9 is a diagram for illustrating an example of ZBR table shown in FIG. 8 in the case of NTSC.

FIG. 10 is a diagram for illustrating an example of ZBR table shown in FIG. 8 in the case of PAL.

FIGS. 13A and 13B are diagrams for describing an example of the block map shown in FIG. 8.

FIG. 14 is a diagram for describing the format of the block map shown in FIG. 8.

FIG. 15 is a diagram for describing an example of the block map shown in FIG. 8.

FIG. 16 is a flow chart for describing the process for forming a block map.

FIG. 23 is a graph for describing the relation between the gap θgap and the cylinder.

FIG. 33 is a diagram for describing the data arrangement on a hard disk realized by the processing shown in FIG. 28.

FIG. 48 is a diagram for describing parity generation processing in the RAID controller shown in FIG. 47.

FIG. 49 is a diagram for describing data correction processing in the RAID controller shown in FIG. 47.

FIG. 51 is a diagram for describing an exemplary structure of the parity data and subblock of NTSC.

FIG. 52 is a diagram for describing an exemplary structure of the parity data and subblock of NTSC.

FIG. 53 is a diagram for describing an exemplary structure of the parity data and subblock of NTSC.

FIG. 62 is a diagram for describing arrangement of the subblock data of each frame on each disk.

FIG. 63 is a diagram for describing the structure of the stream.

FIG. 76 is a block diagram for illustrating the detailed structure of the variable speed reproduction processor 510 shown in FIG. 64.

FIGS. 79A to 79F are diagrams for describing processing performed by the audio concatenation processor 704.

FIG. 80 is a diagram for describing the built-in calculation circuit in the audio concatenation processor 704.

FIGS. 81A to 81F are diagrams for describing processing performed by the audio concatenation processor 704.

FIG. 83 is a diagram for describing the conventional RAID.

DETAILED DESCRIPTION OF THE PREFERRED EMBODIMENTS

Embodiments of the present invention will be described in detail hereinafter, before the description of embodiments, features of the present invention are described with adding corresponding embodiments (only one example) in the parenthesis after the description of each means in order to clarify the correlative relation between each means of the invention described in the scope of claims for patent and the embodiment described hereinafter.

The editing system of the present invention comprises a first storing means (for example, hard disks 201-1 to 201-28 in FIG. 7) for storing video data, a second storing means (for example; hard disks 201-29 to 201-32 in FIG. 7) for storing audio data; and control means (for example, controller 262 in FIG. 7) for controlling the first storing means based on the RAID-5 method and FARAD algorithm and the second storing means based on the RAID-1 method.

Figure 1:
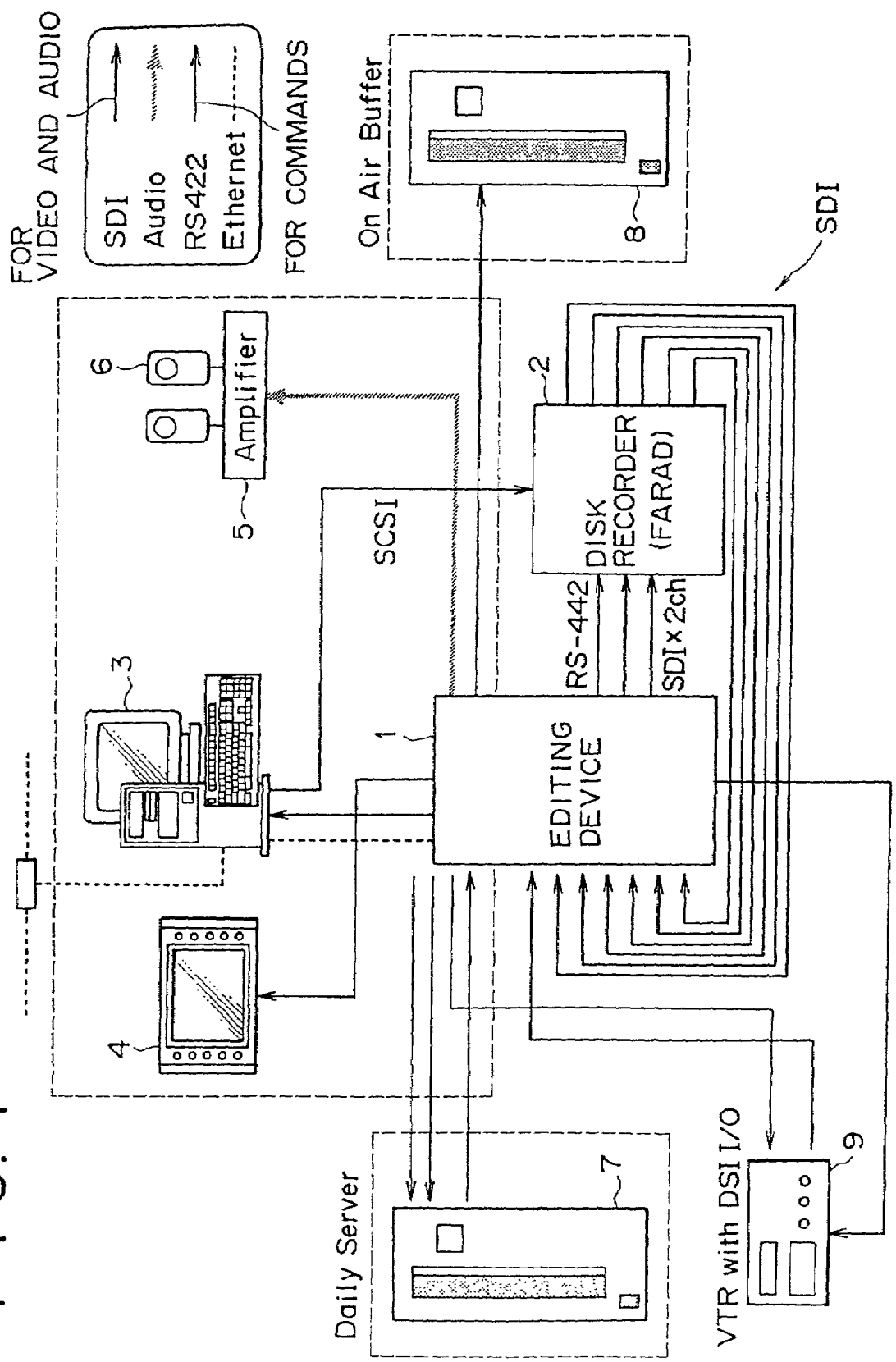
FIG. 1 is a block diagram for illustrating an exemplary structure of an editing system to which the present invention is applied.

FIG. 1 shows an exemplary structure of an editing system to which the present invention is applied. In this system, the video data is supplied from a source video tape recorder (VTR) 9 and a daily server 7 to an editing system 1, and the video data is subjected to editing. The editing system 1 controls a disk recorder 2 to perform editing. The editing system 1 transmits the video data and audio data to the disk recorder 2 through a two channel SDI (Serial Data Interface), and the disk recorder 2 supplies 6 channel video data and 16 channel audio data to the editing system 1 though the SDI. Further, the editing system 1 supplies the audio data and video data to a main monitor 4, an on air buffer 8, the source VTR 9, a host personal computer 3 through the SDI. Further, the editing system 1 supplies the audio signal to an amplifier 5 to generate sound from a speaker 6.

On the other hand, the host personal computer 3 supplies a command to the editing system 1 through RS 422 to control it. Further, the editing system 1 sends a command to the disk recorder 2, daily server 7, and source VTR 9 through the RS 422 to control them. Further, the editing system 1 is controlled by Ethernet through the host personal computer 3, and controls external apparatuses. The disk recorder 2 is controlled by the host personal computer 3 through the SCSI (ANSI, Small Computer System Interface).

Figure 2:
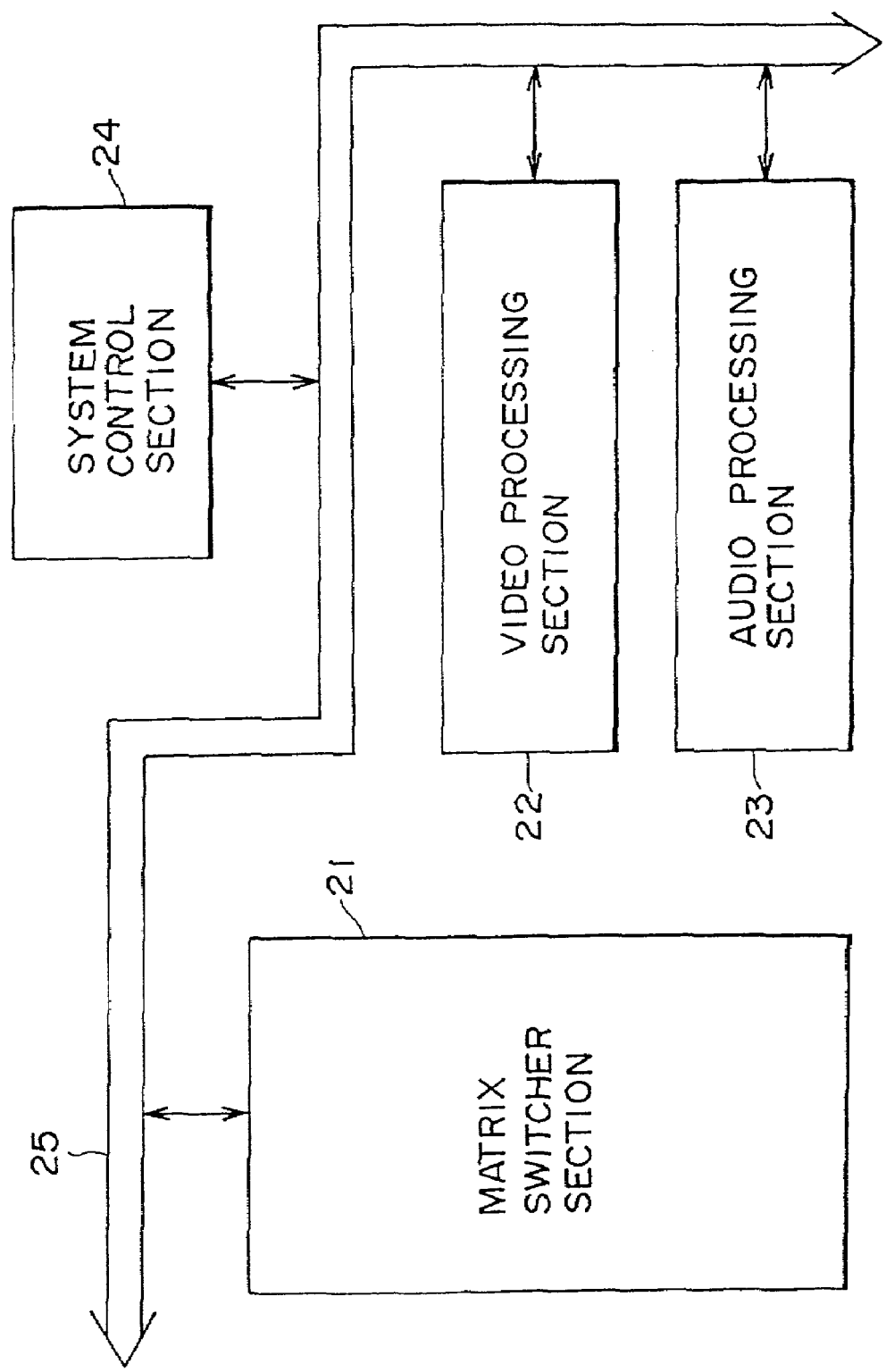
FIG. 2 is a block diagram for illustrating the structure of the editing system shown in FIG. 1.

FIG. 2 shows an exemplary internal structure of the editing system 1. The editing system 1 comprises a matrix switcher section 21 a video processing unit 22, an audio processing unit 23, and a system control section 24 connected each other through a control bus 25.

Figure 3:
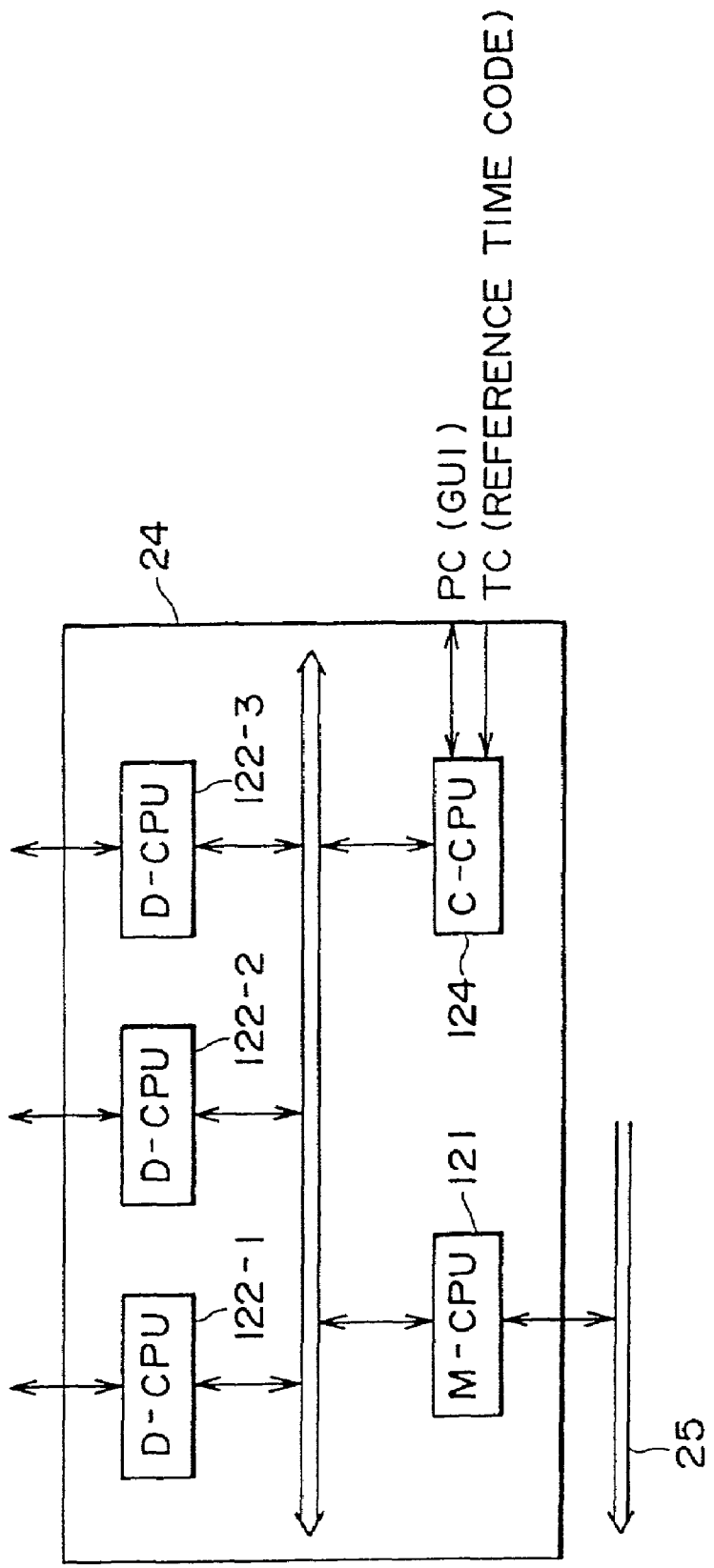
FIG. 3 is a block diagram for illustrating the structure of the system control section shown in FIG. 2.

As shown in FIG. 3, the system control section 24 is provided with a main CPU 121 for controlling the matrix switcher section 21, the video processing section 22, and the audio processing unit 23 through a control bus 25, and provided with a device control CPU's 122-1 to 122-3 for controlling devices such as the source VTR 9, the disk recorder 2 served as a local storage, and daily server 7 through the control bus 25. Further, the system control section 24 is provided with a communication CPU 124 for operating interface processing for GUI and for operating input and output transmission of the reference time record between the host personal computer 3.

Figure 4:
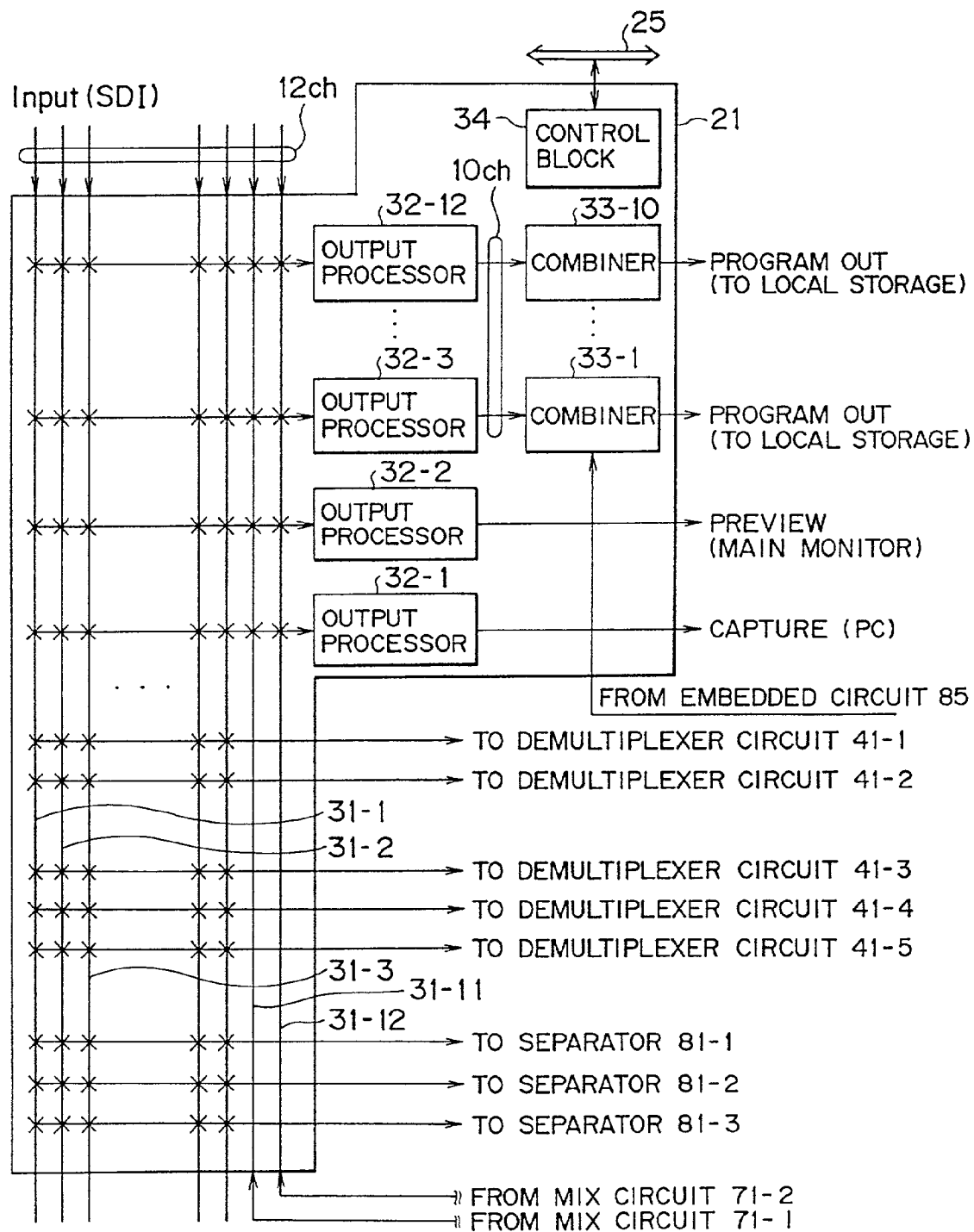
FIG. 4 is a block diagram for illustrating the structure of the matrix switcher section shown in FIG. 2.

As shown in FIG. 4, the matrix switcher section 21 is a block for switching the input line and output line. The matrix switcher section 21 is provided with 12 input lines 31-1 to 31-12 for receiving the video signal or audio signal supplied based on the SDI format. 12 output lines corresponding to 12 input lines are disposed in the form of matrix, each output line is provided with output processors 32-1 to 32-12. Input lines 31-1 to 31-12 and 12 output lines corresponding to the output processors 32-1 to 32-12 are connected at cross points marked with X as required. The control block 34 of the matrix switcher section 21 receives a command from the main CPU 121 of the system control section 24 through the control bus 25, and the connection is controlled correspondingly to the command.

Not only the video signal and audio signal from the daily server 7, the source VTR 9, or the disk recorder 2 shown in FIG. 1 is supplied to this input line but also the video signal processed by the video processing section 22 is supplied to this input line. The control block 34 supplies these prescribed inputs to any one of output processors 32-1 to 32-12 of the 12 output lines by switching the cross point as required. The output processors 32-1 to 32-12 convert the input video signal to the signal of SDI format. The output of the output processor 32-1 is changed to a capture line output, and supplied to the host personal computer 3. The output of the output processor 32-2 is served as the output of the preview line, and supplied to the main monitor 4.

On the other hand, on the rear end of the output processors 32-3 to 32-12, combiners 33-1 to 33-10 are provided, these combiners 33-1 to 33-10 superimpose embedded audio signal supplied from the audio processing unit 23 on the SDI video signal supplied from corresponding output processors 32-3 to 32-12. Output of the combiners 33-1 to 33-10 is supplied as the output of program outline to the disk recorder 2 which is served as a local storage. Herein, the embedded audio signal means the superimposed audio signal which is subjected to time base compression in the horizontal blanking period of the video signal.

Figure 5:
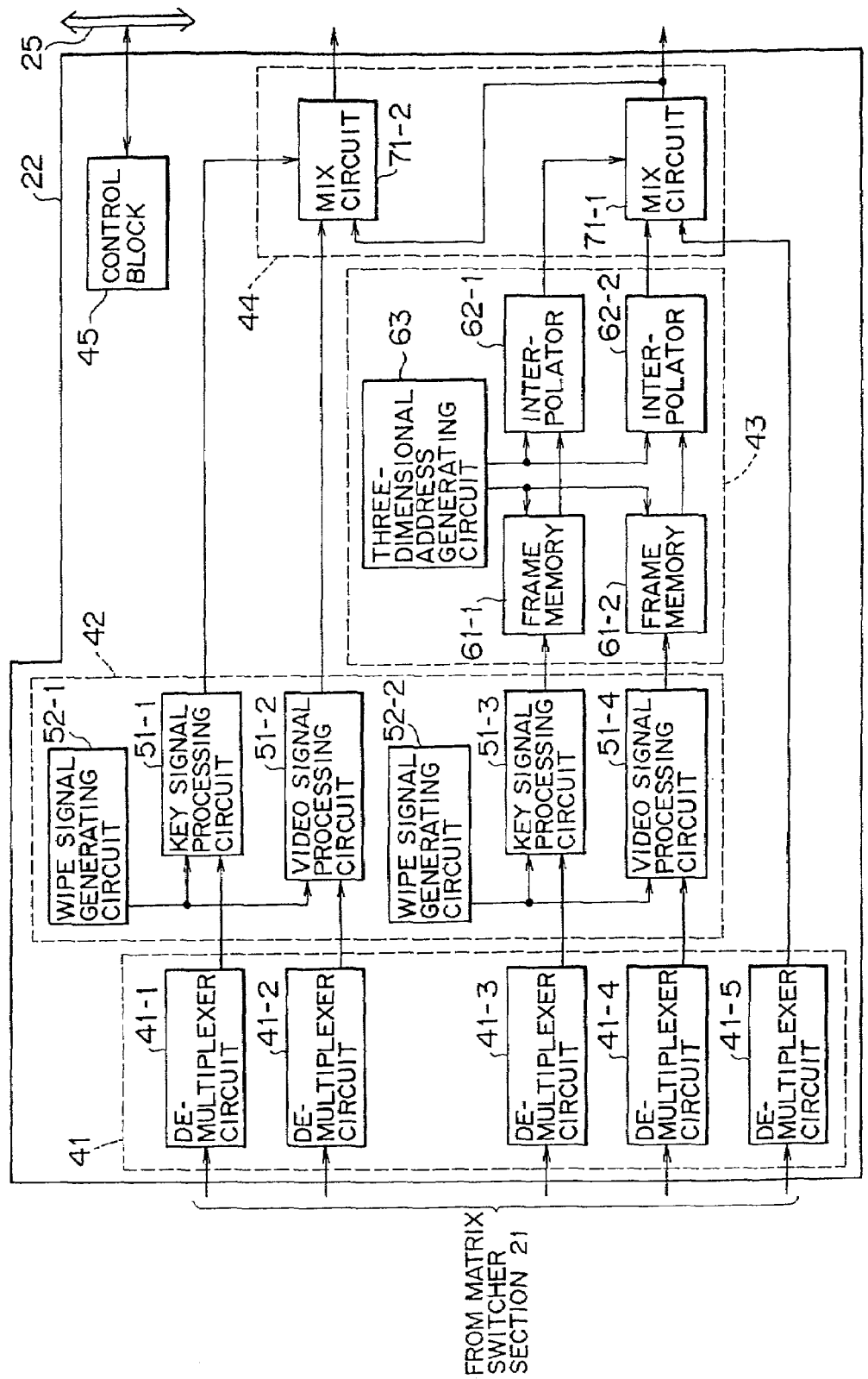
FIG. 5 is a block diagram for illustrating the structure of the video processing section shown in FIG. 2.

As shown in FIG. 5, the video processing unit 22 is a block for operating image conversion processing of the video signal supplied from the matrix switcher section 21. The image conversion processing includes, for example, processing for applying special effect on the source video signal, animation effect processing for inserting the video signal which is formed by applying special effect to the background video signal, and transition effect processing for switching the image from the background video signal to foreground video signal.

The video processing section 22 comprises a demultiplexer block 41 for extracting the key signal or video signal (luminance signal and chroma signal) from the SDI format signal which is supplied from the matrix switcher section 21, a switcher block 42 for producing the transition effect such as wipe on the key signal or video signal, a special effect block 43 for producing animation effect such as three-dimensional image conversion on the key signal or video signal, a mixer block 44 for mixing the video signal from the switcher block 42, the special effect block 43, and the matrix switcher section 21, and a control block 45 for controlling the demultiplexer block 41, the switcher block 42, the special effect block 43, and the mixer block 44.

The control block 45 receives a control signal from the system control section 24 through the control bus 25, and controls the demultiplexer block 41, the switcher block 42, the special effect block 43, or the mixer block 44 through a control line not shown in the drawing.

The demultiplexer block 41 is provided with demultiplexer circuits 41-1 to 41-5, these demultiplexer circuits 41-1 to 41-5 are circuits for extracting a packet video signal so that the format is equivalent to SDI format supplied from the matrix switcher section 21, and extract a video signal recorded in the area of the pay load part of each packet data based on the sync signal and header information recorded on the head of each video signal recorded serially.

The switcher block 42 is provided with wipe signal generating circuits 52-1 and 52-2 for generating a wipe signal corresponding to the transition effect indicated by an operator in response to a control command from the control block 45. The wipe signal generating circuit 52-1 supplies a generated wipe signal to a key signal processing circuit 51-1 and a video signal processing circuit 51-2, and the wipe signal generating circuit 52-2 supplies a generated wipe signal to a key signal processing circuit 51-3 and a video signal processing circuit 51-4.

The key signal processing circuit 51-1 processes a key signal supplied from the demultiplexer circuit 41-1 correspondingly to a wipe signal supplied from the wipe signal generating circuit 52-1, and generates a new key signal. The video signal processing circuit 51-2 processes a video signal supplied from the demultiplexer circuit 41-2 correspondingly to a wipe signal supplied from the wipe signal generating circuit 52-1.

Similarly, the key signal processing circuit 513 processes a key signal supplied from the demultiplexer circuit 41-3 correspondingly to a wipe signal supplied from the wipe signal generating circuit 52-2, and generates a new key signal. The video signal processing circuit 51-4 processes a video signal supplied from the demultiplexer circuit 41-4 correspondingly to a wipe signal supplied from the wipe signal generating circuit 52-2.

In the special effect block 43, a key signal or video signal supplied respectively from the key signal processing circuit 51-3 or the video signal processing circuit 51-4 is stored in a frame memory 61-1 or a frame memory 61-2. A three-dimensional address generation circuit 63 receives a special image conversion control command from the control block 45, generates a conversion address for converting a key signal or video signal respectively to a three-dimensional image, and delivers it to the frame memories 61-1 and 61-2 and interpolators 62-1 and 62-2. In the frame memories 61-1 and 61-2, reading out of a key signal or video signal is controlled correspondingly to a conversion address from the three-dimensional address generation circuit 63. The interpolators 62-1 and 62-2 operate processing for spatially interpolating the pixel of a key signal or video signal supplied respectively from the frame memory 61-1 or the frame memory 61-2 based on a conversion address from the three-dimensional address generating circuit 63.

In the mixer block 44, a mix circuit 71-1 combines a transformed video signal supplied from the interpolator 62-2 and a background video signal supplied from the demultiplexer circuit 41-5 based on an image-transformed key signal supplied from the interpolator 62-1. A mix circuit 71-2 combines a video signal supplied from the mix circuit 71-1 and a video signal processed based on a wipe signal in the video signal processing circuit 51-2 correspondingly to a key signal processed based on a wipe signal supplied from the key signal processing circuit 51-1. The video signal delivered from the mix circuits 71-1 and 71-2 is supplied to two input lines out of 12 input lines of the matrix switcher section 21.

Figure 6:
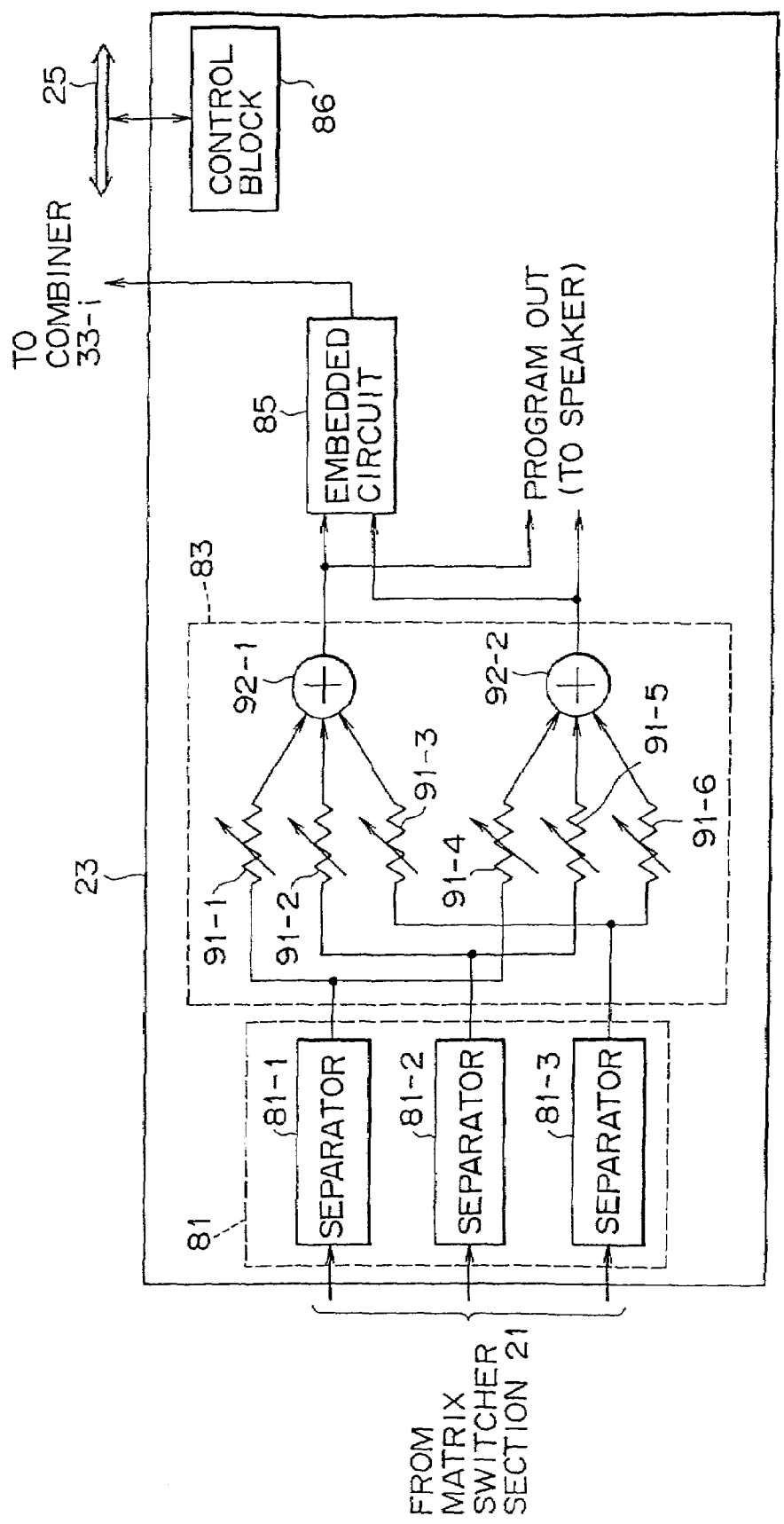
FIG. 6 is a block diagram for illustrating the structure of the audio processing section shown in FIG. 2.

As shown in FIG. 6, in the audio processing unit 23, a separator block 81 is provided with separators 81-1 to 81-3, and these separators 81-1 to 81-3 separate an embedded audio signal from an SDI format signal supplied from the matrix switcher section 21. These signals are AES/EBU (Audio Engineering Society/European Broadcasting Union) format signal.

A mixer block 83 is provided with an adder 92-1 which adds the output of the separators 81-1 to 81-3 after the output is adjusted to a prescribed level by variable resistors 92-1 to 92-3, and provided with an adder 92-2 which adds the output of the separators 81-1 to 81-3 after the output is adjusted to a prescribed level by variable resistors 91-4 to 91-6.

An embedded circuit 85 converts an audio signal delivered from the adders 92-1 and 92-2 to an embedded audio signal so that the audio signal is to be superimposed on an SDI format signal. The output of the embedded circuit 85 is supplied to the combiners 33-1 to 33-10 of the matrix switcher section 21, and superimposed on a video signal which has been converted to an SDI format signal by the output processors 32-3 to 32-12, and then supplied to the disk recorder 2.

A control block 86 controls operation of the separator block 81, the mixer block 83, and the embedded circuit 85 based on a control signal which is received from the system control section 24 through the control bus 25.

The output of the adders 92-1 and 92-2 comes out from a speaker 6 through the amplifier 5 shown in FIG. 1.

Figure 7:
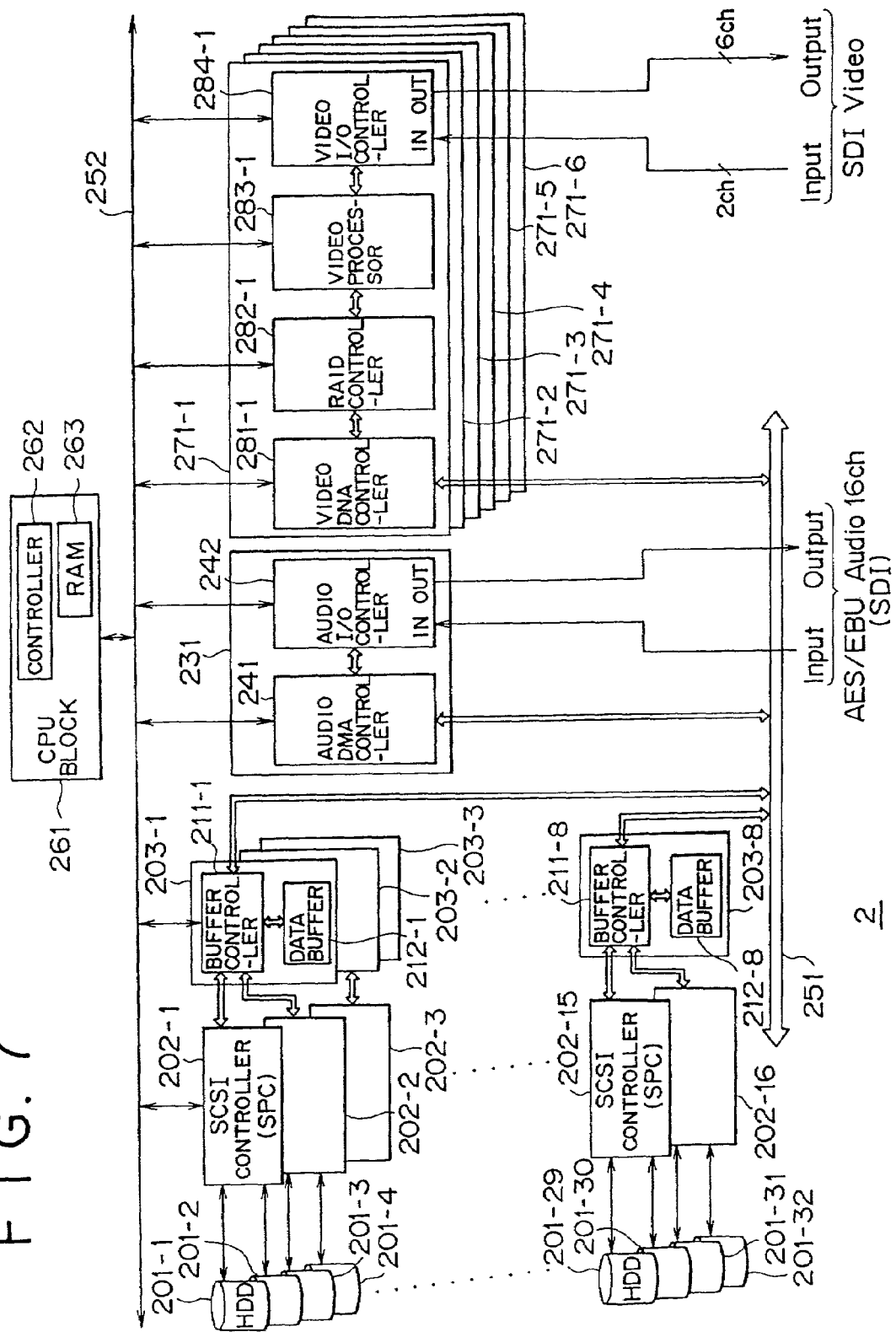
FIG. 7 is a block diagram for illustrating an exemplary structure of the disk recorder shown in FIG. 1.

FIG. 7 shows an exemplary internal structure of the disk recorder 2. The disk recorder 2 is a type of disk recorder to which hard disk management algorithm FARAD (Fat Random Access Disk) (bland name) is applied for fast real time random access, and allows fast random access to multi-channel data with a disk having a relatively small capacity.

In this exemplary structure, 32 hard disks 201-1 to 201-32 are provided, hard disks 201-1 to 201-28 out of these hard disks are served for video signal recording of RAID-5 system, on the other hand, hard disks 201-29 to 201-32 are served for audio signal recording of RAID-1 system. SCSI controllers 202-1 to 202-16 served as SPCs (SCSI Peripheral Controller) respectively control two hard disks. For example, the SCSI controller 201-1 controls the hard disk 201-1 and hard disk 201-2, SCSI controller 201-2 controls the hard disk 201-3 and hard disk 201-4.

Further, buffer blocks 203-1 to 203-8 are provided. One buffer block controls two SCSI controllers, for example, the buffer block 203-1 controls the SCSI controller 202-1 and SCSI controller 202-2, and the buffer block 203-2 controls SCSI controller 202-3 and SCSI controller 202-4. Each buffer block 203-i (i is an arbitrary value, and herein i=1, 2, . . . 8) is provided with a data buffer 212-i and a buffer controller 211-i which is served for controlling the data buffer 212-i.

Further, a serial address which is specified definitely by a controller 262 of a CPU block 261 is allocated to the data buffers 212-1 to 212-8, and the memory position of data is indicated based on the address. Therefore the controller 262 regards the plurality of data buffers 212-1 to 212-8 as one data buffer.

This disk recorder 2 can have totally 36 hard disks, but in this exemplary structure, 32 hard disks are provided.

As a block for recording/reproducing audio data, an audio block 231 is provided to these hard disks 201-29 to 201-32, and video blocks 271-1 to 271-6 are provided to the hard disks 201-1 to 201-28 for recording/reproducing video data.

The audio block 231 processes audio data for 16 channels. The audio block 231 is provided with an input-output (I/O) controller 242 and a DMA controller 241. The input-output controller 242 receives supply of an audio signal for 16 channels from any one of the combiners 33-1 to 33-10 of the matrix switcher unit 21 shown in FIG. 4, processes the audio signal, supplies it to the DMA controller 241, as well as processes an audio signal for the maximum 18 channels supplied from the DMA controller 241, and delivers it to the input line of the matrix switcher section 21 of the editing system 1 shown in FIG. 4.

The DMA controller 241 supplies an audio signal supplied from the input-output controller 242 to the buffer controller 211-8 through a DMA bus 251 for DMA transfer to the corresponding data buffer 212-8. Further, the DMA controller 241 reads the data read out from the data buffer 212-8 through the DMA bus 251, and DMA-transfers to the input-output controller 242.

In the video block 271-i (i=1, 2, . . . , 6), a DMA controller 281-i DMA-transfers the video data between the data buffers 212-1 to 212-7 and RAID controller 282-i through the DMA bus 251.

The RAID controller 282-i processes the video data to be recorded in the hard disks 201-1 to 201-28 supplied from a video processing section 283-i for error correction and supplies it to the DMA controller 281-i, and processes the data reproduced from the hard disks 201-1 to 201-28 supplied from the DMA controller 281-i for error correction, and then delivers it to the video processing section 283-i. Detailed processing of the RAID controller 282-i will be described hereinafter.

The video processing section 283-i operates processing for converting the video data supplied from an input output controller 284-i to a clock rate required to process on the RAID controller 282-i side, and in the opposite direction, operates processing for converting the reproduction data supplied from the RAID controller 282-i to a clock rate to be processed by the input-output controller 284-i.

The input-output controller 284-i receives the video data supplied from any one of combiner 33-1 to 33-10 of the matrix switcher section 21 of the editing system 1 and supplies it to any one of the video processing sections 283-1 to 283-6 with switching, and in the opposite direction, supplies the video data supplied from the video processing section 283-i to the input line of the editing system 1.

Because this exemplary structure is provided 6 video blocks 271-1 to 271-6, it is possible to process totally the video signal of 6 channels.

Figure 8:
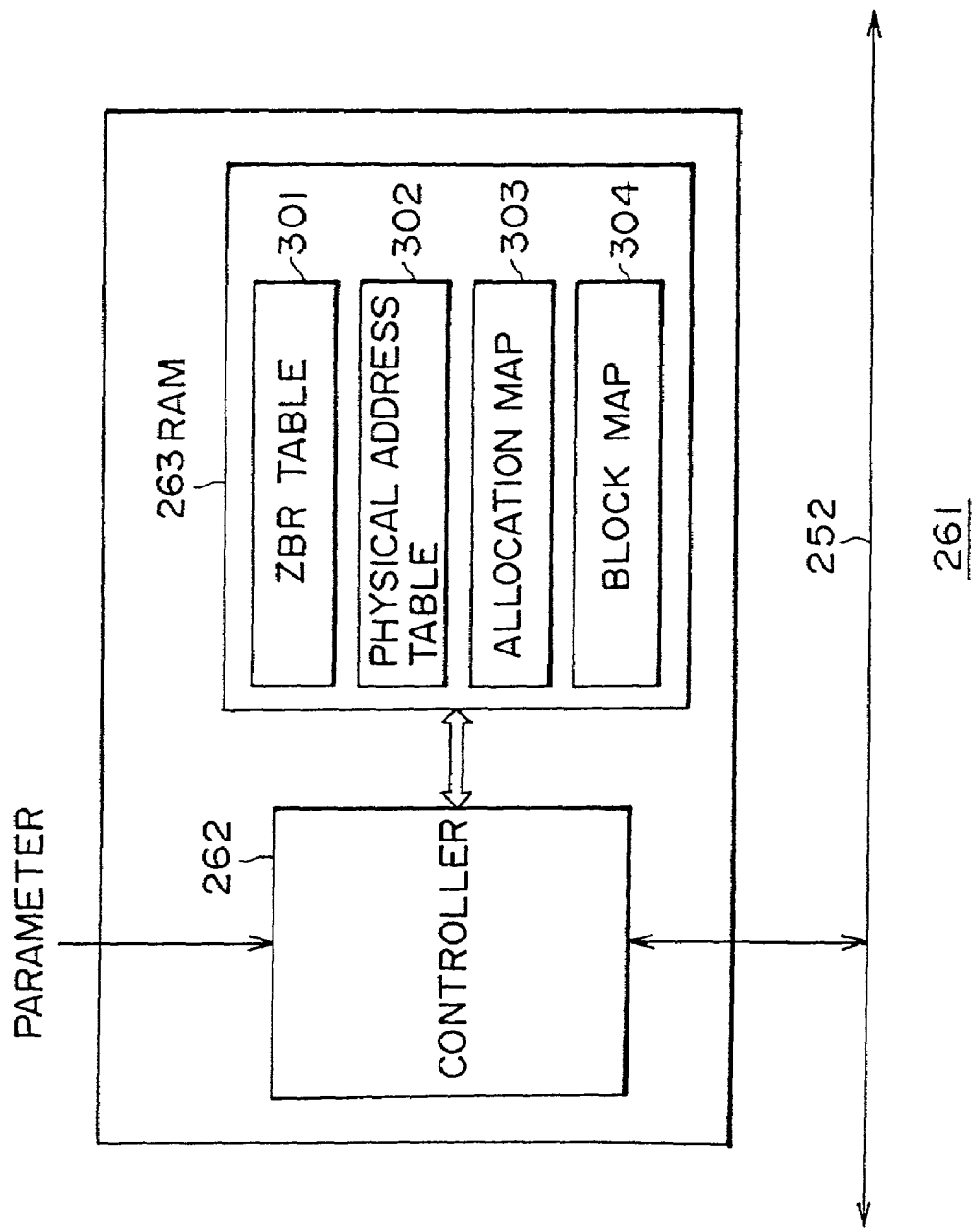
FIG. 8 is a block diagram for illustrating an exemplary structure of the CPU block shown in FIG. 7.

The CPU block 261 is provided with the controller 262 and a RAM 263 and connected to the SCSI controller 202-i, the buffer block 203-i, the DMA controller 241, the input-output controller 242, the DMA controller 281-i, the RAID controller 282-i, the video processing section 283-i, and input output controller 284-i, and controls these components as required. The controller 262 controls blocks and the RAM 263 stores software programs and table data which are required for the controller 262 to operate various processing. The controller 262 generates and updates the determined format parameter and generates and updates a block map 304 based on the data from a zone bit recording (ZBR) table 301 formed in the RAM 263 as shown in FIG. 8. Herein, the format parameter comprises the size of one block of data S, the number of division of data n, and the optimal skew value θskew.

The controller 262 generates a command for controlling operation of the DMA controller 281-i and RAID controller 282-i with reference to the block map 304. Further, the controller 262, when video data or audio data which is buffered to the data buffer 212-i is recorded or reproduced to or from the hard disk 201-i, performs processing for scheduling the access order of the head so that the head migration is minimized.

Additionally, the controller 262 generates and records a physical address table 302 and allocation map 303 in the RAM 263 as shown in FIG. 8.

The zone bit recording (ZBR) table 301 is a table in which the cylinder address of the hard disk is correlated to the number of sectors used in one track at the cylinder position. FIG. 9 and FIG. 10 show examples of the ZBR table, FIG. 9 shows an example of ZBR table involving the video signal of NTSC standard, and FIG. 10 shows an example of ZBR table involving the video signal of PAL standard.

Figure 11B:
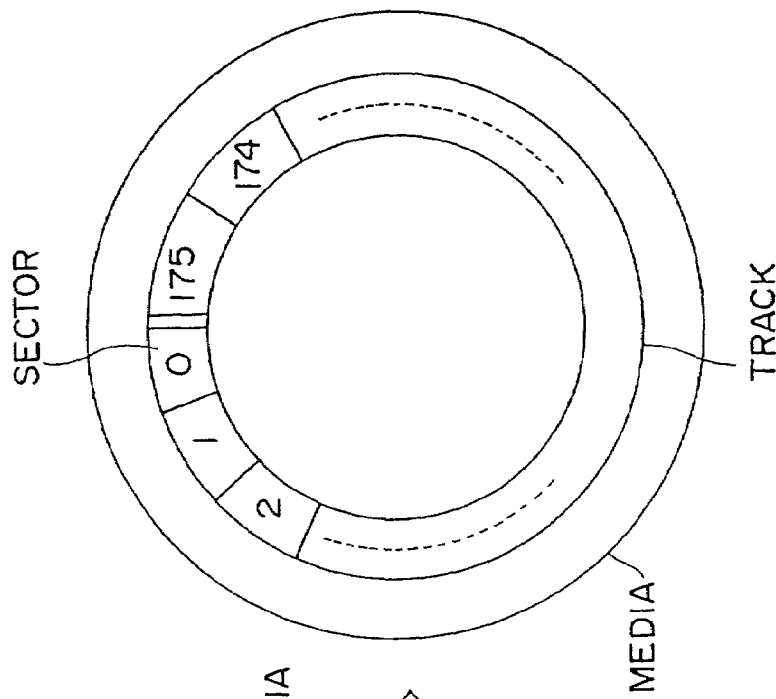
FIGS. 11A and 11B are diagrams for describing the relation between cylinder, track, and sector.
Figure 11A:
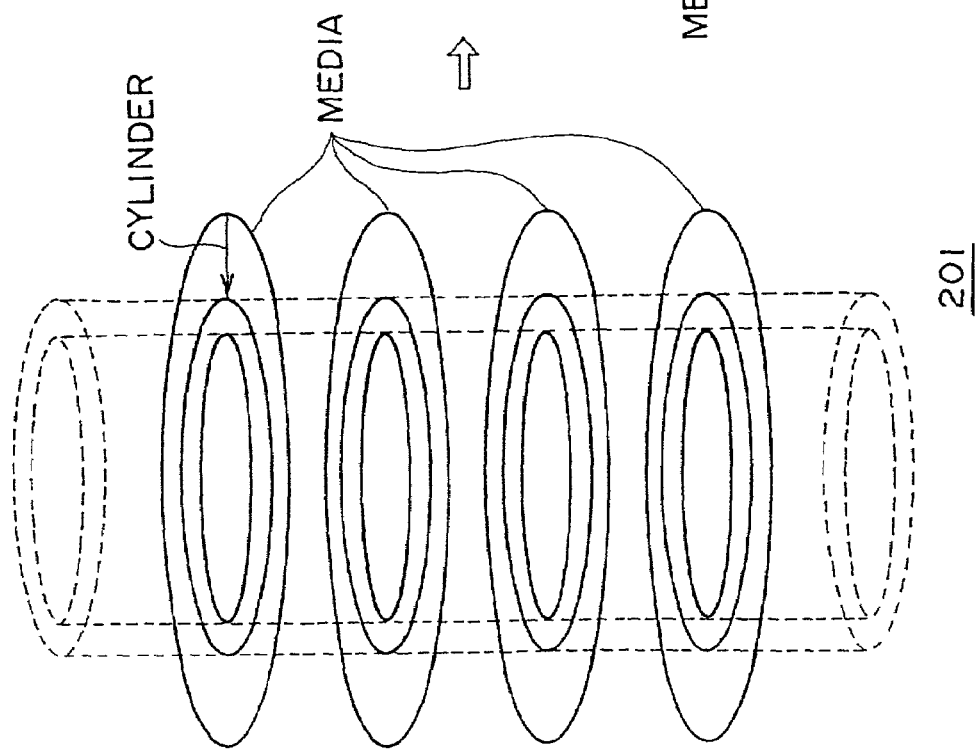
Figure 12:
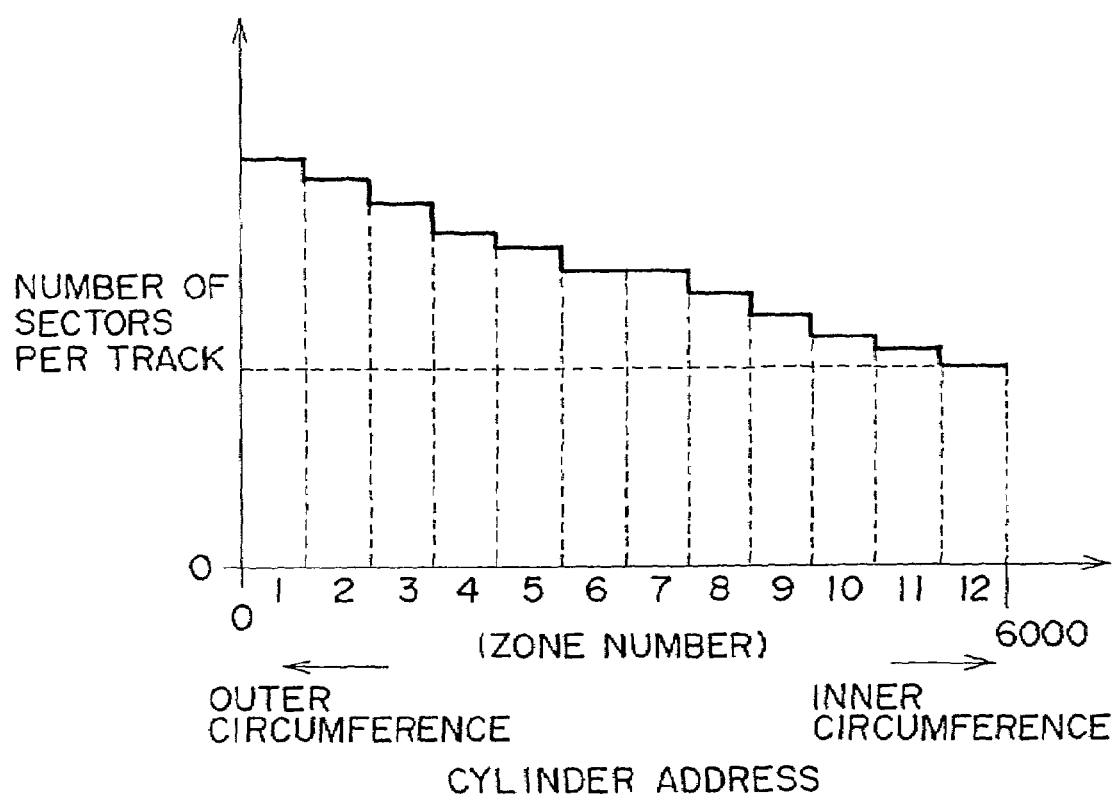
FIG. 12 is a diagram for describing the recording principle of ZBR.

As shown in FIGS. 11A and 11B, the hard disk 201-i comprises a plurality of media (disks), and a plurality of tracks are formed on each medium. Each track is segmented into a plurality of sectors, and each sector is a size of 512 bytes. An area comprising tracks positioned at the same radius distance from the center of each medium is referred as cylinder. Successive numbers are assigned to the cylinder from the outer side to inner side in the order, and these numbers are referred as cylinder address.

Each hard disk 201-i is formatted by way of zone bit recording. In detail, the recording surface is segmented into a plurality of zones correspondingly to the distance from the center of a disk and formatted so that the number of sectors per track is larger for the outer zone than for inner zone. In the case of this embodiment, as shown in FIG. 9, FIG. 10, and FIG. 12, 6000 tracks specified by cylinder addresses 0001 to 6000 are formed from the outermost circumference to the innermost circumference, and segmented into 12 zones, each zone contains 500 tracks. As shown in FIG. 9, for example, in the first zone on the outermost side specified by the cylinder addresses 0001 to 0500, 567 sectors are formed per one track, on the other hand, in the 12th zone on the innermost side specified by the cylinder addresses 5501 to 6000, 393 sectors are formed per one track.

Though details will be described hereinafter, out of these 12 zones, the first zone on the outermost circumference and the second zone on the innermost circumference are used combinedly as a pair, and similarly in the following, the second zone and the 11th zone, the third zone and the 10th zone, the fourth zone and ninth zone, the fifth zone and eighth zone, and the sixth zone and seventh zone, are respectively used combinedly as a pair. The combined use of an outer circumferential zone and an inner circumferential zone as a pair allows most efficient use of the disk capacity. This point will be described in detail hereinafter.

Because the number of sectors per track for the respective zones is stored in the ZBR table 301, when a cylinder address is specified, then the number of sectors available on the track is determined. In this embodiment, 128 words data (1 word corresponds to 32 bits) are recorded in one sector.

On the other hand, the physical address table 302 shown in FIG. 8 is a table for correlating the logical sector number of the hard disk 201-i (this logical sector number is alternatively referred as logical block address) to the physical address. The physical address is referred as the address comprising the cylinder number, the medium number, and the sector number.

FIGS. 13A and 13B show an example of the physical address table 302. The logical sector number Lki is the number assigned sequentially to each sector of all the media in each hard disk 201-i, and as shown in FIG. 13A, the logical sector number Lki is specified by the cylinder number CYLki, the medium number MEDki, and the sector number SECki. FIG. 13B shows a detailed example. For example, a sector corresponding to the logical sector number of 2 is the sector at the position of cylinder number 0, medium number 0, and sector number 2. Therefore, the logical sector number is converted to the physical sector number, or conversely, the physical sector number is converted to the logical sector number with reference to the physical address table 302.

The allocation map 303 shown in FIG. 8 is a map for managing the address of recorded areas and un-recorded areas of all the media (disks) of the hard disk 201-i. Un-recorded areas of each disk is searched with reference to the allocation map 303.

The block map 304 is a map on the table for indicating the size of stored data, and a map for managing the map location on a disk for each block data (data to be recorded or data to be reproduced) having a block number indicated with k (an arbitrary natural number not exceeding the total number of the data) as shown in FIG. 14. One block data indicated with the block number k is, for example, the video data of one frame (an image having a prescribed size), and the block number k is the number (ID number) specified correspondingly to each frame data of the video data of all the channels. When a reproduction of a video data is requested, the map location on a disk can be specified with reference to the block number k.

As shown in FIG. 15, the block data for one frame comprises n subblock data and one error correction parity data, these data are recorded in different hard disks 201-i respectively. The map location of the parity data is specified by the disk IDDkp of the hard disk 201-i, the logical sector number Lkp which indicates recording start position on the area where the parity data is recorded, and the number of sectors Skp which indicates the size of the area where the parity data is recorded.

Similarly, the map location of the subblock having the number of k is specified by the disk IDDki of the hard disk 201-i, the logical sector number Lki which indicates the recording start position of the area where the subblock is recorded, and the number of sectors Ski which indicates the size of the area where the subblock is recorded.

Herein, n (number of divided video data formed from 1 frame video data) is prescribed as desired depending on the standard (NTSC or PAL) (quantity of data). Details will be described hereinafter.

FIG. 15 shows a detailed example of a block map 304 in which NTSC 1 frame video data comprising 1440×512 pixels is divided into 4 subblocks. In this example, the parity data P1 of the frame indicated with the block number (frame number) 1 is recorded from the start logical sector of number 0 on the hard disk indicated with the disk ID of 1 over an area of 567 sectors (outermost circumferential area). The data S1-1 of the first subblock of the frame indicated with the block number 1 is recorded from the start logical sector of 599600 on the hard disk indicated with the disk ID 2 over an area of 393 sectors (innermost circumferential area), similarly in the following, the data S1-2 of the second subblock of this frame is recorded from the start logical sector of the number 0 on the hard disk indicated with the disk ID 3 over an area of 567 sectors (outermost circumferential area), the data S1-3 of the third subblock is recorded from the start logical sector of the number 599600 on the hard disk indicated with the disk ID 4 over an area of 393 sectors (innermost circumferential area), and the data S1-4 of the fourth subblock is recorded from the start logical sector of the number 0 on the hard disk indicated with the disk ID 5 over an area of 567 sectors (innermost circumferential area).

The size of data for 1 subblock is basically ¼ of 1 frame data, however, 1 subblock data is not always the data constituted with successive ¼ pixel data of 1 frame video data. Of course, it is possible to constitute the pixel data of 1 subblock data with the pixel data of successive ¼ area of 1 frame video data, however, in such case, the impact which likely occurs when the pixel data is missed will be the larger. To avoid such problem, a plurality of packet transfer blocks comprising the pixel data on the prescribed area located dispersedly is collected out of 1 frame video data instead of successive areas to constitute 1 subblock. The size of each subblock is not always equal. This point will be described in detail hereinafter with reference to FIG. 43 and FIG. 44.

Next, processing for forming the block map 304 which is operated by the controller 262 of the CPU block 261 is described with reference to a flow chart shown in FIG. 16. In the following description, for example, in the case that hard disks 201-1 to 201-32 are not necessarily described discriminately, these hard disk are referred simply to as hard disk 201. Other devices involving a plurality of corresponding devices are also referred simply in the same manner.

The controller 262 previously determines the size of 1 subblock of the video data to be recorded, the average migration distance La of the head when SCAN schedule is operated, the seek time Ts (L) of a drive of the used hard disk 201, and the physical format (the number of cylinder, the number of sectors in 1 track, and the number of media which constitutes a cylinder) of the hard disk 201 as the format parameter (determination of the size of the subblock will be described hereinafter with reference to FIG. 27). With reference to this format parameter, the position of each subblock on the hard disk 201 is determined according to the sequence of the steps S11 to S5 shown in FIG. 16.

The average migration distance of the head is given by the following equation (1) from the total number Lt of cylinders of the hard disk 201 and the number of accesses N to be processed in 1 scanning (refer to FIG. 24(C) described hereinafter).

$$La = Lt/(N-1) \tag{1}$$

Figure 17:
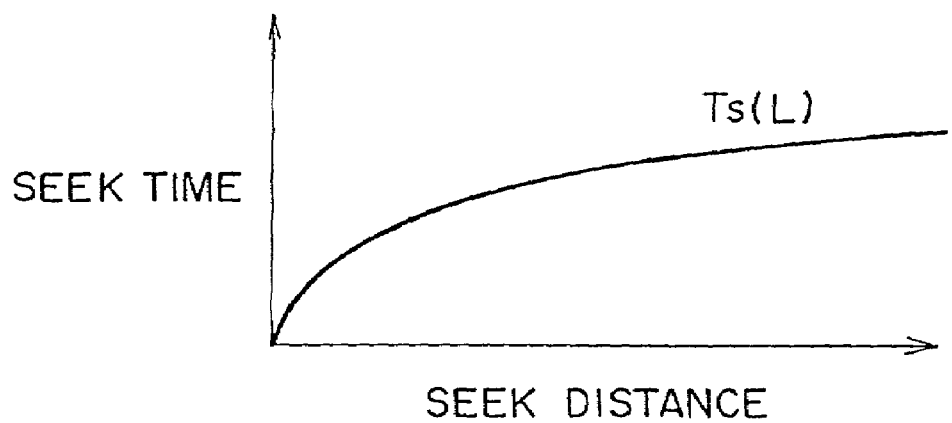
FIG. 17 is a graph for describing the characteristics of the seek time.

The seek time Ts (L) of the drive is a function of the seek distance L (the number of cylinders), the value is determined by the mechanical characteristics of the disk drive used. FIG. 17 shows an example. The number of access requests which are processed collectively in 1 scanning is determined depending on the character of applications used for the disk recorder 2, the required performance, and the quantity of usable data buffer 212. The larger the number of access requests N to be scanned collectively is, the more the random access performance of the hard disk is improved, however on the other hand, the larger the necessary quantity of data buffer is, the longer the response time is.

The number of subblocks (Bc) in 1 cylinder is calculated in the step S1 shown in FIG. 16. The total number of sectors in 1 cylinder is obtained by multiplying the number of sectors in a track by the number of media. Therefore, Bc is obtained by dividing the total number of sectors in 1 cylinder by the number of sectors necessary to store 1 subblock data.

Figure 18:
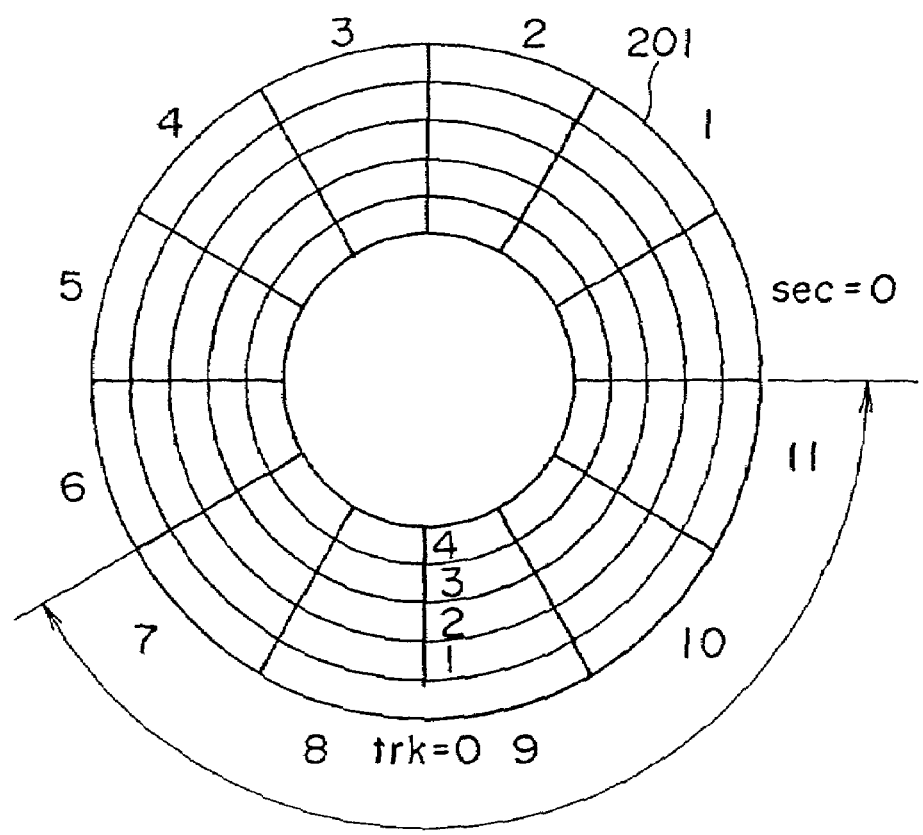
FIG. 18 is a diagram for describing the gap θgap.

In the step S2 the gap θgap is calculated. The gap θgap is an angular difference between the head sector and the tail sector of the subblock in the view from the center of the disk. For example, as shown in FIG. 18, the head of the shaded subblock is located at the sector "0" of the track "1", and the tail is located at the sector "6" of the track "2", therefore the gap θgap is 5/12 of a circumference, namely 5 π/6 radian.

Figure 19:
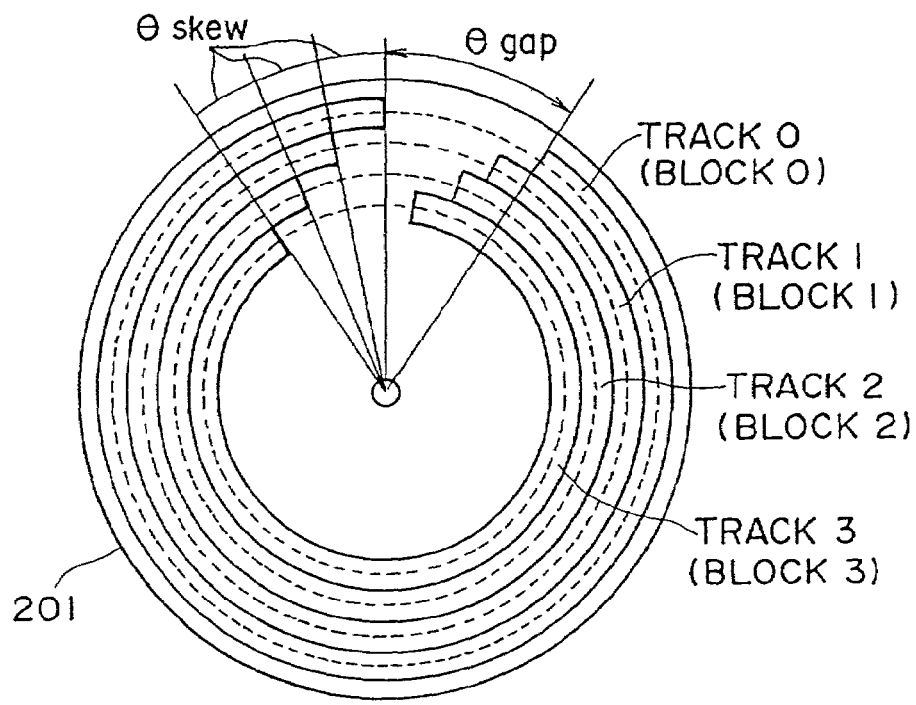
FIG. 19 is a diagram for describing the gap θgap and skew θskew.

The skew θskew is calculated in the step S3 based on the above-mentioned data. Herein, the skew θskew means the angular difference in the circumferential direction between heads of adjacent subblocks on the hard disk 201 in the view from the center of the disk as shown in FIG. 19. First, the data head starts from the position where writing or reading out of 1 subblock was ended and attains to the same angular position in the circumferential direction at the position (track) distant L cylinder distance in the radial direction from the start position, in this case, the time required for the data head to migrate Td (L) is represented by the following equation (2).

$$Td(L)(L \cdot Bc \cdot \theta skew + \theta gap + 2 \cdot m \cdot \pi)/\omega \tag{2}$$

Herein, L represents the seek distance in the unit of number of cylinders, Bc represents the number of subblocks in 1 cylinder, θskew represents the skew in radian unit, θgap represents the gap in radian unit, ω represents the rotation speed (radian/second) of the hard disk 201, and m represents an arbitrary integer that makes Td (L) positive.

Figure 20:
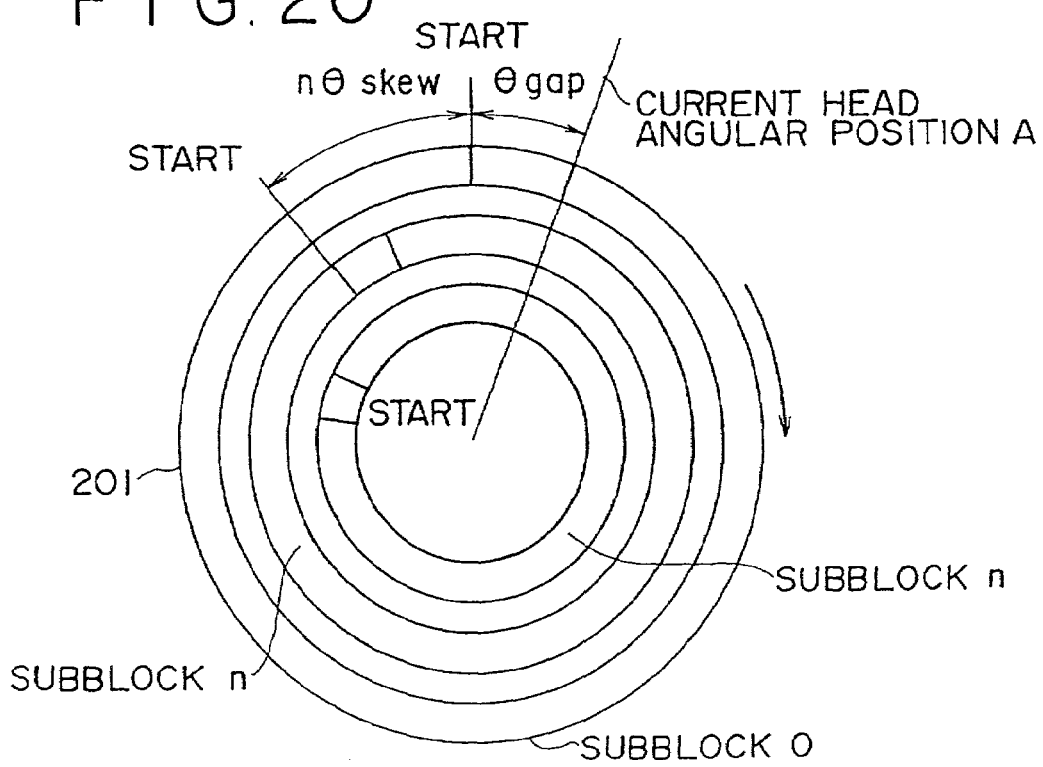
FIG. 20 is a diagram for describing the skew between a plurality of cylinders.

FIG. 20 describes the meaning of the above-mentioned equation (2) on the hard disk 201. In FIG. 20, it is assumed that just now an access to subblock "0" ended. When, the head is located at the angular position A in the view from the center. It is assumed that now the same subblock "0" receives an access again. It takes a time for the disk to rotate the gap θgap, and the waiting time is θgap/ω.

Figure 21:
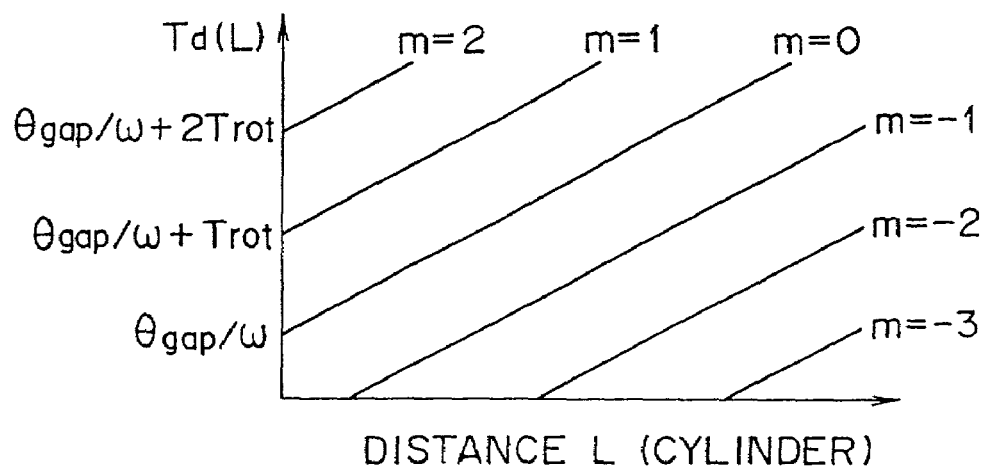
FIG. 21 is a graph for describing the relation between the gap θgap and the cylinder.

Further, to take an access to the head of the subblock "n" located inside by n tracks (subblock) from the subblock "0", the starting must wait for rotation of the hard disk 201 of the angular sum of n subblock skew (n θskew) from the start position of the subblock "0". It takes a time of n θskew/ω. Because the hard disk 201 is rotating, the data head attains to the position where the head is located at the time that is obtained by adding integral multiple of the rotational period (Trot) to the time obtained as described herein above. Because the migration through n subblocks is equivalent to the migration through n/Bc cylinders in the expression of the number of cylinders, a graph having the axis of abscissa for the number of cylinder and the axis of ordinate for waiting time for arriving of the head is obtained as shown in FIG. 21. The larger the skew θskew is, the larger the gradient of the straight lines is.

In the discussion described herein above, it is assumed that the position (angle) of the head in the circumferential direction is constant in the view from the center regardless of the distance from the center. Actually in some cases, the position is not constant exactly depending on the head mechanism, however, the influence is sufficiently small and usually negligible.

Figure 22:
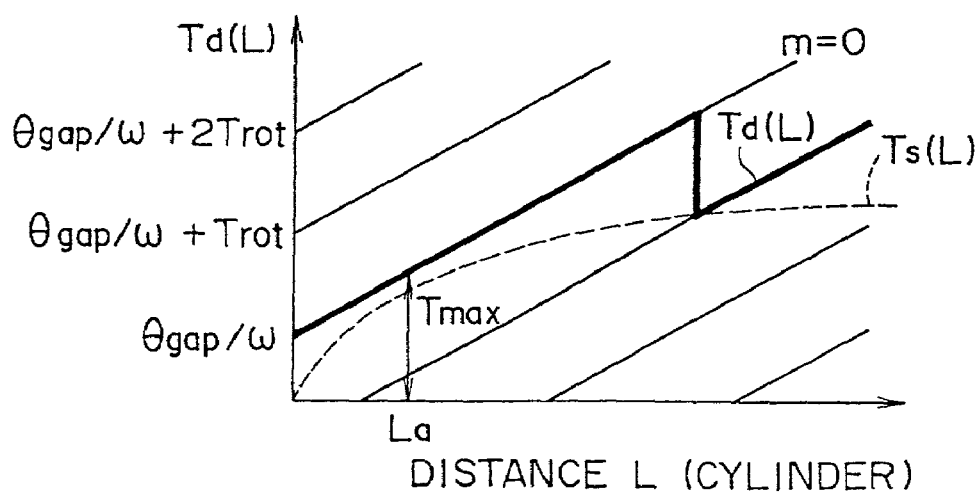
FIG. 22 is a graph for describing the relation between the gap θgap and the cylinder.

As shown in FIG. 21, the time required for the head of the subblock to attain to the position under the head is obtained for each cylinder by the above-mentioned equation (2). However, because it is required for the head to attain to the desired cylinder within the time, the waiting time is the time from the seek to the time when the head of the block appears first. This time is the overhead Td (L) which involves the seek and rotation waiting both. FIG. 22 shows an example, and the following equation represents the definition. The actual overhead (waiting time) Td (L) is shown with a thick line in FIG. 22. The function of the seek time Ts (L) is shown with a dashed line. In the drawing, Trot is 1 rotation period.

In the step S3-1, the equation (2) and the equation of the straight line for m=0 in FIG. 21, namely the equation represented by the following equation (3), are obtained.

$$Td(L) = (L \cdot Bc \cdot \theta skew + \theta gap)/\omega \qquad (3)$$

The subsequent steps S3-2, S3-3, and S3-4 is the step for selecting the skew θskew so that the straight line is always larger than the seek time Ts (L) and approximately touches the seek time Ts (L).

In detail, in the step S3-2, the controller 262 initializes the skew θskew to 0, and in the step S3-3, the magnitude of the seek time Ts (L) and the overhead Td (L) is compared. If the seek time Ts (L) is determined to be smaller than the overhead Td (L), then the sequence proceeds to the step S3-4, and the controller 262 increments the skew θskew by delta. The sequence returns to the step S3-3, the magnitude of the seek time Ts (L) and the overhead Td (L) are compared again.

As described herein above, the process of the step S3-3 and the step S3-4 is repeated until the seek time Ts (L) is determined to be equal to the overhead Td (L) or to be larger than the overhead Td (L). When the seek time Ts (L) is determined to be equal to the overhead Td (L) or to be larger than the overhead Td (L), the gradient of the straight line (skew θskew) for m=0 which is located nearest to the seek time Ts (L) and located above the seek time Ts (L) is obtained.

In the steps S4 and S5, the position of each subblock on the disk is determined over the entire area of the hard disk 201 using the skew θskew and the gap θgap obtained as described herein above. In the step S4, first the pointer of the physical address (cylinder/medium/sector) is initialized to (0/0/0). The next step S5 is a loop of repetition for all the subblocks, in the internal of the loop, first in the step S5-1, the logical sector number is obtained from the physical address with reference to the physical address table 302, and in the step S5-2, information such as logical sector number and physical address is written on the block map 304. Thereby, for example, the information of the first subblock (parity data P1) is written on the block map 304 shown in FIG. 15.

After completion of the above-mentioned steps, the pointer Ppa of the physical address is updated in the step S5-3 in preparation for the next subblock processing. In the step S5-4, whether all the subblocks are subjected to processing in the steps S5-1 to S5-3 is determined, and if not all the subblocks are subjected to the processing, then unprocessed subblocks are subjected to the processing in the steps S5-1 to S5-3. Herein, the location of the N-th subblock on the hard disk 201 is;

(1) behind the assigned subblock (in the case that the subblock is assigned sequentially from the outer circumference, on the inner circumference, and in the case that the subblock is assigned sequentially from the inner circumference, on the outer circumference) and (2) on the area having at the head the sector having the angular difference between the head of the 0-th block nearest to N θskew.

Next, the worst overhead in this embodiment is described.

FIG. 23 shows the overhead time of the disk on which subblocks are disposed as shown in FIG. 19. The axis of abscissa represents the seek distance, namely the number of cylinders L of the hard disk 201 across which the head moves, and the axis of ordinate represents the required time Td (L). The chain line represents the seek time Ts (L), and the solid line represents the total overhead time Td (L). The overhead time is the sum of the seek time Ts (L) and rotation waiting time Trd, the difference between the solid line and the chain line therefore represents the rotation waiting time Trd.

Figure 24:
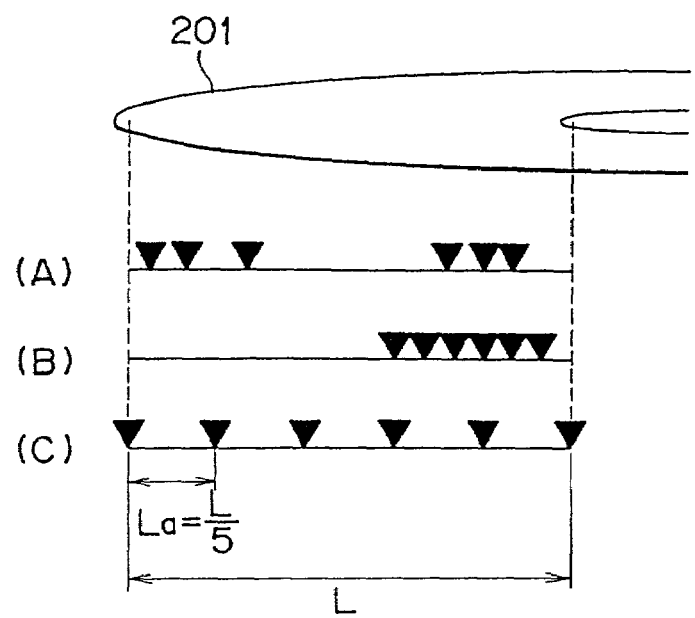
FIG. 24 is a diagram for describing the scheduling.

Generally, an access request arises anywhere on the hard disk 201. The place processed in one scanning has bias distribution as shown in FIG. 24(A) and FIG. 24(B), and conversely in some cases, has even distribution as shown in FIG. 24C. In the example shown in FIG. 24, to move between 6 access requests, 5 random accesses and associated overhead arise. For each the overhead shown in FIG. 22 with a thick line arises. The total over head for 5 random accesses is worst in the case that all the accesses distribute evenly as shown in FIG. 24(C) providing that the overhead function Td (L) is convex upward as shown in FIG. 23. The total overhead is smaller than this case when the distribution is bias. In other words, the case that the overhead arises repeatedly at the average migration distance La (=L/5) of the head makes the total overhead worst (maximum).

In the step S3 shown in FIG. 16, the skew θskew is selected so that the rotation waiting straight lines given by the above-mentioned equation (2) lies above the seek time Ts (L) and nearest to the seek time Ts (L). Thereby, Td (L) is minimized at the vicinity of the distance La, and the resultant worst overhead Tmax is minimized.

Figure 25:
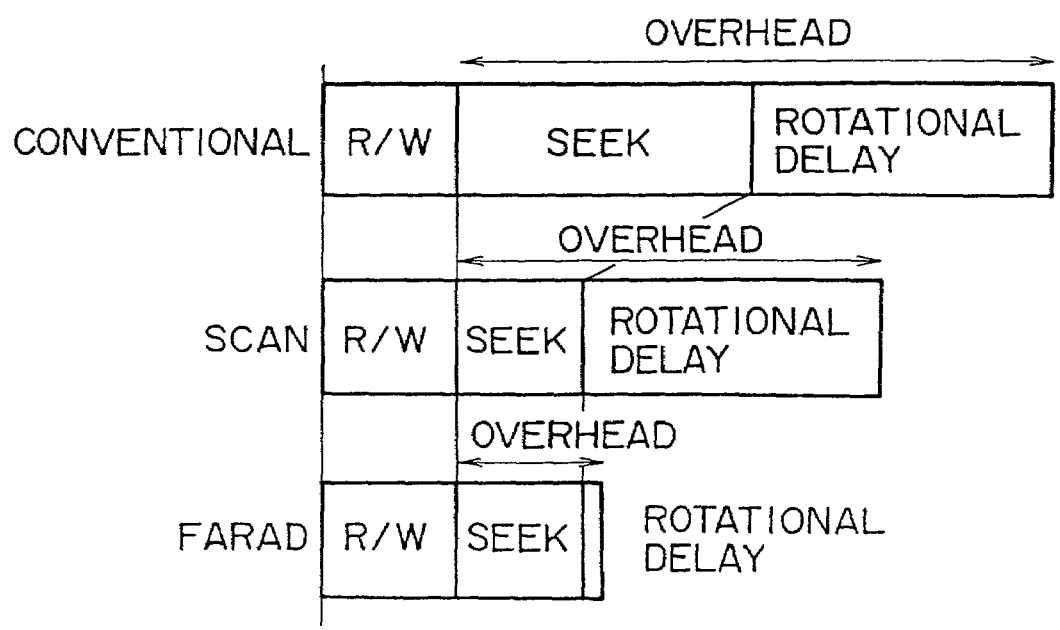
FIG. 25 is a diagram for describing the overhead.

FIG. 25 shows the length of overhead schematically in the case in which algorithm is used according to the above-mentioned method (FARAD system). As shown in FIG. 25, SCAN system in which a plurality of accesses is executed collectively from the outer circumference to the inner circumference in the order within the range of collected assesses, or conversely, from the inner circumference to the outer circumference in the order can realize the shorter seek time in comparison with conventional system in which access is executed in the order of arising, and therefore the overhead can be the shorter. However, this SCAN system can shorten the seek time in comparison with the conventional system, but can not shorten the rotation waiting time. On the other hand, the above-mentioned method (FARAD system) can shorten not only the seek time as well as the SCAN system but also the rotation waiting time in comparison with the conventional system (SCAN system), and thus the total overhead can be shortened in comparison with SCAN system.

As described herein above, in this embodiment, it is possible to suppress the overhead Td (L) for the head average migration distance La to the minimum by selecting the skew θskew and the gap θgap properly (so that the skew θskew corresponds to the gap θgap), and the rotation waiting time is minimized. In the process of the flow chart shown in FIG. 16, it is assumed that the size of the subblock is a given fixed value, but the size of the subblock is optional within a certain range. In this case, both the gap θgap and the skew θskew can be changed, the position of the straight line can be controlled more finely so as to be nearer to the seek time at the vicinity of the average migration distance La. This point will be described in detail hereinafter.

By applying the above-mentioned method, the overhead associated with migration between subblocks is improved greatly. However, in the case that the size of a subblock is large extending over a plurality of tracks and plurality of cylinders, the required time for changing track and migration time to the adjacent cylinder should be take into consideration. Because the required time for changing track and migration to the adjacent cylinder are constant respectively, by giving skew between tracks and between cylinders so that the data arrives just under the head after the time, the long rotation waiting time in a subblock associated with changing track and migration to the adjacent cylinder is suppressed.

Figure 26:
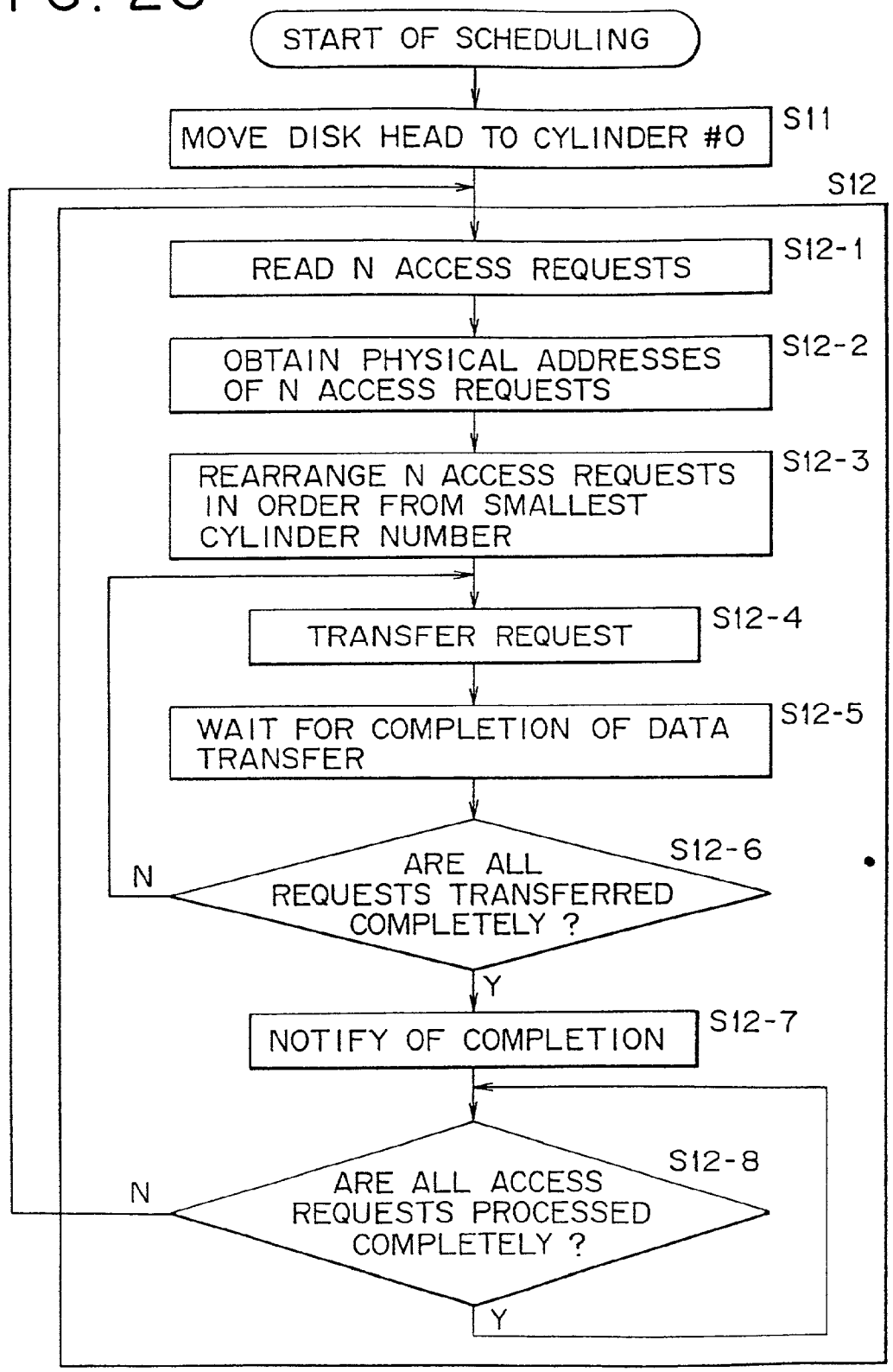
FIG. 26 is a flow chart for describing the scheduling processing of the controller shown in FIG. 7.

Next, the scheduling process for determining the access order of the head so that the migration distance of the head is minimized operated by the controller 262 is described. FIG. 26 shows a flow chart for operating the scheduling process. The controller 262 controls the SCSI controller 202 in the step S11, and the head of the hard disk 201 is migrated to the cylinder "#0". Next, the sequence proceeds to the step S12 in which scheduling is operated actually.

In the step S12-1 in the step S12, the controller 262 reads N access requests from the built-in access request buffer (not shown in the drawing) in the order of time from the earliest (old). In the access request buffer, access requests supplied from the host personal computer 3 are stored in the order of input. One access request has a subblock number to be subjected to access and the head address of the data buffer 212 used for data transfer. Number N is a constant which is given from the host personal computer 3 previously.

In the step S12-2, the controller 262 refers to the block map 304 for respective N access requests, and finds physical addresses (cylinder number, medium number, and sector number) of the subblocks to be subjected to access. Next, in the step S12-3, N access requests are re-arranged in the order of cylinder number from the smallest (from the outer circumference to the inner circumference). This operation realizes the SCAN algorithm schedule.

In the step S12-4, re-arranged these access requests are sent out to the hard disk 201 through the SCSI controller 202 in the order from the access request having the smallest cylinder number, and access and data transfer are operated actually. An access indication for one subblock is sent out, and after completion of data transfer in the step S12-6, then the next access indication is sent out. Whether transfer of all the requests is completed is determined in the step S12-6, if not all the requests are transferred, the sequence returns to the step S12-4, the same processing is operated. Such process is repeated N times, processing of the N access requests is determined to be completed in the step S12-6.

Next, in the step S12-7, completion of processing of the N access requests is informed to the host personal computer 3, and a series of processing relating to the N access requests is brought to an end.

Further, in the final step S12-8, whether all the access requests are processed completely and the access request buffer has been empty is determined. If there is some residual access requests, then the controller 262 returns to the step S12-1, and reads out the next N access requests and continues processing. If N access requests are not in the access request buffer, then the controller waits for accumulation of N requests in this step, and after completion of N request accumulation, the sequence returns to the step S12-1, and the same processing is operated.

Further, for example, the controller 262 improves the real time response speed of access additionally by changing the size of subblock so that the gap θgap is constant over the entire area from the outside to the inside of the hard disk 201.

Next, with reference to flow charts shown in FIG. 27 to FIG. 32, the process sequence in which the controller 262 arranges the k-th subblock on a prescribed track of a prescribed hard disk 201 is described.

First in the step S31, total n+1 hard disks 201 for storing the parity data served as error correction data and data of n subblocks are selected out of total m hard disks 201 (in the case of the embodiment shown in FIG. 7, m=32). In the example, first hard disks 201 in which the parity data is to be stored is selected, and next hard disks 201 on which the data of subblocks is arranged sequentially from the inner circumference and hard disks 201 on which the data of subblocks is arranged sequentially from the outer circumference are selected.

Numbers from 1 to n are assigned to respective subblocks, for example, subblocks having an odd number are arranged sequentially from the inner circumference on a hard disk 201, and subblocks having an even number are arranged sequentially from the outer circumference on a hard disk 201. The data is arranged on a hard disk 201 with changing the hard disk depending on the data to avoid concentrated distribution of subblocks on a limited number of hard disks 201.

Figure 27:
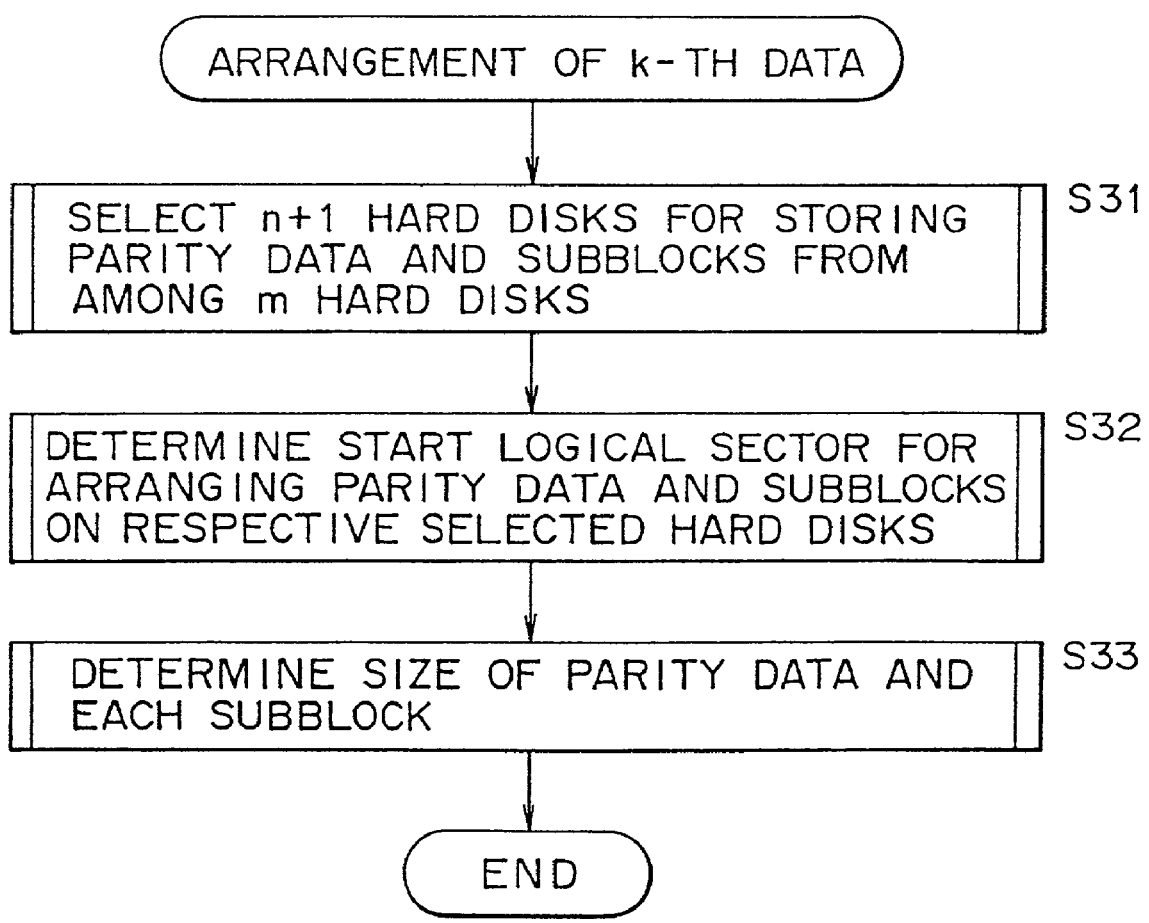
FIG. 27 is a flow chart for describing the arrangement processing of the k-th data of the controller shown in FIG. 7.
Figure 28:
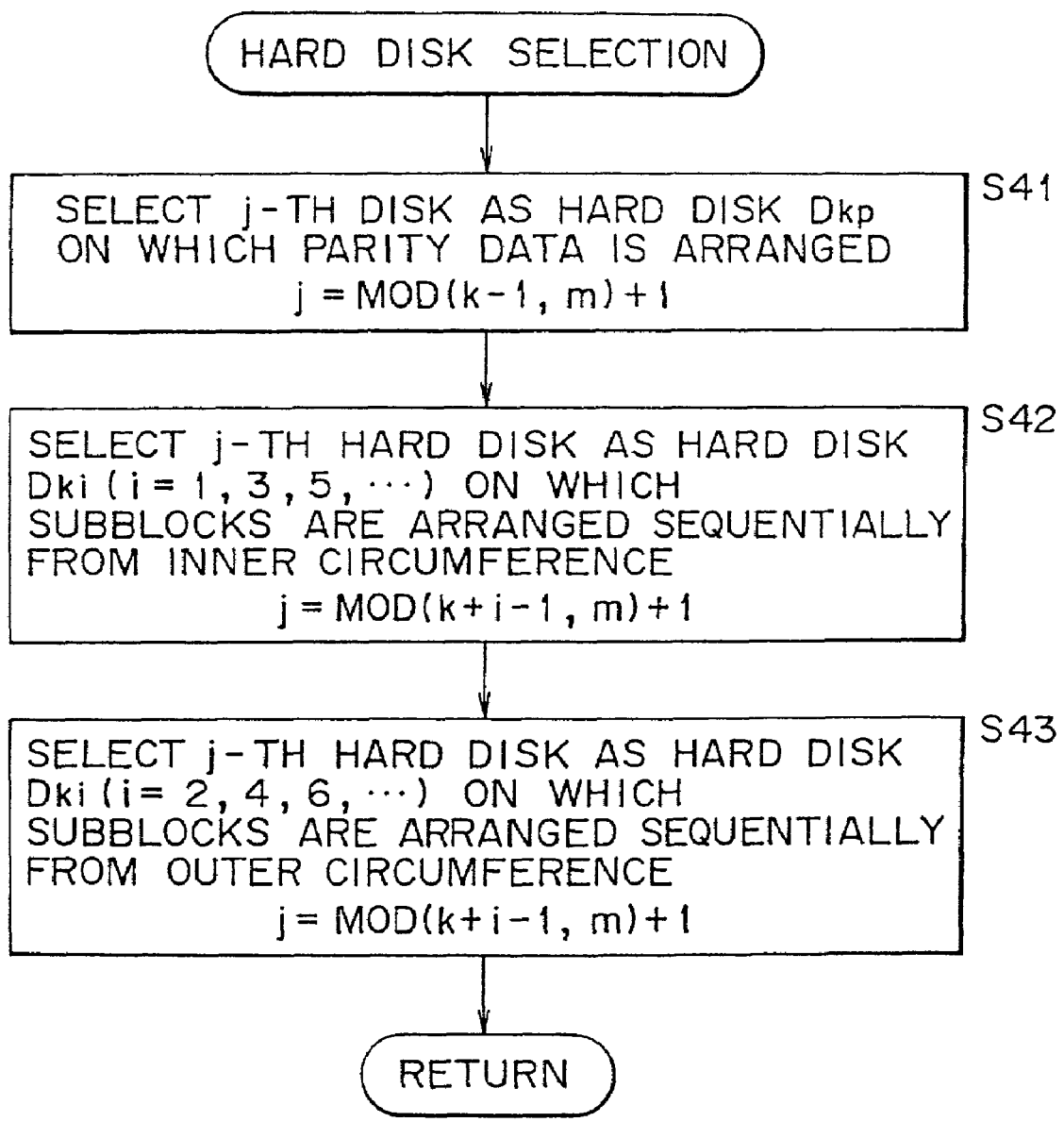
FIG. 28 is a flow chart for describing the detailed processing of the step S31 shown in FIG. 27.

FIG. 28 is the flowchart for describing the detailed processing of the step S31 shown in FIG. 27. In detail, in the step S41, a hard disk 201 having the number j represented by the following equation (4) is selected as a hard disk 201 on which the parity data is arranged.

$$j = MOD(k-1, m) + 1 \qquad (4)$$

Herein, MOD is an operator for calculating the remainder formed when k−1 is divided by m (the total number of hard disks 201).

By operating this processing, for example it is assumed that the number of hard disks 201 m is 32, hard disks 201 are selected in the order such as, j=1, 2, 3, . . . , 31, 32, 1, 2, . . . .

Next, in the step S42, the j-th hard disk 201 represented by the following equation (5) is selected as a hard disk 201 on which the i-th (i=1, 3, 5, . . . ) subblock data is arranged sequentially from the inner circumference.

$$j = MOD(k+i-1, m) + 1 \qquad (5)$$

Thereby, for example, in the case of i=1 (the first subblock is recorded), hard disks 201 are selected in the order of j, such as 3, 4, 5, . . . , 32, 1, 2, . . . , and in the case of i=3 (the third subblock is recorded), hard disks 201 are selected in the order such as 4, 5, 6, . . . , 32, 1, 2, . . . .

Next, the sequence proceeds to the step S43, the j-th hard disk 201 represented by the above-mentioned equation (5) is selected as a hard disk 201 on which the i-th (i=2, 4, 6, . . . ) subblock data is arranged sequentially from the outer circumference.

Thereby, for example, in the case of i=2 (the second subblock is recorded), hard disks 201 of j=3, 5, . . . , 32, 1, 2, . . . are selected, and in the case of i=4 (the fourth subblock is recorded), hard disks 201 of j=5, 6, 7, . . . , 32, 1, 2, . . . are selected sequentially.

As described herein above, by using tracks on the outer circumference and tracks on the inner circumference alternately in the form of pair, it is possible to make the size of subblock on the inner circumference smaller than the size of subblock on the outer circumference, and the gap θgap of subblocks is made constant.

In the flow chart shown in FIG. 28, subblocks which are arranged sequentially from the inner circumference and subblocks which are arranged sequentially from the outer circumference are determined alternately for arranging the subblock data, however, alternation is not necessarily required as long as the arrangement is in good balance. In detail, subblocks are arranged sequentially from the inner circumference in the order on a hard disk 201, and the next residual subblocks are arranged sequentially in the order from the outer circumference on the hard disk 201.

Further, j-th hard disk 201 represented by the above-mentioned equations (4) and (5) is not necessarily selected as long as subblocks are distributed concentratedly on a limited number of hard disks 201. For example, hard disks 201 on which subblocks are arranged sequentially from the inner circumference are selected out of hard disks 201 where the inner circumference is used not heavily, on the other hand, hard disks 201 on which subblocks are arranged sequentially from the outer circumference are selected out of hard disks 201 where the outer circumference is used not heavily, this method is effective. Anyway, the parity data is arranged sequentially from the outer circumference on the hard disk 201 selected in the step S41.

As described herein above the hard disk 201 is determined, then the sequence returns and proceeds to the step S32 shown in FIG. 27.

In the step S32, the start logical sector from which arrangement of the parity data and subblock data starts is determined on each hard disk 201.

Figure 29:
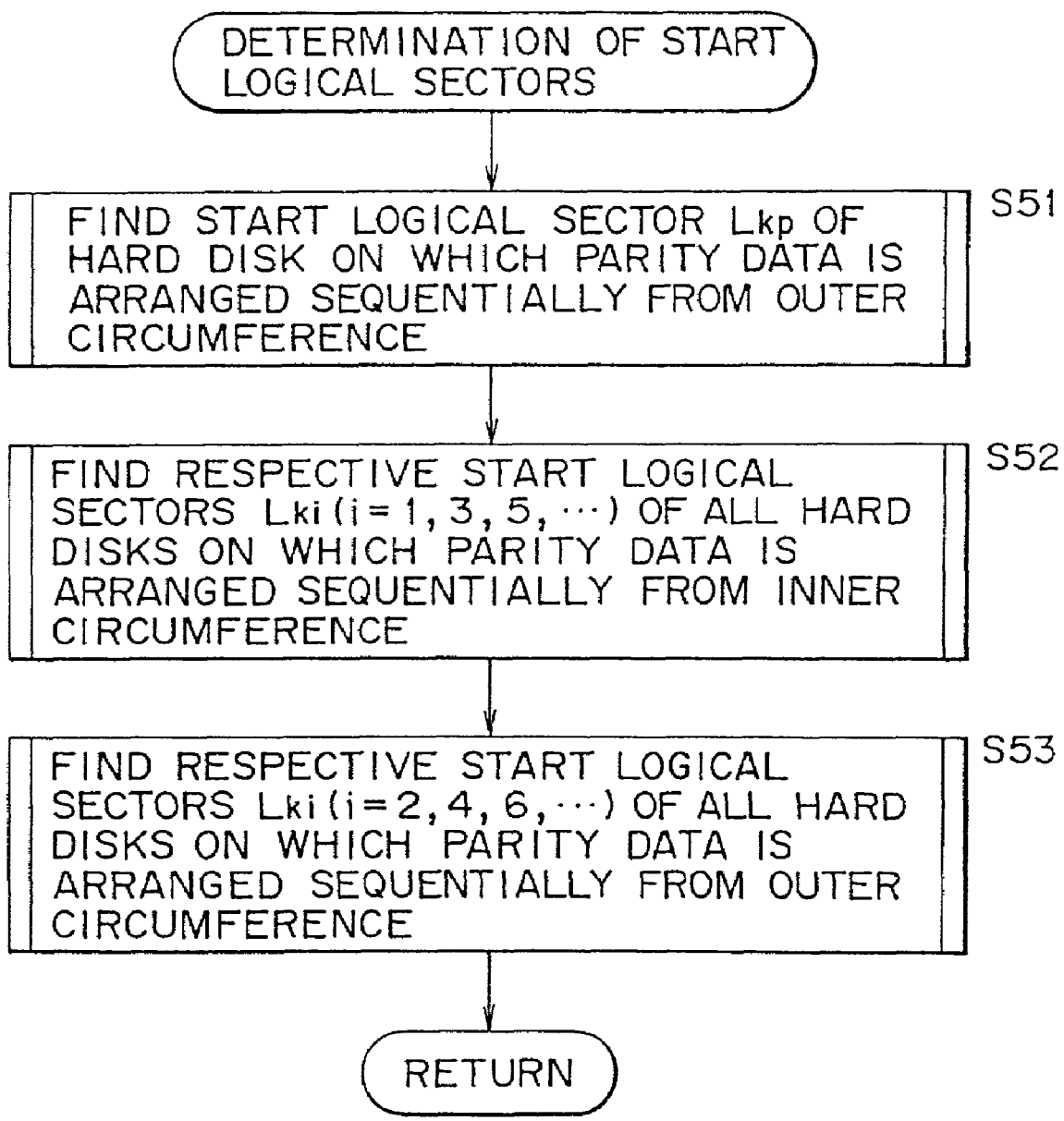
FIG. 29 is a flow chart for describing the detailed processing of the step S32 shown in FIG. 27.

FIG. 29 is a flow chart for describing process sequence for determining the start logical sector. First in the step S51, the start logical address Lkp is obtained on a hard disk 201 on which the parity data is arranged sequentially from the outer circumference.

Figure 30:
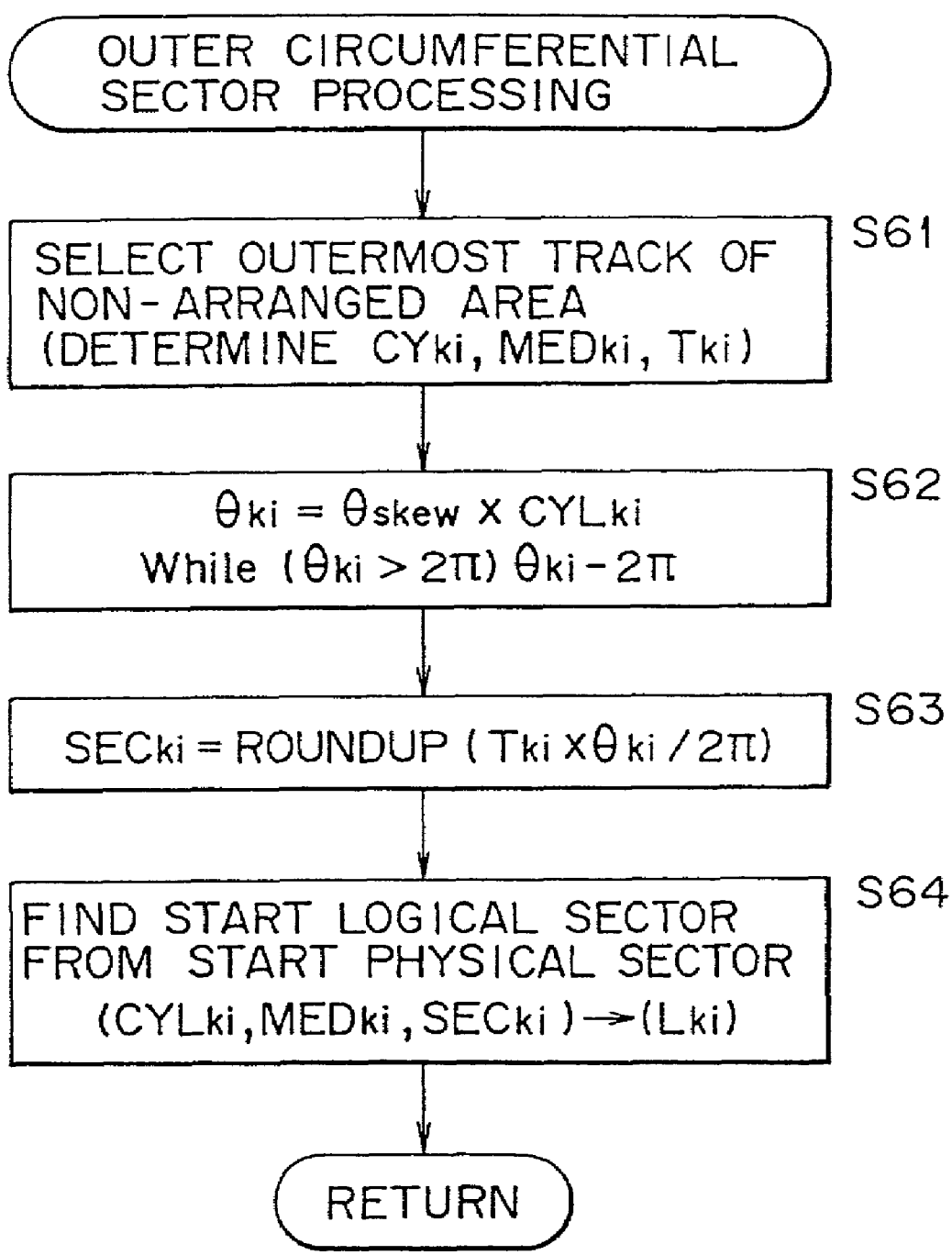
FIG. 30 is a flow chart for describing the detailed processing of the step S51 shown in FIG. 29.

FIG. 30 is a flow chart for describing the detailed processing in the step S51 shown in FIG. 29. First in the step S61, the outermost track out of non-arranged areas where no subblock (parity data) is arranged is selected as the track on which the subblock (in this case, parity data) is to be arranged. Non-arranged areas are found based on the allocation map 303. Thereby, the cylinder number (CYlki) and medium number (MEDki) of the physical sector address are determined, and the number of sectors (Tki) per 1 track on this map location is found with reference to the ZBR table 301.

Next, in the step S62, based on the cylinder number (CYLki) and the optimal skew (θskew) value and the following equation (6), the angle Oki (the number of cylinders between both tracks is CYLki) between the head of the outermost circumferential track (cylinder number CYLki) in the non-arranged areas selected in the step S61 and the head of the physical outermost circumferential track (track on which the data of the first subblock is recorded) (track having the cylinder number 0) is calculated.

$$\theta ki = \theta skew \times CYLki \qquad (6)$$

However, if θki>2π, then processing θki=θki−2π is repeated until the relation θki<2π is satisfied.

Next, the sequence proceeds to the step S63, and using the angle θki calculated by the equation (6) and the number of sectors per 1 track (Tki), and based on the following equation (7), the sector number (SECki) is calculated.

$$SECki = ROUNDUP(Tki \times \theta ki/2\pi) \qquad (7)$$

Herein ROUNDUP represents an operator for calculating an integer which is obtained by rounding-up a fraction.

Next in the step S64, with reference to the physical address table 302 (FIGS. 13A and 13B), the logical sector address (Lki) (in this case, Lkp) is determined from the physical sector address (CYLki, MEDki, SECki) calculated in the process of the steps S61 to S63, and the sequence proceeds to the return.

Next, the sequence proceeds to the step S52 shown in FIG. 29, the start logical sector address Lki (i=1, 3, 5, . . . ) is calculated respectively for all the hard disks 201 of successive arrangement from the inner circumference.

Figure 31:
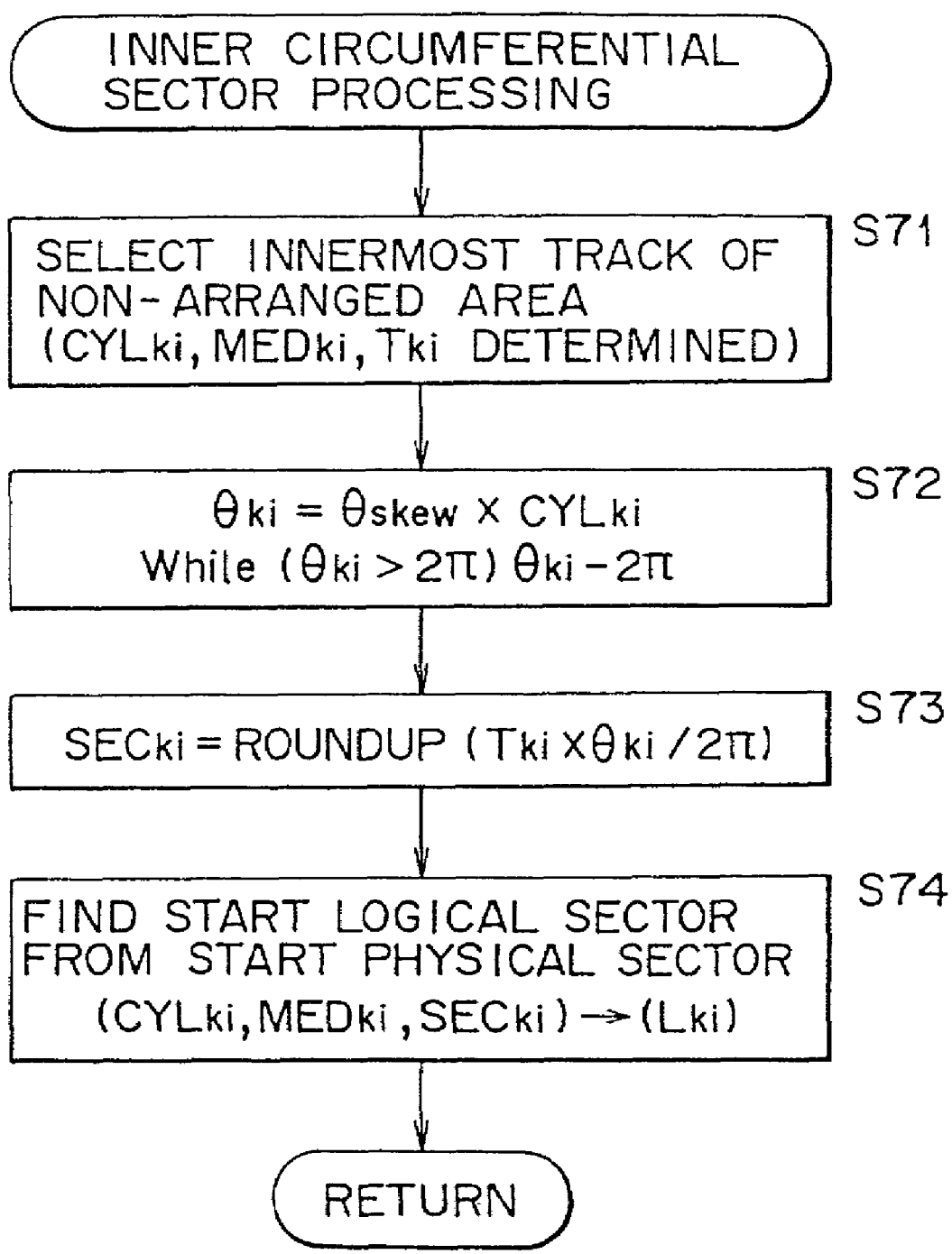
FIG. 31 is a flow chart for describing the detailed processing of the step S52 shown in FIG. 29.

FIG. 31 is a flow chart for describing the detailed processing in the step S52 shown in FIG. 29. First in the step S71, the innermost circumferential track on the non-arranged areas is selected with reference to the physical address table 302 (FIGS. 13A and 13B) as a track on which subblocks are arranged. Thereby, the cylinder number (CYLki) and medium number (MEDKki) of the physical sector address are determined, and the number of sectors (Tki) per 1 track at the map location is found with reference to the ZBR table 301.

Next in the step S72, an angle θki between the head of the innermost circumferential track on the non-arranged areas selected in the step S71 and the head of the physical innermost circumferential track (the track on which the data of the first subblock is recorded) is determined, and then the sector number (SECki) is determined in the step S73. In the step S74, the logical sector address (Lki) is determined based on the determined physical sector address (CYLki, MEDki, SECki), and the sequence proceeds to the return. The above-mentioned processing in steps S72 to S74 is basically the same as the processing in the steps S62 to S64 shown in FIG. 30 excepting that the track is selected sequentially from the inner circumference instead of the outer circumference, and the detailed description is omitted.

Next, the sequence proceeds to the step S53 shown in FIG. 29, the start logical sector address Lki (i=2, 4, 6, . . . ) for all the hard disks 201 on which the data of subblocks is arranged sequentially from the outer circumference is determined respectively. The process sequence is the same as that described hereinbefore with reference to the flow chart shown in FIG. 30, and the detailed description is omitted. After completion of the processing, the sequence proceeds to the return.

In the exemplary processing shown in FIG. 29 to FIG. 31, the track on which subblocks are arranged is selected out of the outermost circumferential tracks on the non-arranged areas in the case that subblocks are arranged sequentially from the outer circumference on tracks, and the track on which subblocks are arranged in selected out of the innermost circumferential tracks on the non-arranged areas in the case that subblocks are arranged sequentially from the inner circumference on tracks, however, the outermost circumferential track and the innermost circumferential track are not necessarily selected. Because for example, in the case of ZBR format, the number of sectors per 1 track is the same as long as they are in the same zone, and the size of subblocks and the gap value are the same respectively.

The start logical sector address is determined as described herein above, and next, the sequence proceeds to the step S33 shown in FIG. 27, and the parity data and the size of subblocks are determined. The process sequence to determine the size of subblocks will be described hereinafter with reference to the flow chart shown in FIG. 32.

Next, what size (the number of sectors) of subblocks (including the case of parity data) should be is considered. First, the sum of the size of subblocks is equal to the data size of original 1 block. In detail, assuming that the size of subblocks (the number of sectors) is Ski (i=1, 2, 3, . . . , n) and the data size (the number of sectors) of original 1 block is S, then S is represented by the following equation (8).

$$Sk1+Sk2+, \ldots, +Skn=S \quad (8)$$

On the other hand, the read out time or writing time of respective subblocks is to be equal, the gap value of respective subblocks should be equal. In other words, the following equation (9) should hold.

$$Sk1/Tk1=Sk2/Tk2=, \ldots, =Skn/Tkn \quad (9)$$

In the above-mentioned equation (9), Tki (i=1, 2, 3, . . . , n) is the number of sectors of a track on which i-th subblock is arranged.

From the equation (8) and the equation (9), the number of sectors Ski of subblocks which results in the same gap θgap value for respective subblocks is given by the following equation (10).

$$Ski=S \times Tki/T \quad (10)$$

wherein T=Tk1+Tk2+, . . . , +Tkn.

The number of sectors Ski is given actually in the form of integer, the respective size requires some fine adjustment.

On the other hand, the size of parity data Skp is given by the following equation (11) if the size of subblocks has been determined.

$$Skp=MAX(Sk1, Sk2, \ldots, Skn) \quad (11)$$

In the equation (11), MAX is an operator to determine the largest number of sectors among the size of subblocks Sk1 to Skn.

Because it is ensured that the parity data is arranged on the outer circumferential track of a hard disk 201 based on the operation in the step S31 and the step S32 shown in FIG. 27, it is obvious that the following equation (12) holds.

$$Sk1/Tk1=Sk2/Tk2=, \ldots, =Skn/Tkn=Skp/Tkp \quad (12)$$

wherein Tkp is the number of sectors of the track on which the subblock Skp is arranged.

Figure 32:
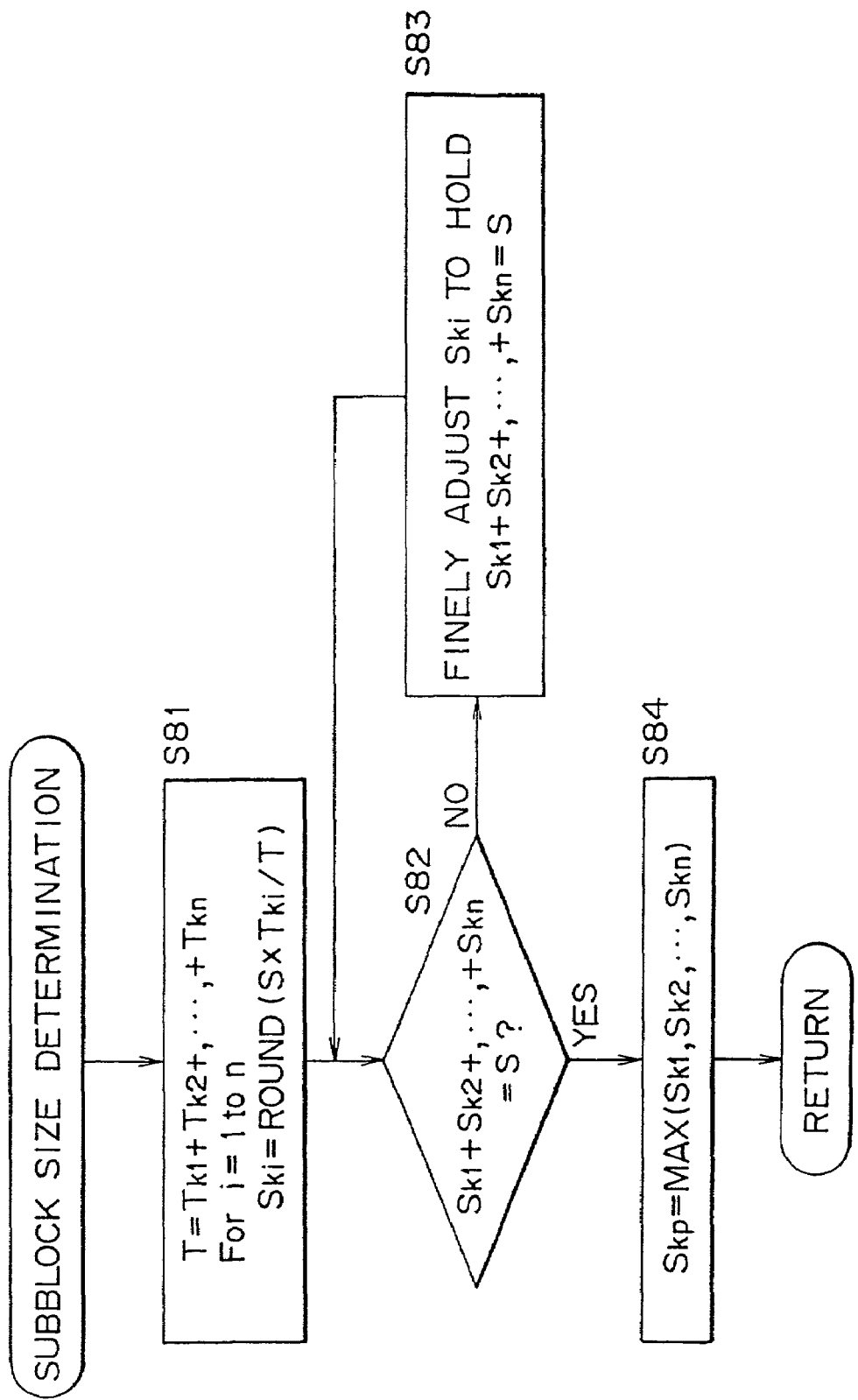
FIG. 32 is a flow chart for describing the detailed processing of the step S33 shown in FIG. 27.

FIG. 32 shows a flow chart for realizing the sequence for determining the above-mentioned subblock size. First in the step S81, the sum of the number of sectors Tki (i=1, 2, . . . , n) per 1 track of the track corresponding to the map location where n subblocks are arranged is calculated. Next, the calculation represented by the above-mentioned equation (10) is operated for the variable i of 1 to n, and the size Ski (i=1, 2, . . . , n) of respective subblocks is obtained.

Next, the sequence proceeds to the step S82, the calculation represented by the above-mentioned equation (8) is operated, and whether the sum of the size Ski of respective subblocks obtained in the step S81 is equal to the data size S of original 1 block is determined. If the sum of the size Ski of respective subblocks is determined to be not equal to the data size S of original 1 block, then the sequence proceeds to the step S83, and the size Ski of respective subblocks is slightly changed so that the sum of the size Ski of respective subblocks becomes equal to the data size S of original 1 block. Then, the sequence returns to the step S82, the processing of the step S82 and the step S83 is repeated until the sum of the size Si of respective subblocks is determined to be equal to the data size S of original 1 block. on the other hand, if the sum of the size Ski of respective subblocks is determined to be equal to the data size S of original 1 block, then the sequence proceeds to the step S84, the size Skp of the parity data is obtained. In detail, the largest size among subblocks Ski is regarded as the size Skp of the parity data.

After completion of the processing in the step S84, the sequence proceeds to the return. Thus, the processing of the step S33 in the flow chart shown in FIG. 27 is completed, and all the processes are completed.

As described herein above, the size of subblocks arranged on the inner circumference is made smaller and the size of subblocks arranged on the outer circumference is made larger so that the gap θgap of respective subblocks is equal to each other on respective hard disks 201.

FIG. 33 shows an example of subblocks distributed on hard disks 201 in the manner as described herein above. Herein, the number of hard disks m is 6, and the number of subblocks is 4.

The parity data on the first frame is arranged on the hard disk 201-1, and the corresponding 4 subblocks are arranged separately on the hard disks 201-2 to 201-5. The parity data arranged on the hard disk 201-1 and subblocks arranged on the hard disks 201-3 and 201-5 are placed on the outermost track, and subblocks arranged on the hard disks 201-2 and 201-4 are placed on the innermost track.

The parity data on the second frame is arranged on the hard disk 201-2, and subblocks are arranged on the hard disks 201-3 to 201-6, and the respective locations are on outer circumference, inner circumference, outer circumference, inner circumference, and outer circumference in the order. The parity data on the third frame is arranged on the hard disk 201-3, and subblocks are arranged on the hard disks 201-4 to 201-6 and hard disk 201-1, and the respective locations are on the outer circumference, inner circumference, outer circumference, inner circumference, and outer circumference in the order. Similarly in the following, the data on respective frames is arranged, and the data on the last frame is arranged, for example, on the hard disks 201-3 to 201-6 and hard disk 201-1 on the middle of the cylinder.

Based on insight into the parity data and subblocks arranged on one hard disk 201, it is found that the time required to read out and write subblocks is approximately equal because the gap θgap value of respective subblocks is approximately equal.

In the above-mentioned embodiment, the actual time required to read out and write the parity data and subblocks is made equal regardless of the location of data stored on a hard disks 201 as described herein above.

Further, in the above-mentioned embodiment, the data is scanned from the outer circumference to the inner circumference for access to the data, however alternatively, the data may be scanned from the inner circumference to the outer circumference. In this case, the optimal skew for access to data can be set with migrating the head from the inner circumference to the outer circumference.

Next, the operation of the RAID controller 282 for generating the parity data and correcting errors using the parity data is described. For example, as shown in FIG. 15, the size of a subblock recorded on the outer circumference is larger than the size of a subblock recorded on the inner circumference, and one block is divided into 4 subblocks #1 to #4.

The size of a parity data is set so as to be equal to the size of the largest subblock among divided subblocks.

Figure 34A:
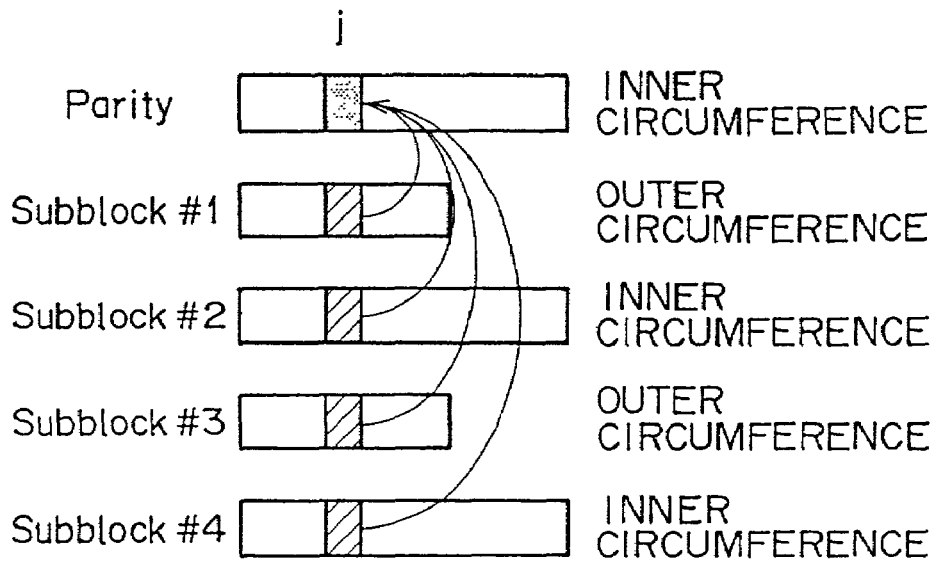
FIGS. 34A and 34B are diagrams for describing generation of the parity data.
Figure 34B:
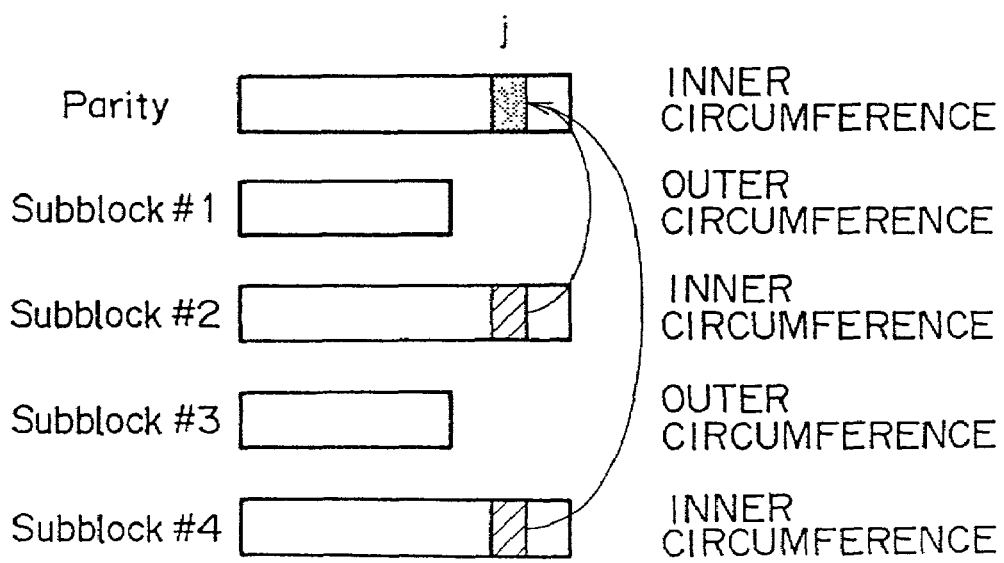

Basically, the j-th parity data Pj is formed from the j-th data of respective subblocks. As shown in FIG. 34A, in the case that the value of j is small, because j-th data corresponding to all the subblocks exist, the parity data Pj is formed from the data of all the subblocks #1 to #4. On the other hand, in the case that the value of j is larger as shown in FIG. 30(B), no j-th data of subblocks #1 and #3 exist.

In such case, the parity data Pj is formed from subblocks #2 and #4 having the size of j or larger based on the j-th data. Alternatively, the pre-determined prescribed data is added to the subblocks #1 and #3, and the parity data Pj is formed from the data of all the subblocks. Various algorithms for forming the parity data have been known, however, it is not necessary to discuss the detail and the description is omitted.

Figure 35A:
FIGS. 35A and 35B are diagrams for describing error correction using the parity data.

Next, the operation for correcting errors are described herein under. For example, in the case that the j-th data of a certain subblock is an error, basically the error is corrected using the j-th data of other subblocks and parity data. For example, as shown in FIGS. 35A and 35B, in the case that the value of j is small, because the parity data is formed from the j-th data of all the subblocks, the erroneous jth data of the subblock #4 is corrected using the j-th data of the parity data and the non-erroneous j-th data of all the subblocks #1 to #3.

Figure 35B:
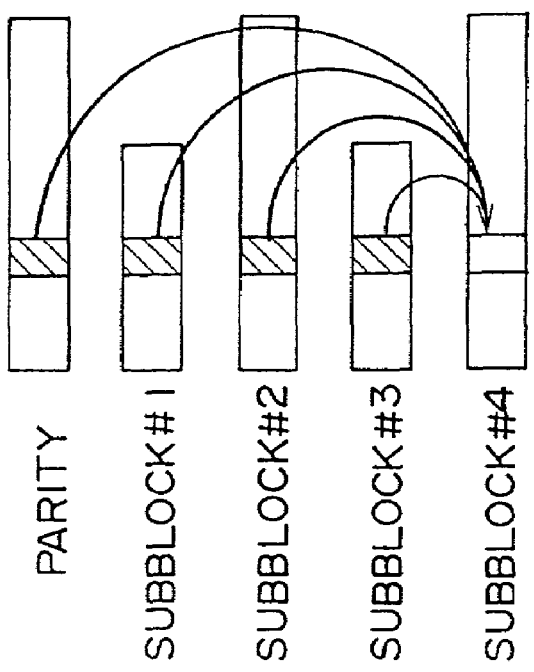

On the other hand, as shown in FIG. 35B, in the case that the value of j is larger, because the parity data is formed from the j-th data of subblocks having the size of j or larger, the erroneous j-th data of the subblock #4 is corrected using the non-erroneous subblock #2 among subblocks having the size of j or larger and the parity data.

Figure 36:
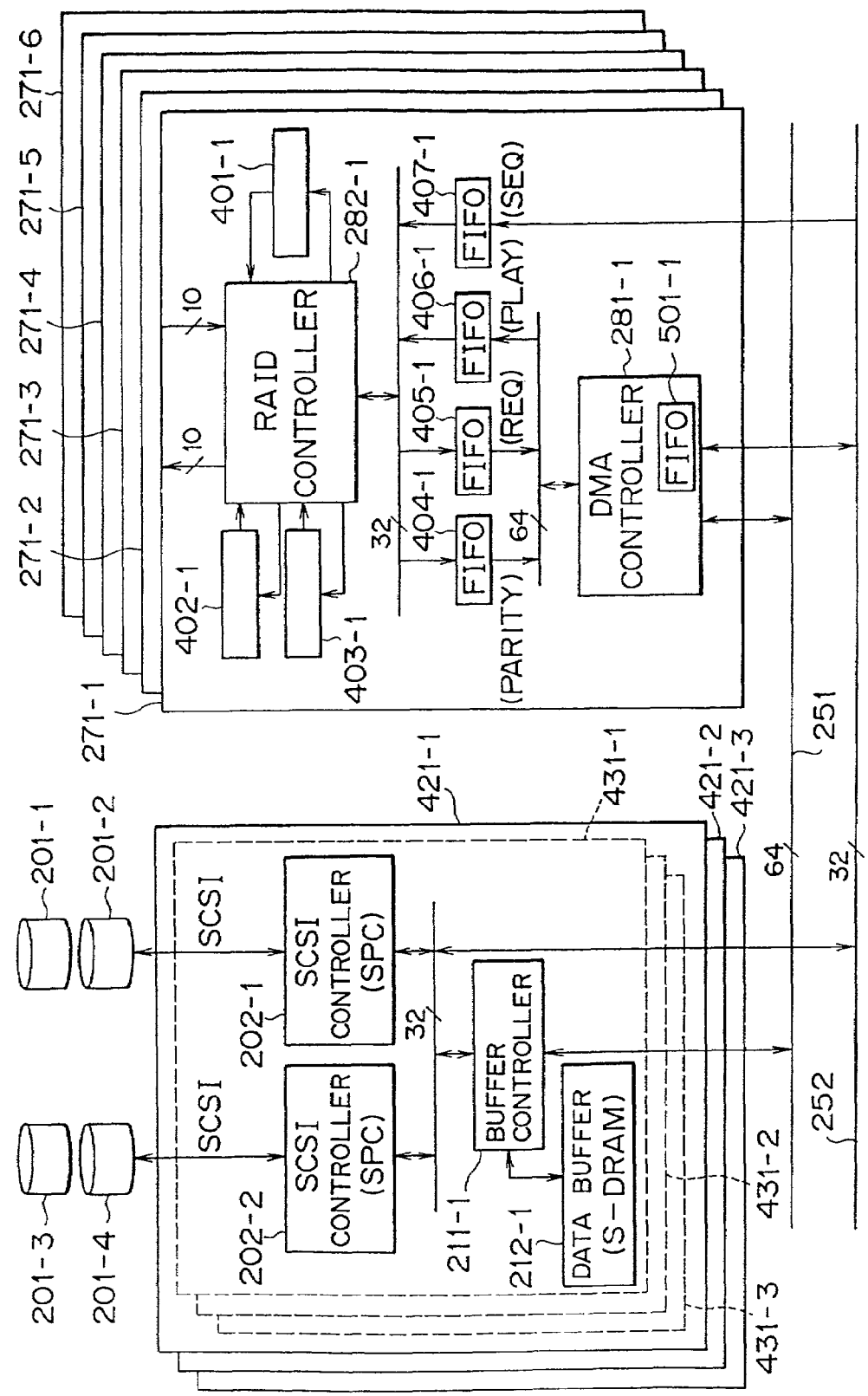
FIG. 36 is a block diagram for illustrating bit conversion processing of the RAID controller shown in FIG. 36.

In this embodiment, forming of such parity data and error correction processing using the parity data are carried out in real time. FIG. 36 shows the structure for operating such processing.

As shown in FIG. 36, the RAID controller 282-1 of the video block 271-1 is provided with delay elements 401-1 to 403-1 for delaying the data by 1 packet transfer block. The RAID controller 282-1 generates the parity data from the pixel data supplied from the video processing section 283-1 though a 10 bit bus, supplies it to the FIFO 404-1 though a 32 bit bus, and supplies the pixel data to the FIFO 405-1 though a 32 bit bus. The RAID controller 282-1 processes the pixel data (reproduction data) supplied from the DMA controller 281-1 though a 64 bit bus and an FIFO 406-1 for error correction based on the parity data, and supplies it to the video processing section 283-1 in 10 bit pixel data unit.

Figure 37A:
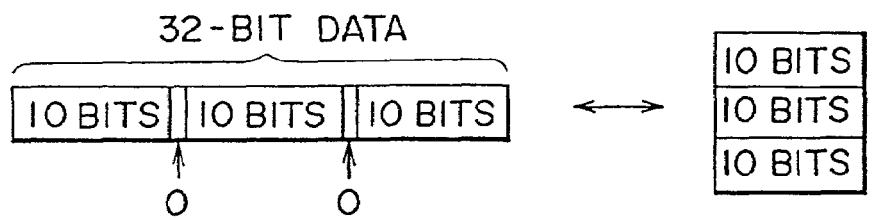
FIGS. 37A and 37B are diagrams for describing bit conversion processing of the RAID controller shown in FIG. 36.
Figure 37B:
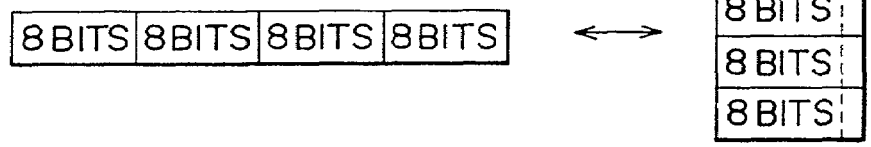

FIGS. 37A and 37B show an exemplary table of a conversion processing of 10 bit data and 32 bit data in the RAID controller 282-1. In the case that the first mode is set, when the data is supplied in 10 bit unit to the RAID controller 282-1 from the video processing section 283-1 as shown in FIG. 37A, the RAID controller 282-1 collects 3 10 bit unit data, and interpolates a 1 bit dummy data of 0 between the first 10 bit data and second 10 bit data and interpolates a 1 bit dummy data of 0 between the second 10 bit data and the third 10 bit data to form the data of total 32 bits. Conversely, when a 32 bit data is supplied from the bus, the RAID controller 282-1 divides the 32 bit data into 3 divided data of 10 bits with exclusion of the 11-th bit and the 22nd bit, and processes the divided data.

On the other hand, in the case that the second mode is set, the RAID controller 282-1 ignores the lower 2 bits out of the input data of 10 bits as shown in FIG. 37B, and combines 4 groups of 8 bit data to from a 32 bit data. Conversely, when a 32 bit data is supplied, the RAID controller 282-1 divides this data into data of 8 bits, adds 2 bit dummy data to each 8 bit data to from 10 bit data.

The RAID controller 282-1 and the DMA controller 281-1 are connected each other through FIFO's 404-1 to 406-1. The RAID controller 282-1 side of the FIFO's 404-1 to 406-1 is structured with a 32 bit bus, and the DMA controller 281-1 side is structured with a 64 bit bus. Because each FIFO has 32 bit structure, for example, the FIFO 404-1 delivers the 32 bit parity data supplied first to the DMA controller 281-1 through, for example, the higher 32 bit bus of the 64 bit bus, and supplies the next input 32 bit parity data to the DMA controller through the lower 32 bit bus of the 64 bit bus.

The FIFO 405-1, similarly to the FIFO 404-1, delivers the first 32 bit pixel data supplied from the RAID controller 282-1 to the DMA controller 281-1 through the MSB side 32 bit bus of the 64 bit bus, and delivers the next input 32 bit pixel data to the DMA controller 281-1 through the LSB side 32 bit bus of the 64 bit bus.

Figure 38:
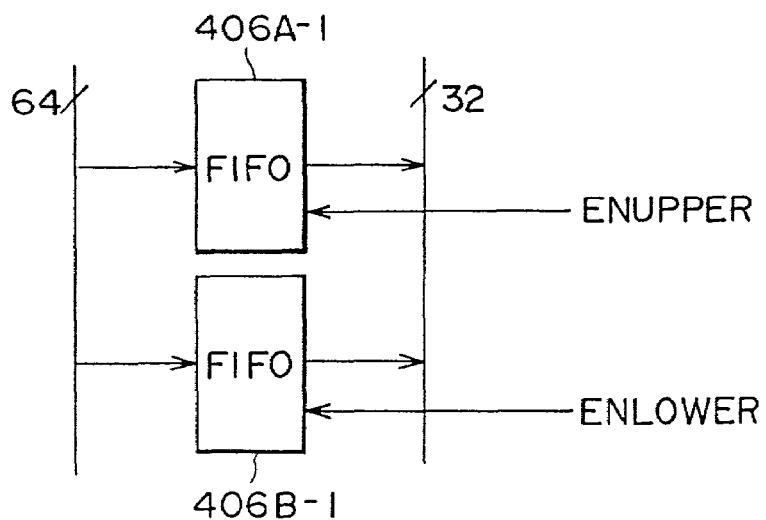
FIG. 38 is a diagram for describing operation of the FIFO shown in FIG. 36.

On the other hand, the FIFO 406-1, which supplies the pixel data (reproduction pixel data) supplied from the DMA controller 281-1 through the 64 bit bus to the RAID controller 282-1, comprises FIFO's 406A-1 and 406B-1 having respectively 32 bit capacity as shown in FIG. 38. The pixel data supplied from the DMA controller 281-1 though the MSB side 32 bit bus of the 64 bit bus is supplied to the FIFO 406A-1, and the pixel data supplied through the LSB side 32 bit bus is supplied to the FIFO 406B-1. The pixel data stored in the FIFO 406A-1 is supplied to the RAID controller 282-1 through the 32 bit bus, thereafter, the 32 bit pixel data stored in the FIFO 406B-1 is read out and supplied to the RAID controller 282-1 through the 32 bit bus.

The DMA controller 281-1 is connected to the 64 bit DMA bus 251. The FIFO 407-1 is connected to the 32 bit control bus 252, and which delivers a command supplied through the control bus 252 to the RAID controller 282-1.

Though the drawing is omitted, video blocks 2712 to 271-6 have the same structure as the video block 271-1.

A board 421-1 is provided with 3 SCSI boards 431-1 to 431-3. The SCSI board 431-1 is provided with a data buffer 212-1 structured with an S-DRAM, and input output operation is controlled by the buffer controller 211-1. 2 SCSI controllers 202-1 and 202-2 are connected to the buffer controller 211-1 through the 32 bit bus, and the SCSI controller 202-1 controls 2 hard disks 201-1 and 201-2. Further, the SCSI controller 202-2 controls 2 hard disks 201-3 and 201-4.

Though the drawing is omitted, also the SCSI boards 431-2 and 431-3 have the same structure as the SCSI board 431-1. Further, boards 421-2 and 431-3 also have the same structure as the board 421-1. Therefore, in this exemplary structure, one board 421-i can controls 12 hard disks 201, and actually 3 boards are provided, total 36 hard disks 201 can be controlled. However, actually 32 hard disks 201 are connected.

As described herein above, the image data of 1 frame is divided into, for example, 4 subblocks, each subblock is further divided into packet transfer block in 128 word pixel data unit, and generation of parity data and error correction process using the parity data are performed.

Figure 39:
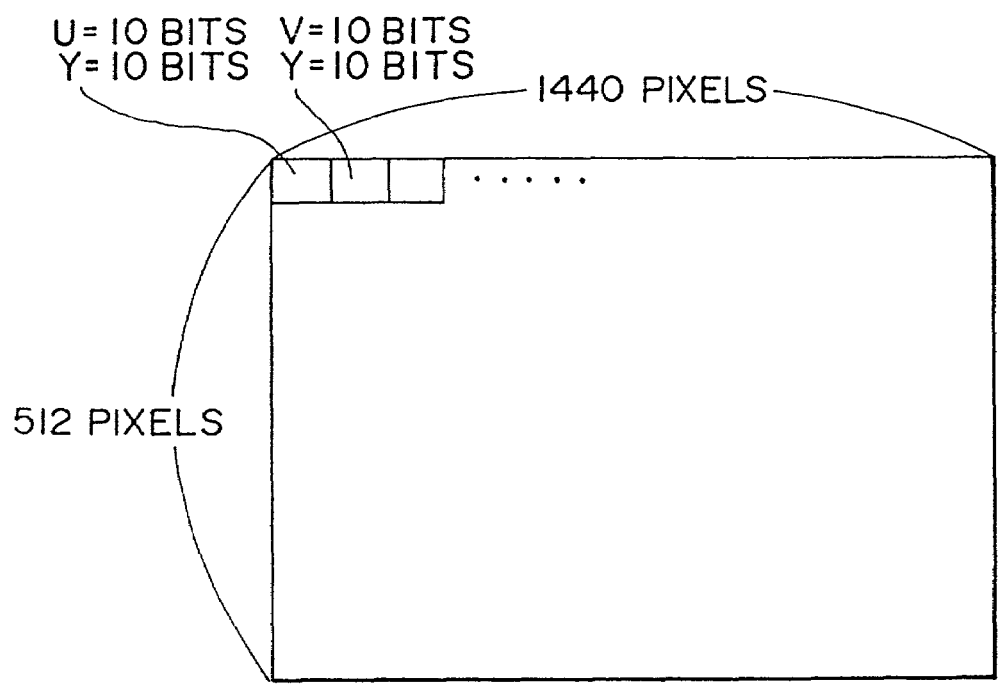
FIG. 39 is a diagram for describing the pixel data of 1 frame image.

In detail, for example, the NTSC image data of 1 frame comprises 1440×512 pixels as shown in FIG. 39. One pixel comprises 10 bit luminance (Y) data and 10 bit chrominance (U or V) data.

Figure 40:
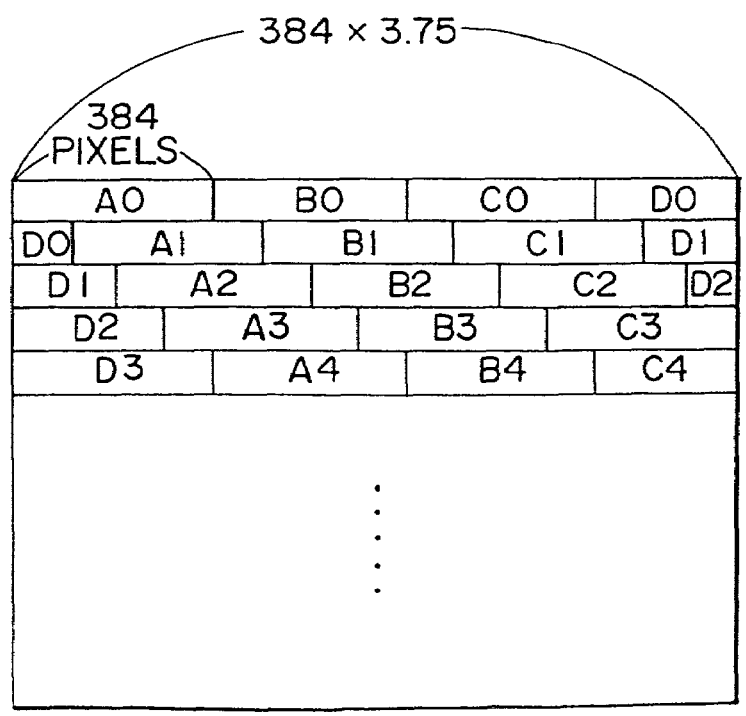
FIG. 40 is a diagram for describing the packet transfer block.

Because 1 word comprises 32 bits, 3 luminance data of 10 bits are loaded on 1 word. 2 bit dummy data is added between 3 luminance data as shown in FIG. 37A, thereby 3 pixel data is loaded on 1 word. From such view point, 384 pixel data is loaded on 1 packet transfer block as shown in FIG. 40.

However, in view of the structure that 1 pixel data comprises 10 bit luminance data and 10 bit chrominance data, 1.5 pixel data is loaded on 1 word, and then the number of pixels loaded on 1 packet transfer block (128 word) is 192-pixel data.

Herein for simple description, it is assumed that 1 pixel comprises 10 bit luminance data and 384 pixel are loaded on 1 packet transfer block.

Figure 41:
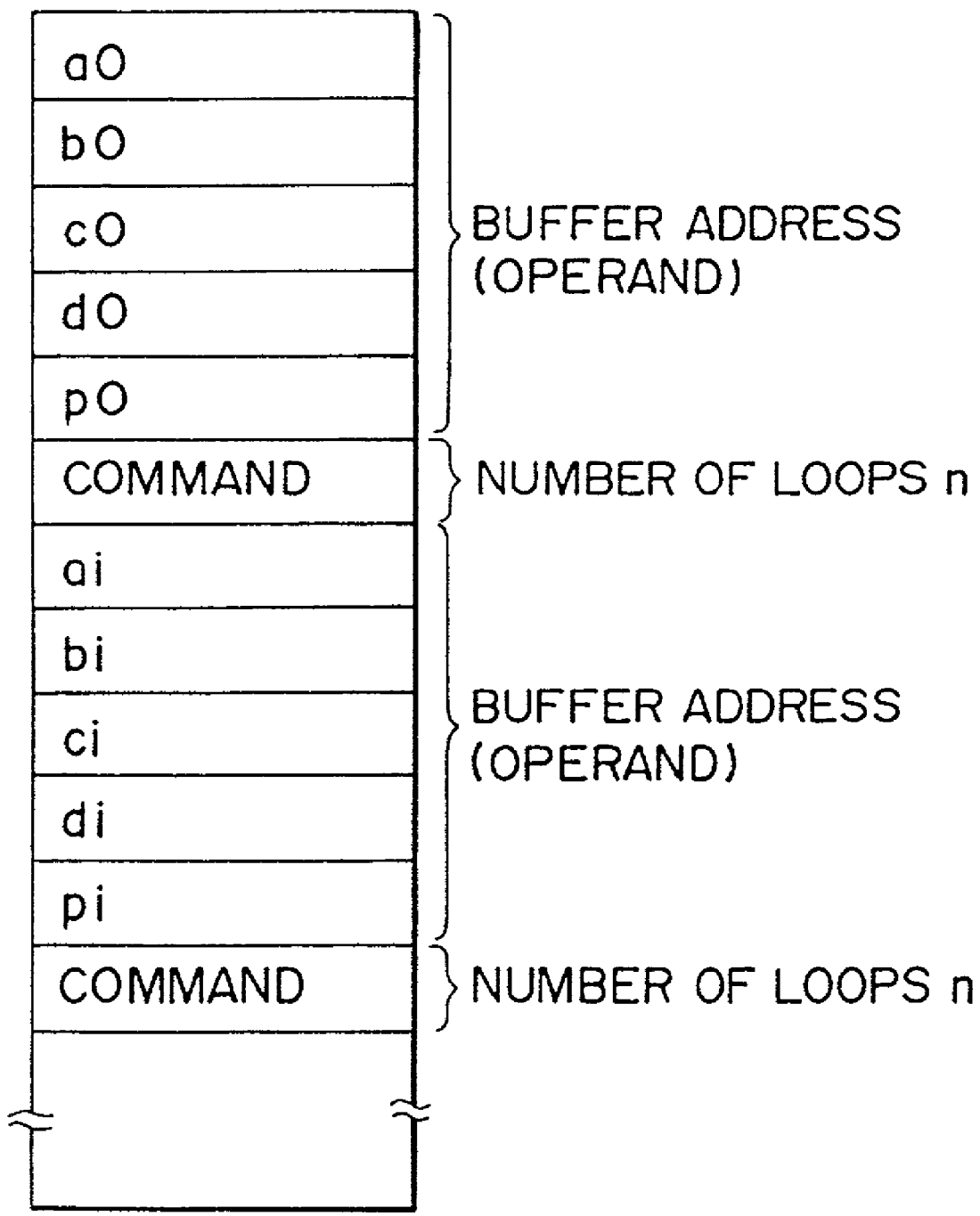
FIG. 41 is a diagram for describing the DMA command.

As described herein above, the DMA controller 281 performs DMA transfer in packet transfer block unit between the RAID controller 282 and the data buffer 212. FIG. 41 shows an example of an DMA command supplied from the controller 262 to DMA controller 281 through the control bus 252. This example exemplifies an example of a command for DMA transfer of the pixel data to be recorded from the RAID controller 282 to the data buffer 212.

As shown in FIG. 41, this DMA command is composed of commands and operands, the operand stores the address of the data buffer 212 for recording the pixel data. The command specifies the number of transfer of the packet transfer block (the number of loops).

Other commands for indicating various control other than that for specifying the number of loops may be loaded as the command. For example, the RAID ratio is set to the command for the RAID controller 282.

Figure 42:
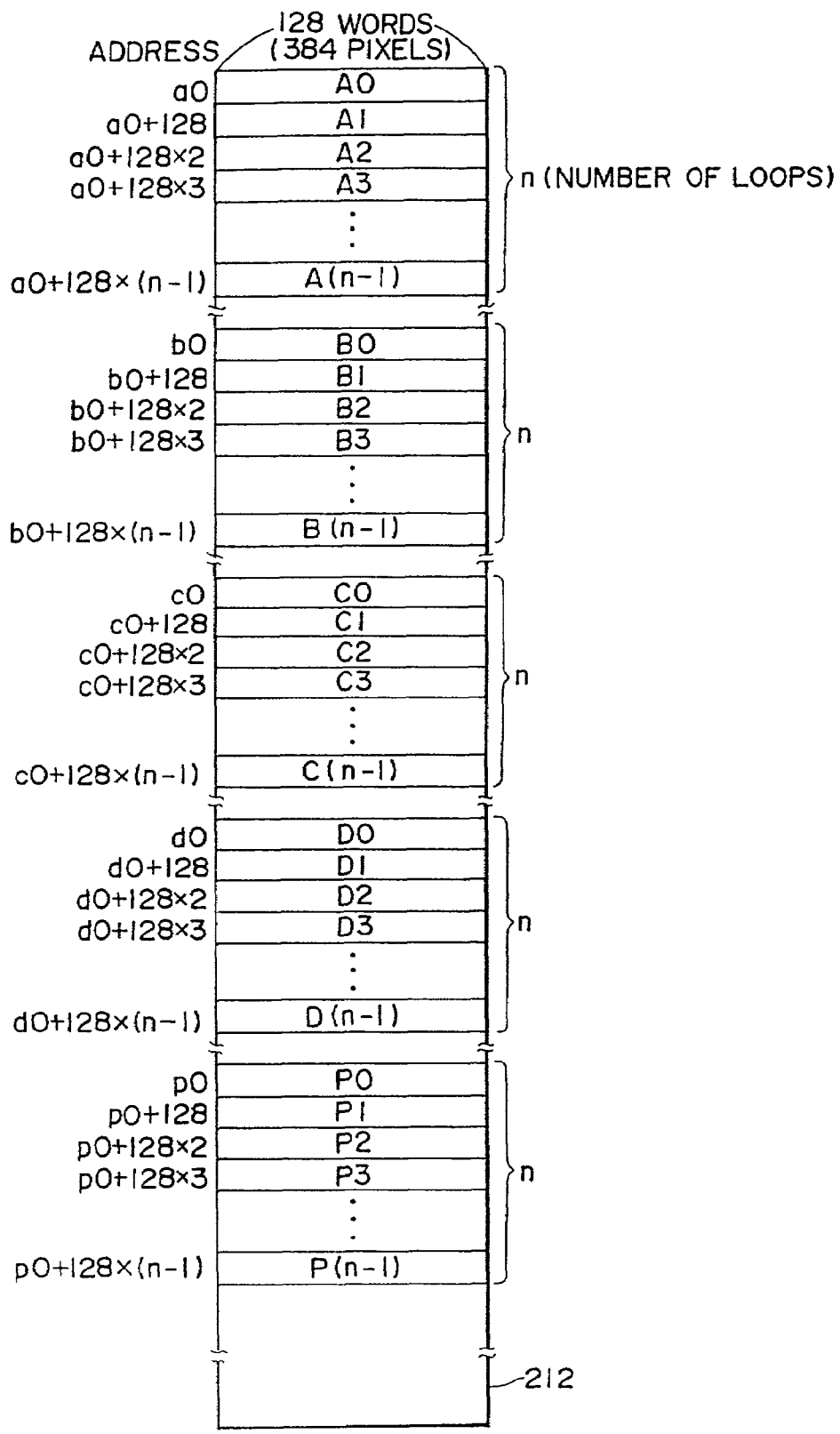
FIG. 42 is a diagram for describing data writing in the data buffer shown in FIG. 36.

For example, it is assumed that 1 frame pixel data is divided sequentially from the upper left to lower right for every 1 packet transfer block, like as, A0, B0, C0, D0, A1, B1, C1, D1, . . . . When the packet transfer block is indicated to be transferred to the DMA controller 281 with the DMA command as shown in FIG. 41, the DMA controller 281 receives this command at the FIFO 501-1, and writes the data on the data buffer 212 as shown in FIG. 42.

In detail, as shown in FIG. 41, addresses a0 to d0 of the data buffer 212 are specified on operands of the command corresponding to 4 subblocks, and p0 is specified on an operand as the address of the data buffer 212 where the parity data corresponding to 4 subblocks to be recorded. The number of loops n is written as the command. In this case, as shown in FIG. 42, the packet transfer block A0 is written on the address a0 of the data buffer 212. The packet transfer block B0 is written on the address b0, the packet transfer block C0 is written on the address c0, and the packet transfer block D0 is written on the address d0. The parity data P0 for the first 1 packet transfer block out of the parity data formed correspondingly to 4 subblocks is written on the address p0 of the data buffer 212.

Next, the packet transfer block A1 is written on the address a0+128 (word) of the data buffer 212, the packet transfer block B1 is written on the address b0+128, the packet transfer block C1 is written on the address c0+128, and the packet transfer block D1 is written on the address d0+128. Further, the parity data P1 is written on the address p0+128.

Similarly in the following, data A0, A1, A2, . . . , A(n−1) are written on the area which is continuous from the address a0, and data B0, B1, B2, . . . , B(n−1) are written on the area which is continuous from the address b0. Further, data C0, C1, C2, . . . , C(n−1) are written on the area which is continuous from the address c0, data D0, D1, D2, . . . , D(n−1) are written on the area which is continuous from the address d0, and parity data P0 to P(n−1) are written in the area which is continuous from the address p0.

Figure 43:
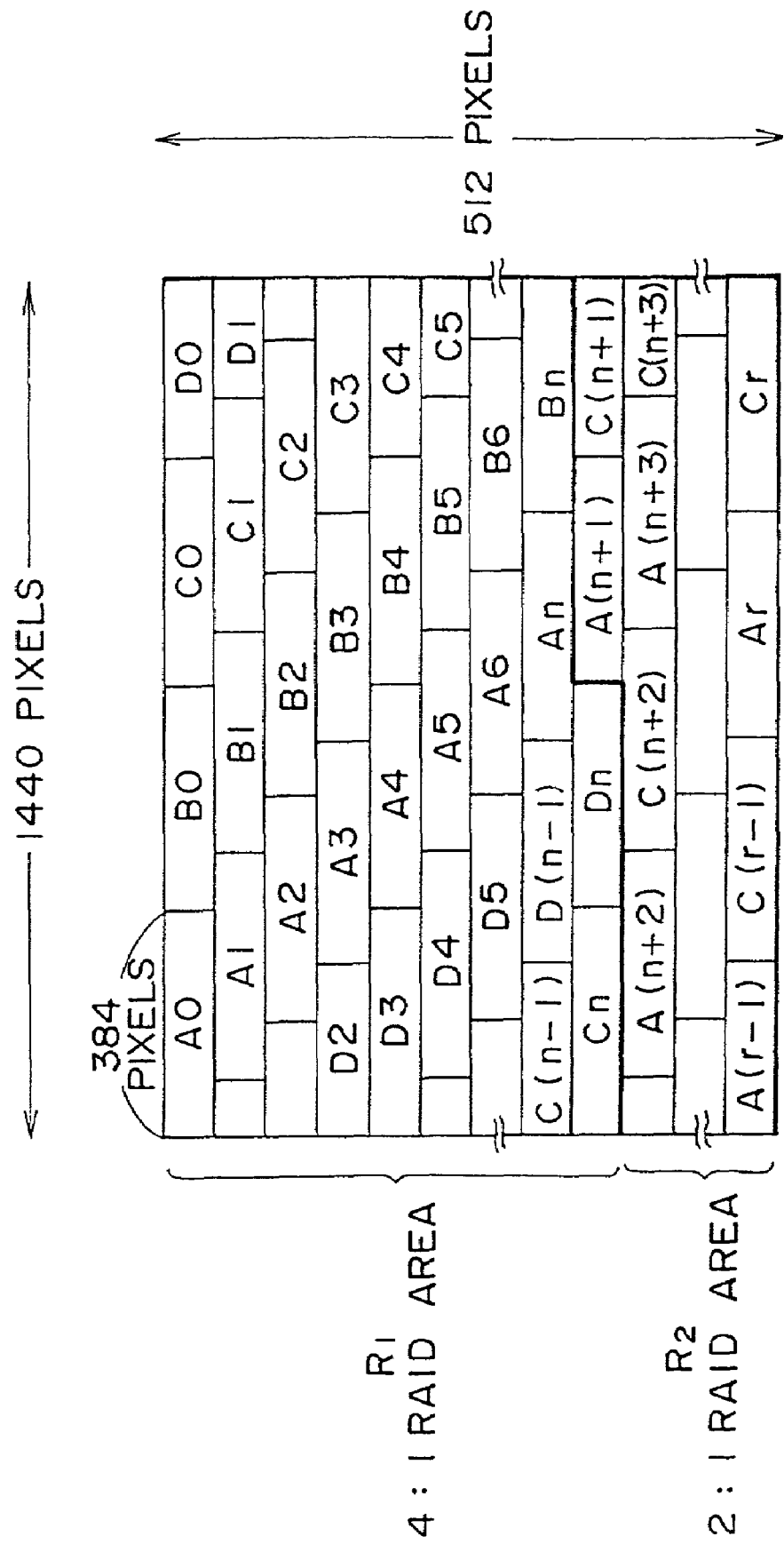
FIG. 43 is a diagram for describing the RAID area of 1 frame image.

FIG. 43 shows the range of the area R1 to which the pixel data of 1 frame image is transferred with 4:1 RAID and the area R2 of 2:1 RAID. As shown in FIG. 43, successive packet blocks A0, B0, C0, D0, A1, D1, C1, D1, . . . , An, Bn, Cn, Dn are transferred with 4:1 RAID as shown in FIG. 43. The following packet transfer blocks of the area R2 A(n+1), C(n+1), A(n+2), C(n+2), . . . , Ar, Cr are transferred with 2:1 RAID.

The above-mentioned packet transfer blocks Ai, Bi, Ci, and Di constitute respectively the first to fourth subblocks.

Figure 44:
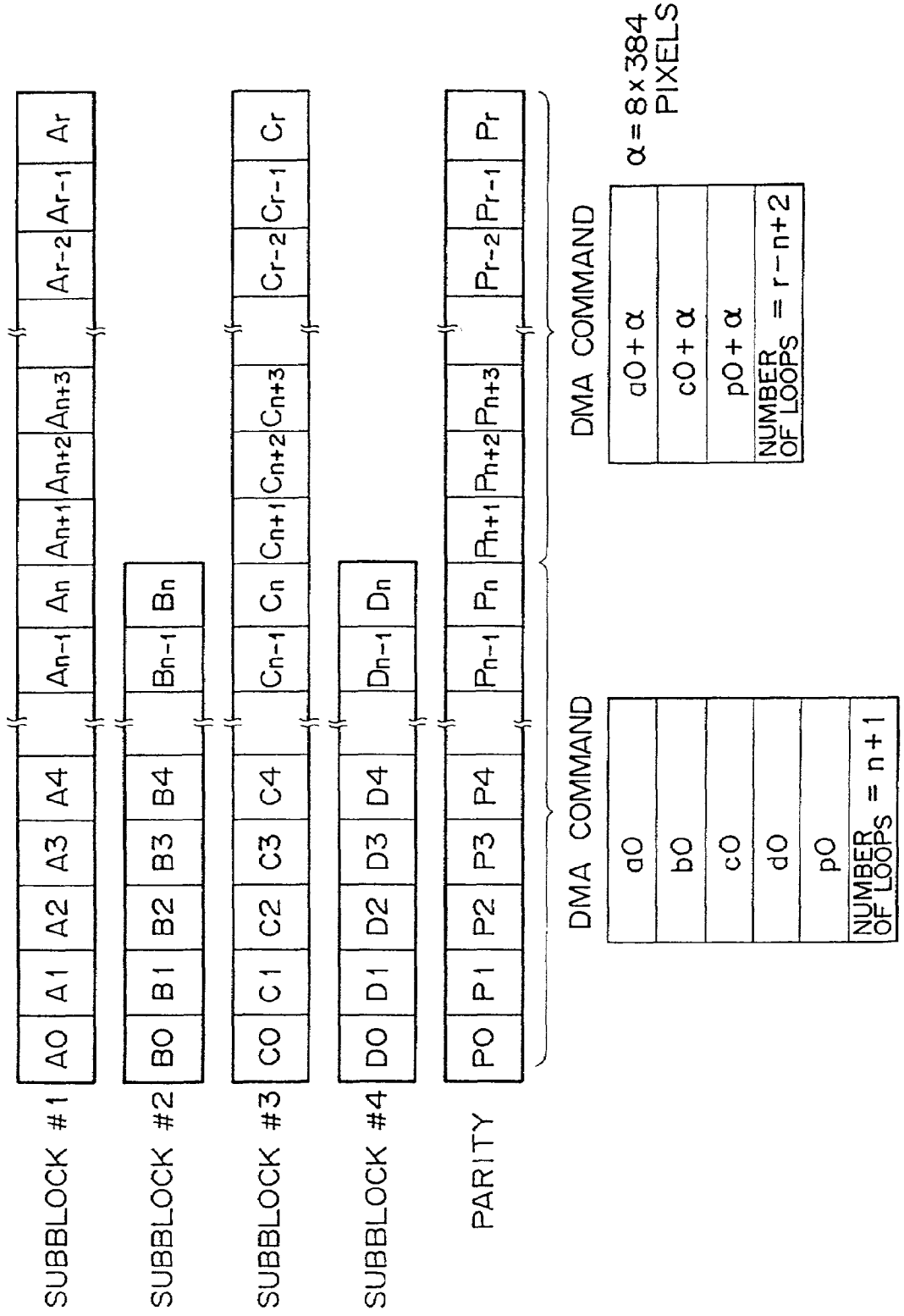
FIG. 44 is a diagram for describing the structure of subblocks of 1 frame image shown in FIG. 43.

In detail, as shown in FIG. 44, the first subblock consists of packet transfer blocks A0 to Ar, the second subblock consists of packet transfer blocks B0 to Bn, the third subblock consists of packet transfer blocks C0 to Cr, and the fourth subblock consists of packet transfer blocks D0 to Dn. The parity data consists of packet transfer blocks P0 to Pr.

As it is obvious from the comparison between FIG. 43 and FIG. 44, for example, the packet transfer block Ai which constitute the first subblock does not consist of successive pixels on 1 frame image shown in FIG. 43 but consists of pixels which are distributed on prescribed positions (of course, in a packet transfer block, pixels are successive).

As shown in FIG. 44, (n+1) packet transfer blocks of each subblock constitute 4:1 RAID together with (n+1) parity data.

On the other hand, packet transfer blocks from the packet transfer block An+1 to the packet transfer block Ar of the first subblock, packet transfer subblocks from the packet transfer block Cn+1 to the packet transfer block Cr of the third subblock, and the parity data form the packet transfer block Pn+1 to the packet transfer block Pr constitute 2:1 RAID.

The DMA command as shown on the left side of FIG. 44 is served to DMA-transfer the packet transfer block on the area of 4:1 RAID to the data buffer 212. In detail, the data A1 of the first subblock is stored in the address a0 of the data buffer 212, the packet transfer block B1 of the second subblock is stored in the address b0 of the data buffer 212, the packet transfer block C1 of the third subblock is stored in the address c0 of the data buffer 212, and the packet transfer block D1 of the fourth subblock is stored in the address d0 of the data buffer 212. Next, the second packet transfer blocks A2, B2, C2, and D2, and the parity data P2 are transferred sequentially. Similarly in the following, n+1 transferring is performed for the packet transfer blocks on the 4:1 RAID area.

On the other hand, the DMA command shown in the right side of FIG. 44 is served to DMA-transfer packet transfer blocks on 2:1 RAID area to the data buffer 212. In detail, the packet transfer block An+1 of the first subblock is stored in the address a0 of the data buffer 212. Similarly, the packet transfer block Cn+1 of the third subblock is stored in the address c0 of the data buffer 212, and the parity data Pn+1 is stored in the address p0 of the data buffer 212. Similarly in the following, the second and following packet transfer blocks An+2, Cn+3, Pn+2, An+3, Cn+3, +n+3, . . . are transferred sequentially. When, the number of transferring of the packet transfer block is r−n+2.

Figure 45:
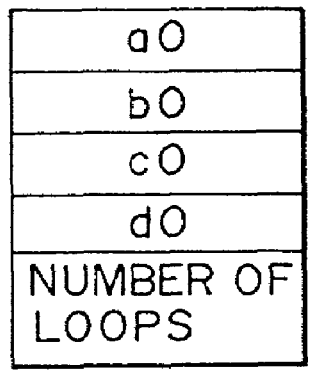
FIG. 45 is a diagram for describing the DMA command for reproduction in the case of no error.
Figure 46:
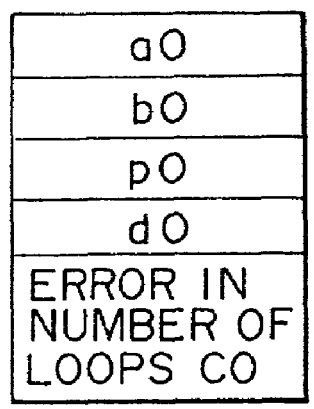
FIG. 46 is a diagram for describing the DMA command for reproduction in the case of error.

FIG. 45 and FIG. 46 shows the DMA command for reading out the packet transfer block from the data buffer 212. FIG. 45 shows the case that there is no error in packet transfer blocks, and FIG. 46 shows the case where there are some errors.

As shown in FIG. 45, in the cast where there are no error in the packet transfer blocks, addresses a0 to d0 of the data buffer 212 in which each packet transfer block is stored and the number of transferring are written. In detail, in this case, one packet transfer block of the first subblock is read out from the address a0 of the data buffer 212, one packet transfer block of the second subblock is read out from the address b0, one packet transfer block of the third subblock is read out from the address c0, and one packet transfer block of the fourth subblock is read out from the address d0. Such reading out operation is repeated the number of times equivalent to the number of loops.

On the other hand, as shown in FIG. 46, for example, in the case that there are some errors in the packet transfer block of the third block, the address p0 where the parity data is stored is written instead of the address c0 where the erroneous packet transfer block is stored. The number of loops is indicated as a command, and a flag which indicates that there is an error in the data of third subblock stored in the address c0 is written. Therefore, in this case, the data of the third subblock is not read out from the data buffer 212, and the parity data is read out instead.

Figure 47:
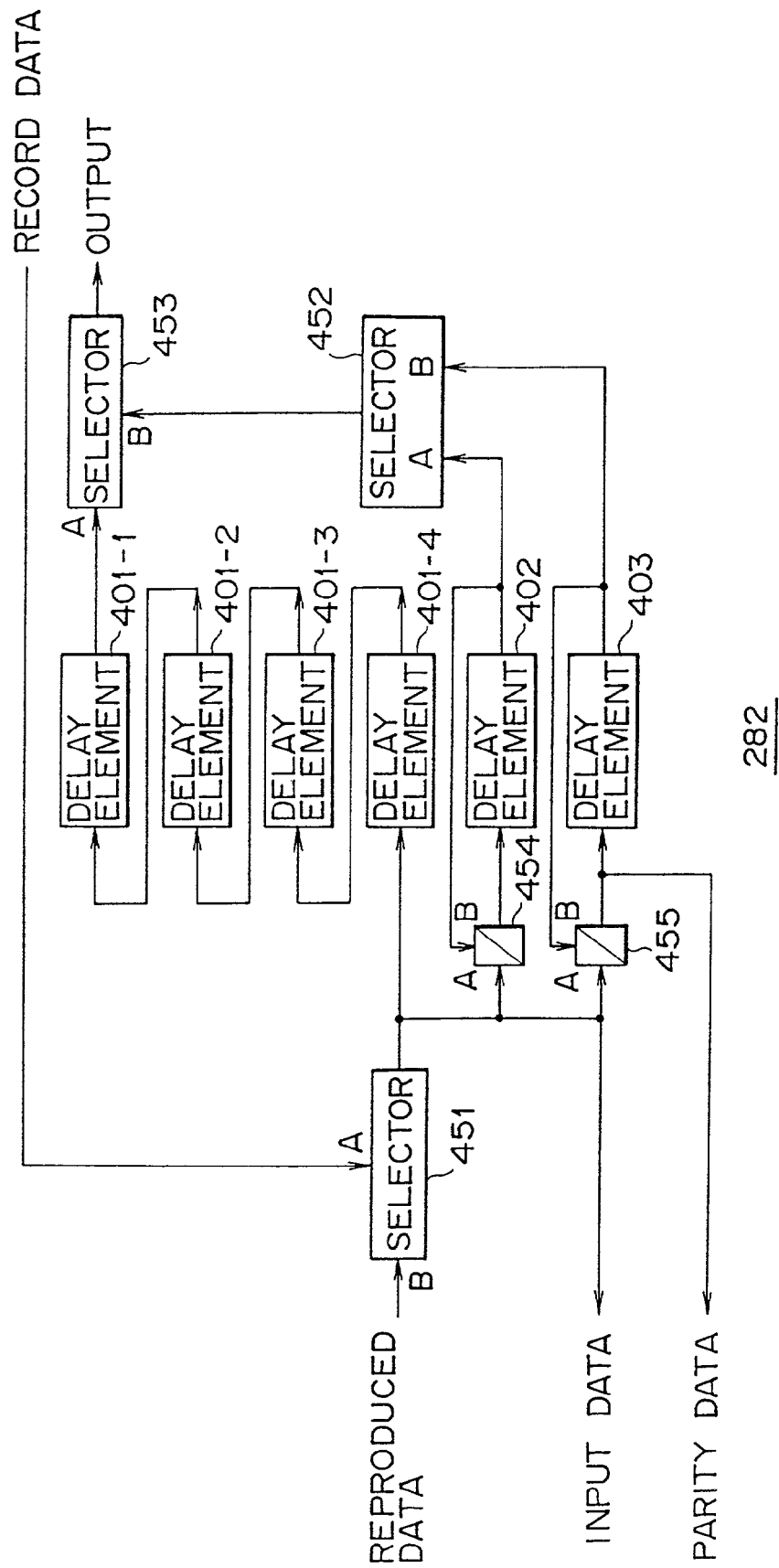
FIG. 47 is a block diagram for illustrating the detailed structure of the RAID controller shown in FIG. 36.

Next, detailed structure and operation in which the RAID controller 282 generates the parity data in real time and error correction is performed using the parity data in real time are described. FIG. 47 shows an exemplary partial structure of the RAID controller 282 for generating the parity data in real time and performing error correction using the parity data.

A selector 451 selects any one of the recording data (pixel data) supplied from the video processing section 283 and the pixel data (reproduction data) supplied from the data buffer 212, supplies it to other circuits not shown in the drawing as the input data, and supplies it to the delay element 401-4 and to the input A of selectors 454 and 455. The delay element 401-4 delays the input data by 1 packet transfer block, and then delivers it to the subsequent delay element 4013. The delay element 401-3 also delays the input data by 1 packet transfer block, and then delivers it to the subsequent delay element 401-2. The delay element 401-2 also delays the input data by 1 packet transfer block, and then delivers it to the subsequent delay element 401-1. The delay element 401-1 delays the input data by 1 packet transfer block, and then delivers it to the input A of the selector 453.

Four delay elements namely delay elements 401-1 to 401-4 are shown in the block diagram of FIG. 47, however, actually only one delay element 401 is shown in FIG. 36, and in this case, this delay element 401 is used repeatedly the number of times equivalent to the number of loops (in this case, four), thereby the delay of the packet transfer block equivalent to the number of loops can be obtained.

The selector 454 selects any one of the input B to which the output of the delay element 402 is supplied and the input A to which the output of the selector 451 is supplied, or calculates the exclusive OR of 2 inputs and delivers it to the delay element 402. The output of the delay element 402 is supplied to the input A of the selector 452.

Also, the selector 455 selects any one of the input A to which the output of the selector 451 is supplied and the input B to which the output of the delay element 403 is supplied, or calculates the exclusive OR of 2 inputs and delivers it to the delay element 403 and delivers it to a circuit not shown in the drawing as the parity data. The output of the delay element 403 is supplied to the input B of the selector 452.

The selector 452 selects any one of the input A and input B, and supplies it to the input B of the selector 453. The selector 453 selects any one of the input A from the delay element 401-1 and the input B from the selector 452, and supplies the selection result to the video processing section 283.

Next, operation for generating the parity data is described with reference to FIG. 48. When the pixel data to be recorded in the data buffer 212 is supplied from the video processing section 283 to the RAID controller 282, the RAID controller 282 converts the input from the data in 10 bit unit to the data in 32 bit (1 word) unit. Further, the RAID controller 282 collects the data equivalent to 128 words (equivalent to 1 packet transfer block), and supplies the recording data to the input A of the selector 451. Herein, it is assumed that the number of the packet transfer block which is entered first is 0. The packet transfer block of the number 0 is selected by the selector 451, supplied to the input A of the selector 455, and delivered to the circuit not shown in the drawing as the input data. When, because the packet transfer block is not yet held in the delay element 403, the selector 455 selects the input A as it is. The output of the selector 455 (the packet transfer block of number 0) is supplied to the delay element 403 to be held. The above-mentioned operations are summarized in FIG. 48.

Next, when the packet transfer block of number 1 is supplied to the selector 451, the selector 451 selects this packet transfer block, and supplies it to the selector 455. Because the packet transfer block of number 0 held in the delay element 403 has been supplied to the input B of the selector 455, the selector 455 calculates the exclusive OR of the packet transfer block of number 1 supplied from the selector 451 and the packet transfer block of number 0 supplied from the delay element 403, and supplies it to the delay element 403 to be held.

Similarly in the following, as shown in FIG. 48, when the packet transfer block of number 2 is supplied to the selector 451, the selector 455 calculates and delivers the exclusive OR of packet transfer blocks of number 0, number 1, and number 2, and further when the packet transfer block of number 3 is entered, the exclusive OR of packet transfer blocks of number 0 to number 3 is calculated and delivered. In the case of 4:1 RAID, this output is the parity to be obtained.

Similarly in the following, when a packet transfer block of a new number is entered sequentially, as shown in FIG. 48, the parity data is formed and delivered sequentially in real time.

The input data selected by and delivered from the selector 451 is supplied from the RAID controller 282 to the FIFO 405-1 through the 32 bit bus, and supplied to the DMA controller 281 through the 64 bit bus. The parity data delivered from the selector 455 is supplied from the RAID controller 282 to the FIFO 404-1 through the 32 bit bus, and further supplied therefrom to the DMA controller 281 through the 64 bit bus.

A DMA command as shown in FIG. 41 has been entered from the controller 262 to the DMA controller 281. The DMA controller 281 reads out the pixel data stored in the FIFO 405-1 or FIFO 404-1 or the parity data correspondingly to the DMA command, and supplies it to the buffer controller 211 through the DMA bus 251. The buffer controller 211 processes the data supplied through the DMA bus 251 to write it in the data buffer 212. Thereby, for example, the pixel data and parity data are stored in the data buffer 212 as shown in FIG. 42.

The SCSI controller 202 receives supply of a command from the controller 262 through the control bus 252, delivers a controls signal to the buffer controller 211 corresponding to the command, and reproduces the pixel data and the parity data stored in the data buffer 212 and takes it in. The SCSI controller 202 writes the data taken in from the data buffer 212 through the buffer controller 211 on the prescribed track of the corresponding prescribed hard disk 201. As described herein above, the pixel data of 1 frame, which is divided into 4 subblocks, is recorded in different hard disks 201 for respective subblocks, for example, as shown in FIG. 33. The parity data corresponding to the pixel data of this frame is recorded in a different hard disk 201.

Next, the operation in which an error of the data reproduced from the hard disk 201 is corrected and the corrected data is sent out is described with reference to FIG. 49. The controller 262 delivers a command to the SCSI controller 202 through the control bus 252 to reproduce the parity data corresponding to the pixel data of a prescribed frame recorded in the hard disk 201. The reproduced data is written on the data buffer 212 from the SCSI controller 202 through the buffer controller 211. The controller 262 indicates to the DMA controller 281 through the control bus 252 to perform DMA transfer of the data written in the data buffer 212 as described herein above to the RAID controller 282. The DMA controller 281 reads out the data written on the data buffer 212 through the buffer controller 211 correspondingly to the command, and receives the transfer through the DMA bus 251. The data is supplied to and stored in the FIFO 406A-1 and 406B-1 through the 64 bit bus. The data written on the FIFO 406A-1 and 406B-1 is supplied to the RAID controller 282 through the 32 bit bus.

The RAID controller 282 receives the data supplied from the FIFO 406A-1 and 406B-1 as described herein above at the input B of the selector 451.

After the selector 451 receives a packet transfer block, for example, of number 0 as described herein above, the packet transfer block of number 0 is selected by the selector 451, supplied to the delay element 401-4 as shown in FIG. 49, and supplied to the input A of the selectors 454 and 455 respectively. As shown in FIG. 49, because the selector 455 is controlled so as to select the input B, the data supplied to the input A is not supplied to the delay element 403. Conversely, because the selector 454 is controlled so as to select the input A, the selector 454 selects the packet transfer block of number 0 and supplies it to the subsequent delay element 402 for holding.

Next, the packet transfer block of number 1 is entered to and selected by the selector 451 and supplied to the delay element 401-4, when, the packet transfer block of number 0 which has been held in the delay element 401-4 is transferred to and held in the subsequent delay element 401-3.

Further, the selector 454 calculates the exclusive OR of the packet transfer block of number 1 from the selector 451 supplied from the input A and the packet transfer block of number 0 held in the delay element 402, and supplied it to the delay element 402 for storing.

Next, though the packet transfer block of number 3 would be entered if the packet transfer block of number 3 is normal, but it is assumed that the packet transfer block of number 3 happens to have an error, the DMA controller 281 selects the parity data instead of the packet transfer block of number 3, and the parity data is read out from the data buffer 212, and supplied to the RAID controller 281. The parity data is supplied from the selector 451 to the delay element 401-4, and also supplied to the input A of the selector 454. When the selector 454 calculates the exclusive OR of the data from the input A and the data from the input B, the input A receives the parity data, on the other hand, the delay element 402 receives the exclusive OR of the packet transfer block of number 0, the packet transfer block of number 1, and the parity data which is calculated by the selector 454 because the delay element 402 holds the exclusive OR of the packet transfer block of number 0 and the packet transfer block of number 1.

Further, when the packet transfer block of number 3 is entered from the selector 451, the packet transfer block of number 3 is supplied to the delay element 401-4, and the parity data which has been held in the delay element 401-4 is supplied to the subsequent delay element 401-3. The packet transfer packet of number 1 which has been held in the delay element 401-3 up to that time is supplied to the subsequent delay element 401-2 for storing. The packet transfer block of number 0 which has been held in the delay element 401-2 up to that time is supplied to and held in the further subsequent delay element 401-1.

The selector 454 calculates the exclusive OR of the packet transfer block of number 3 supplied from the selector 451 and the data which has been obtained by calculating the exclusive OR of the packet transfer block of number 0, the packet transfer block of number 1, and the parity data stored in the delay element 402. The calculation result is, in the result, the data that the packet transfer block of number 2 is error-corrected, and this data is held in the delay element 402.

Next, when the packet transfer block of number 4 is entered to the selector 451, this packet transfer block of number 4 is selected, and held in the delay element 401-4. The packet transfer block of number 3 which has been held in the delay element 401-4 is supplied to the subsequent delay element 401-3. The parity data which has been held in the delay element 401-3 up to that time is supplied to and held in the subsequent delay element 401-2. The packet transfer block of number 1 which has been held in the delay element 401-2 up to that time is supplied to and held in the subsequent delay element 401-1. The packet transfer block of number 0 which has been held in the delay element 401-1 up to that time is supplied to the input A of the selector 453, selected by the selector 453, and delivered to the video processing section 283.

Next, when the packet transfer block of number 5 is entered to the selector 451, the same processing as described herein above is performed, the packet transfer block of number 1 which has been held in the delay element 401-1 up to that time is selected by the selector 453 and delivered.

Next, though it is now the timing for entering the packet transfer block of number 6 in the selector 451, if an error is detected in the packet transfer block of number 6, the parity data is supplied to the selector 451 instead of the packet transfer block of number 6. As the result, the parity data is supplied to and held in the delay element 401-4, and supplied to and held in the delay element 403 through the selector 455.

The combination of the selector 454 and the delay element 402 and the combination of the selector 455 and the delay element 403 are used alternately at an interval of 1 frame (every 4 packet transfer blocks). Therefore, in the case that packet transfer blocks of number 0 to number 3 are supplied to the delay element 402 through the selector 454, the next 1 frame data of packet transfer blocks of number 4 to number 8 is supplied to the delay element 403 through the selector 455. In the same manner as the case of the selector 454, when a packet transfer block of a new number is entered to the selector 455, the selector 455 calculates a new exclusive OR of the packet transfer block of new number and the existing calculation result of the packet transfer block or the exclusive OR obtained up to that time which has been held in the delay element 403, and the calculation result is supplied to and held in the delay element 403.

Therefore, at the timing of entering of packet transfer blocks of number 4, number 5, and number 6 (parity data) to the selector 451, the selector 455 calculates the exclusive OR of the parity data entered from the selector 451 and the calculation result of the existing exclusive OR of packet transfer blocks of number 4 and number 5 which has been held in the delay element 403 up to that time, and supplies it to and holds it in the delay element 403. On the other hand, the delay element 402 is holding the error-corrected data (the packet transfer block of number 2) of the precedent field.

Further, at the timing of entering of the packet transfer block of number 6 to the selector 451, the delay element 401-1 delivers the entered parity data instead of the packet transfer block of number 2 having an error. If it is selected and delivered by the selector 453 as it is, the parity data is delivered resultantly. To avoid it, the selector 453 is switched at the timing so as to select the data from the input B instead of the data from input A. The output of the selector 452 is supplied to the input B of the selector 453, and the selector 452 selects and delivers the error-corrected packet transfer block of number 2 entered to the input A which has been held in the delay element 402. As the result, the parity data is not delivered from the switch 453, but the error-corrected packet transfer block of number 2 is delivered.

Similarly in the following, as shown in FIG. 49, at the timing of entering of the packet transfer block of number 10 to the selector 451, though the parity data which has been entered from the delay element 401-1 instead of the error-containing packet transfer block of number 6, when, the selector 453 is switched to the input B side, the error-corrected packet transfer block is delivered from the selector 453 because the selector 452 selects the error-corrected packet transfer block of number 6 supplied to the input B which has been held in the delay element 403.

As described herein above, when reproduction data is entered from the DMA controller 281 sequentially, errors are corrected sequentially in real time and corrected data is supplied to the video processing section 283.

Next, the operation for recording in the disk recorder 2 shown in FIG. 7 is summarized as described herein under. It is assumed that the video data supplied from the editing system 1 to the disk recorder 2 is the NTSC video data.

When the controller 262 of the disk recorder 2 receives a recording command from the host personal computer 3 through the SCSI, the controller 262 searches a free area which is recordable of the video data supplied from the editing system 1 with reference to the allocation map 303 on the RAM 263. The free area searching is performed on the respective subblocks, each subblock is formed by dividing 1 frame video data into 4, and the parity data formed from these pixel data. At this time point, because the exact number of parity sectors and the number of sectors of 4 subblocks are unknown, the free area searching is performed not in sector unit but in track unit.

Based on the state of the searched free area, the controller 262 determines the recording position on the hard disk where the parity data and the data of 4 subblocks are to be recorded. The recording position is specified by the disk ID of the hard disk 201 and the start logical sector number of the sector from which the recording starts. In detail as shown in FIG. 15, the logical sector number 0 (sector of the outermost track) of the hard disk 201-1 having disk ID of 1 is the recording start position of the parity data. The logical sector number 599600 (sector of the innermost track) of the hard disk 201-2 having disk ID of 2 is the recording start position of the first subblock data. Further, the logical sector number 0 (sector of the outermost track) of the hard disk 201-3 having disk ID of 3 is the recording start position of the second subblock data. The logical sector number 599600 (sector of the innermost track) of the hard disk 201-4 having disk ID of 4 is the recording start position of the third subblock data. The logical sector number 0 (sector of the outermost track) of the hard disk 201-5 having disk ID of 5 is the recording start position of the fourth subblock data.

The controller 262 subsequently determines the physical address comprising the cylinder address, medium number, and sector number from the start logical sector number determined as the recording position of the data with reference to the physical address table 302.

Further, the controller 262 determines with reference to the ZBR table 301 what zone out of 12 zones contains the cylinder address determined with reference to the physical address table 302, and determines the number of sectors used in 1 track depending on the determined zone.

Further, the controller 262 generates a block map 304 based on the disk ID, logical sector number, number of sectors of the parity data, and the disk ID, logical sector number, and number of sectors of the first to fourth subblocks.

As described herein above, the block map corresponding to the video data allocated to the first frame (the frame having the number of 1) is formed.

Next, the controller 262 generates a sequence program to be supplied to the DMA controller 281 and the RAID controller 282 with reference to the block map 304. The sequence program consists of the operand including the address for indicating the storing position on the data buffer 212 of the parity data and video data, the number of loops of packet transfer of the parity data and video data, and the command for indicating the RAID ratio as described with reference to FIG. 41.

The controller 262 transfers the command part out of the sequence program to the FIFO 407 through the control bus 252. The RAID controller 282 detects the ratio of video data to parity data (RAID ratio) and the number of transfer loops (transfer loop period) with reference to the command supplied through the FIFO 407. In detail, the RAID controller 282 receives the command, and detects thereby the RAID ratio for parity formation and the number of repetition of the process based on the video data supplied from the video processing section 283.

The RAID controller 282 calculates the parity data from 4 packet transfer blocks (subblock) when the RAID ratio is 4:1, and calculates the parity data from 2 packet transfer blocks (subblock) when the RAID ratio is 2:1.

The calculated parity data is supplied to the FIFO 404 every word and the pixel data is supplied to the FIFO 405 every word.

On the other hand, the controller 262 supplies the DMA command (FIG. 41) which indicates the position in the data buffer 212 where the subblock of the supplied video data should be stored to the FIFO 501 in the controller 281. The DMA controller 281 DMA-transfers the parity data stored in the FIFO 404 and the pixel data stored in the FIFO 405 to the position on the data buffer 212 indicated by the address written in the operand of the DMA command stored in the FIFO 501 every 1 packet transfer block (=128 words). The transfer operation is repeated the number of times corresponding to the number of loops written in the DMA command.

Figure 50:
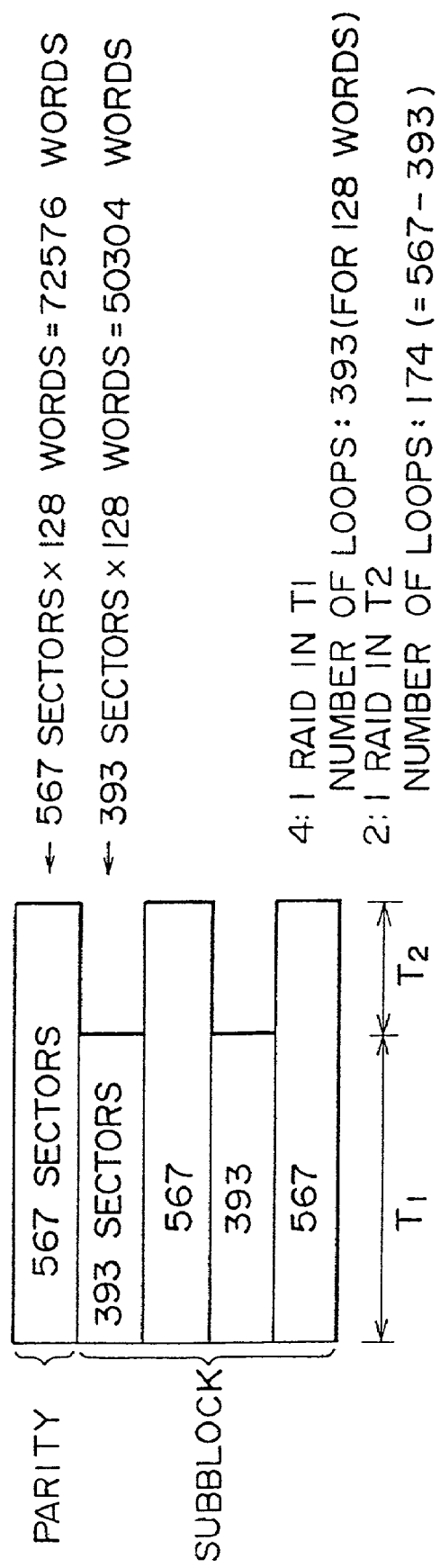
FIG. 50 is a diagram for describing an exemplary structure of the parity data and subblock of NTSC.
Figure 54:
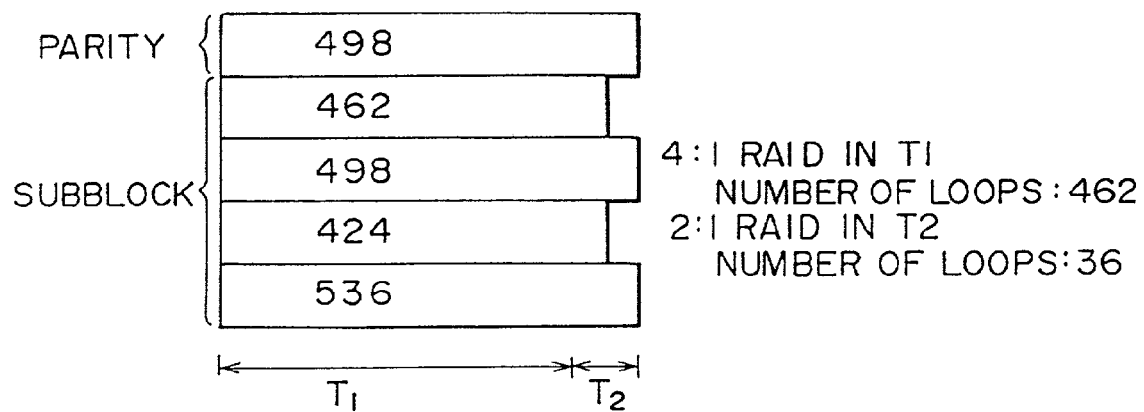
FIG. 54 is a diagram for describing an exemplary structure of the parity data and subblock of NTSC.
Figure 55:
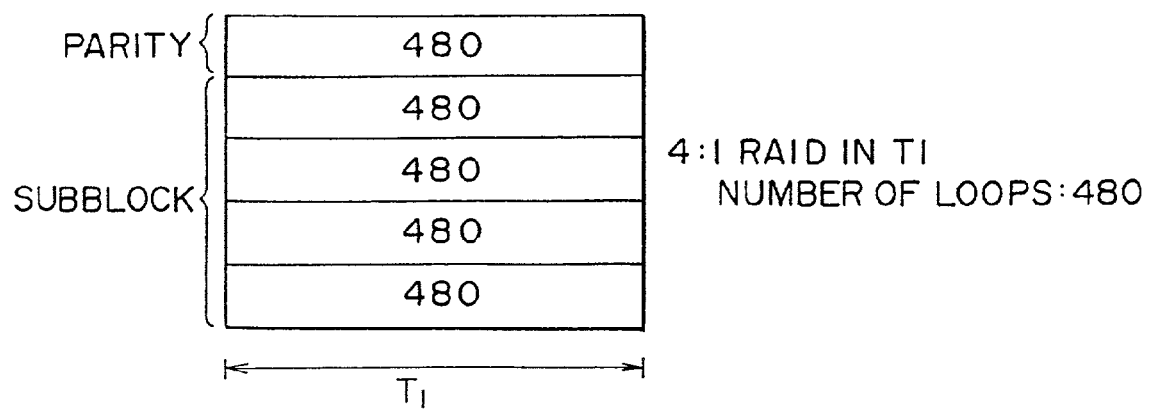
FIG. 55 is a diagram for describing an exemplary structure of the parity data and subblock of NTSC.

FIG. 50 schematically shows the size of 4 subblocks and 1 parity data of the frame having the number of 1 in FIG. 15. As shown in FIG. 50, the size of the first subblock S1-1 is 393 sectors, the size of the second subblock S1-2 is 567 sectors, the size of the third subblock S1-3 is 393 sectors, and the size of fourth subblock S1-4 is 567 sectors. The size of the parity data is set to 567 sectors corresponding to the maximum size out of sizes of the first to fourth subblocks.

It is assumed that the data of 128 words is recorded in 1 sector, then the data quantity of the first subblock is 50304 words (=393 sectors×128 words), and the data quantity of the second subblock is 72576 words (=567 sectors×128 words). The size of the fourth subblock and the parity data is same as that of the second subblock, and the size of the third subblock is same as that of the first subblock.

As described with reference to FIG. 43 and FIG. 44, the pixel data of these 4 subblocks is not the 4 subblocks that are formed by dividing continuous pixels which constitute 1 frame image, but the 4 subblocks that are formed by collecting a prescribed number of data in 128 words (packet transfer block) unit which are distributed at the prescribed positions on 1 image.

In the case of the example shown in FIG. 50, 4:1 RAID is performed in the range T1 of 393 sectors from the left in FIG. 50, and on the other hand, 2:1 RAID is performed in the range T2 on the right hand of the range T1. The number of transfer (number of loops) in the range T1 is prescribed to be 393 times and the number of loops in the range T2 is prescribed to be 174 (=567−393), 1 frame image data is thereby transferred to the data buffer 212.

In this case of the example, because 4:1 RAID and 2:1 RAID are required, the DMA command for 4:1 RAID transfer in the range T1 and the DMA command for 2:1 RAID transfer in the range T2 are necessary.

As described herein above, in the RAID controller 282, because the parity data is generated sequentially correspondingly to the input pixel data, when packet transfer blocks of respective 4 subblock is entered sequentially, the packet blocks are delivered sequentially to the data buffer 212, and corresponding parity data is generated sequentially one parity data per RAID ratio, and delivered to the data buffer 212.

In the range T1, transfer is performed correspondingly to the DMA command which indicates 4:1 RAID. In this case, the video data (50304 word pixel data) of 393 packet transfer blocks of the first to fourth subblock is DMA-transferred to and written in the second to fifth addresses of the data buffer 201 corresponding to the hard disks 201-2 to 201-5 having disk ID of 2 to 5. Further, the parity data (50304 word parity data) of 393 packet transfer blocks is stored in the first address of the data buffer 212 corresponding to the hard disk 201-1 having disk ID of 1 by way of 393 loop transfers.

Next, the DMA controller 281 writes the pixel data of 174 sectors corresponding to the range T2 of the second subblock in the seventh address (the address next to the area where the pixel data of 393 sectors of the second subblock in the range T1 is recorded) of the hard disk 201-3 having disk ID of 3 by way of 174 loop transfers correspondingly to the DMA command of 2:1 RAID. Further similarly, the DMA controller 281 transfers to and writes in the eighth address (the address next to the area where the video data of 393 sectors of the fourth subblock in the range T1 is recorded) of the data buffer 212 corresponding to the hard disk 201-5 having hard disk ID of 5 byway of 174 loop transfers. Further, the parity data (22272 word parity data) of the 174 packet transfer blocks is written in the sixth address (the address next to the area where the parity data of 393 sectors in the range T1 is recorded) corresponding to the hard disk 201 having disk ID of 1.

As described herein above, the video data of the frame having the number of 1 shown in FIG. 15 is transferred to and stored in the data buffer 212. Similarly in the following, the video data of the number 2, 3, . . . is transferred sequentially to the data buffer 212 for buffering.

FIG. 50 shows an example of the case in which the parity data is recorded on the track in the zone 1 having 567 sectors per outermost circumferential 1 track of the ZBR table shown in FIG. 9, and the track in the zone 12 having 393 sectors per innermost circumferential 1 track. In detail, for example, the parity data of 567 sectors is recorded on the track of the outermost circumferential zone 1 of the hard disk 201-1, the first subblock data of 393 sectors out of subblocks is recorded on the track of the innermost circumferential zone 12 of the hard disk 201-2, the second subblock data of 567 sectors is recorded on the track of the outermost zone 1 of the hard disk 201-3, the third subblock data of 393 sectors is recorded on the track of the innermost circumferential zone 12 of the hard disk 201-4, and the fourth subblock data of 567 sectors is recorded on the track of the outermost circumferential zone 1 of the hard disk 201-5.

As described herein above, the track of the outermost circumference and the track of the innermost circumference are used in the form of pair. Therefore, for example, when the pair consisting of the zone 1 and zone 12 becomes full and can not be used more, the zone 2 having 544 sectors per 1 track positioned at the second outermost circumference next to the zone 1, and the zone 11 having 416 sectors per 1 track positioned at the second innermost circumference next to the zone 12 are used in the form of a pair.

FIG. 51 shows an exemplary structure of the parity data and subblock data in this case. In this example, the parity data of 544 sectors is recorded, for example, on the track in the second outermost circumferential zone 2 of the hard disk 201-2, the first subblock data of 416 sectors out of subblocks is recorded on the track having 416 sectors per 1 track positioned second from the innermost circumference of the hard disk 201-3, the third subblock data of 416 sectors is recorded on the track in the zone 11 of the hard disk 201-5, and the fourth subblock data of 544 sectors is recorded on the track in the zone 2 of the hard disk 201-6. In this case, 4:1 RAID is performed in the range T1 of 416 sectors from the left side in the figure, on the other hand, 2:1 RAID is performed in the range T2 of following 128 sectors.

Similarly in the following, FIG. 52 to FIG. 55 show examples of cases in which the zone 3 and zone 10 is used as a pair, the zone 4 and the zone 9 are used as a pair, the zone 5 and zone 8 are used as a pair, and the zone 6 and the zone 7 are used as a pair respectively.

As described herein above, by using the outer circumference zone and the inner circumference zone as a pair, with addressing on one hard disk 201, the size of each subblock can be set so that the gap θgap value of the respective subblock is approximately equal each other, the time necessary to read out and write each subblock is approximately equal.

The above-mentioned structure shown in FIG. 50 to FIG. 55 is the case of NTSC video data, but in the case of PAL video data, the size of the parity data and subblock is set as shown in FIG. 56 to FIG. 61. In the case of PAL video data, the number of pixels for 1 frame is 1440×612, which is more than that in the case of NTSC video data, and the number of sectors per 1 track in each zone is specified as shown in FIG. 10. FIG. 56 to FIG. 61 respectively show the case in which the zone 1 and zone 12 shown in FIG. 10 are used as a pair, the case in which the zone 2 and the zone 11 are used as a pair, the case in which the zone 3 and the zone 10 are used as a pair, the case in which the zone 4 and the zone 9 are used as a pair, the case in which the zone 5 and the zone 8 are used as a pair, and the case in which the zone 6 and the zone 7 are used as a pair.

Figure 56:
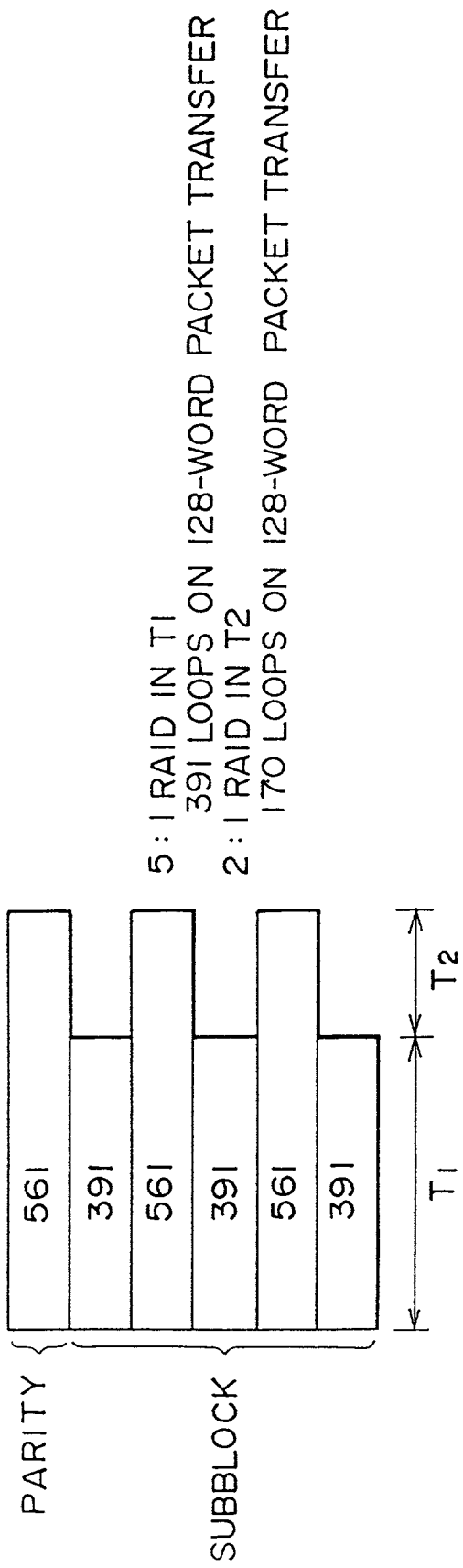
FIG. 56 is a diagram for describing an exemplary structure of the parity data and subblock of PAL.
Figure 57:
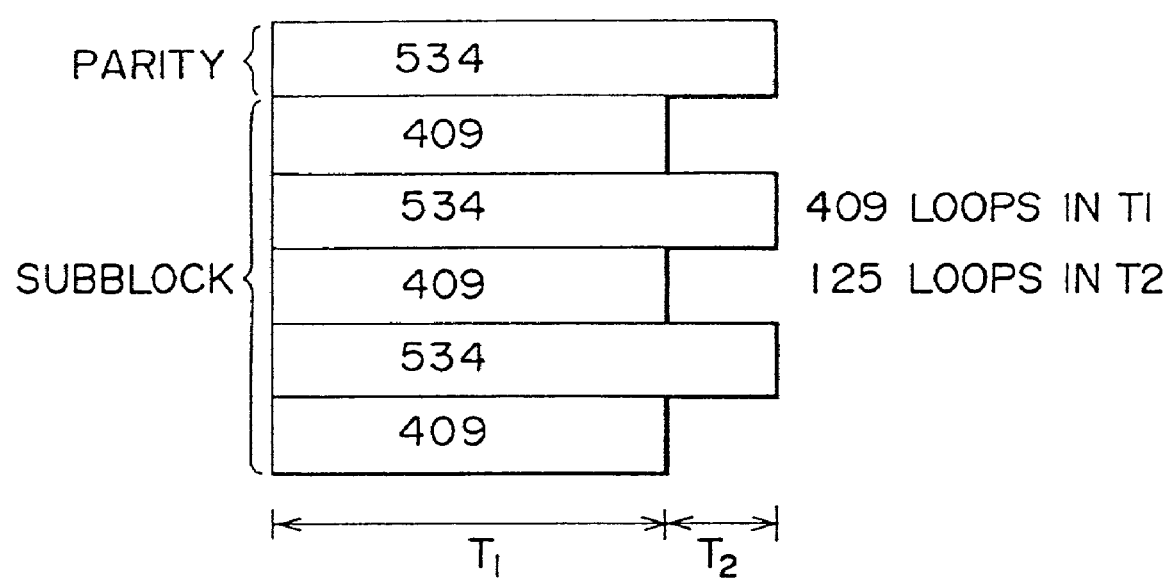
FIG. 57 is a diagram for describing an exemplary structure of the parity data and subblock of PAL.
Figure 58:
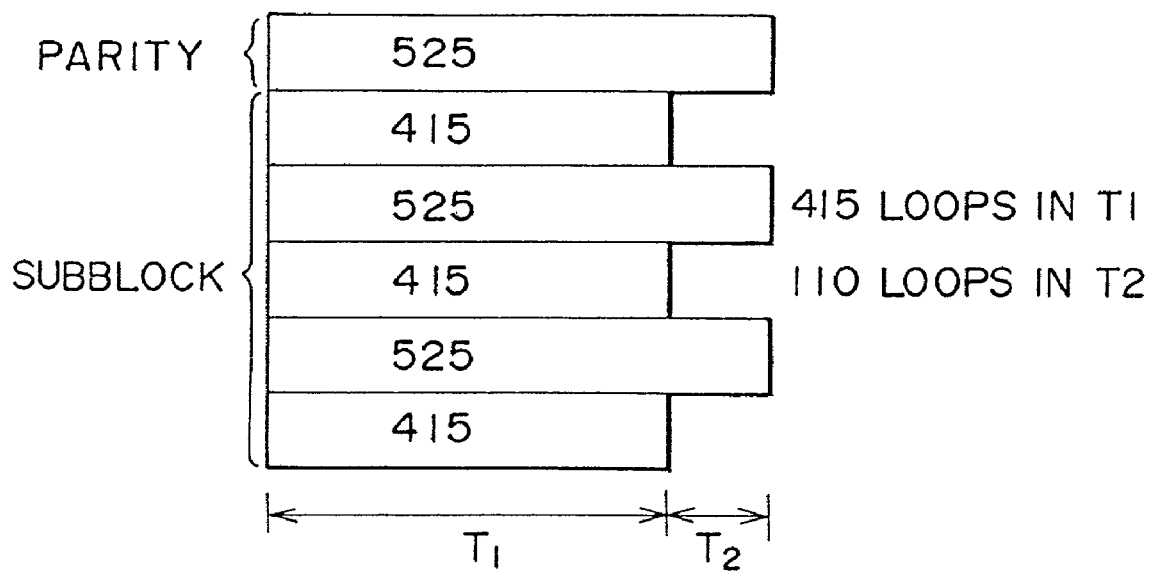
FIG. 58 is a diagram for describing an exemplary structure of the parity data and subblock of PAL.
Figure 59:
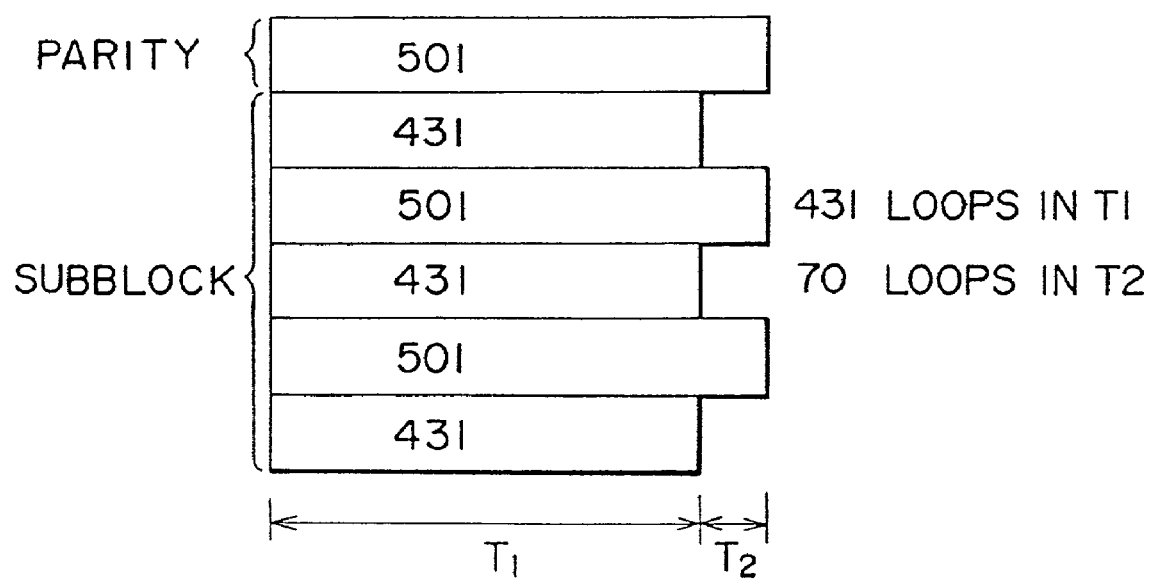
FIG. 59 is a diagram for describing an exemplary structure of the parity data and subblock of PAL.
Figure 60:
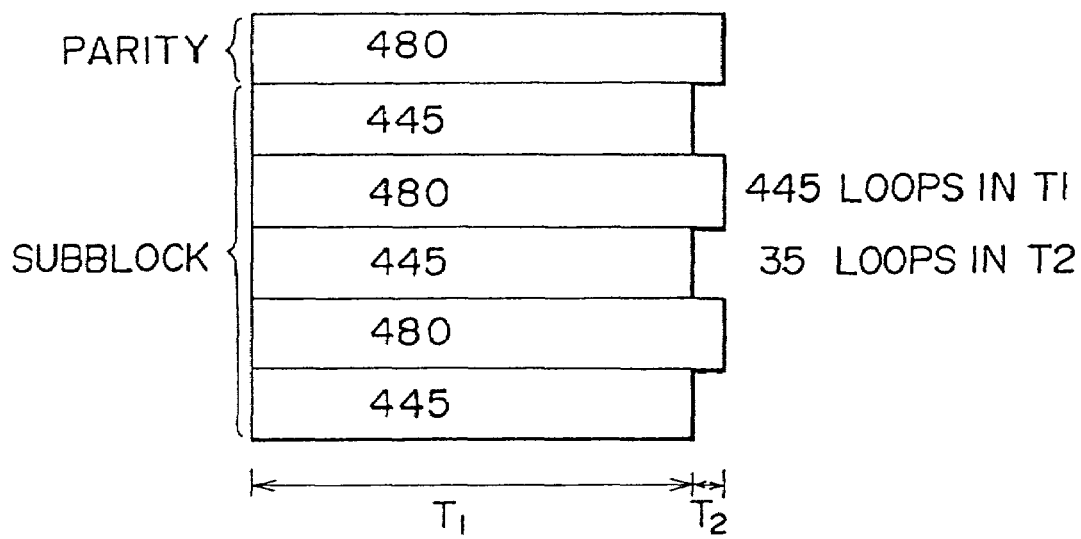
FIG. 60 is a diagram for describing an exemplary structure of the parity data and subblock of PAL.
Figure 61:
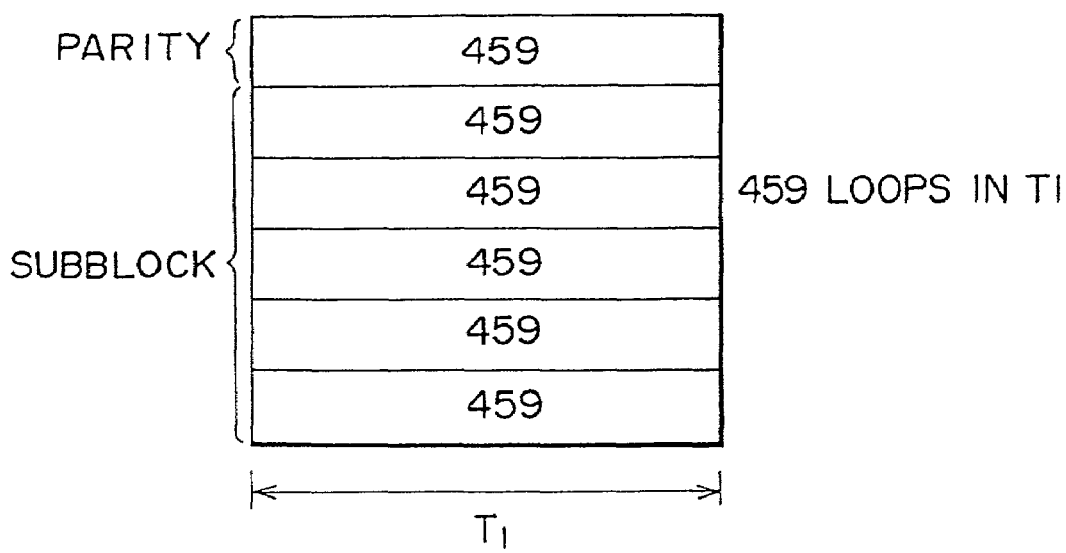
FIG. 61 is a diagram for describing an exemplary structure of the parity data and subblock of PAL.

In the setting example shown in FIG. 56, the parity of 561 sectors is recorded on the outermost circumferential track in the zone 1 of the first hard disk 201, the first subblock data out of subblocks of 391 sectors is recorded on the innermost circumferential rack in the zone 12 of the second hard disk, the second subblock data of 561 sectors is recorded on the track in the zone 1 of the third hard disk, the third subblock data of 391 sectors is recorded on the track in the zone 12 of the fourth hard disk, the fourth subblock data of 561 sectors is recorded on the track in the zone 1 of the fifth hard disk, and the fifth subblock of 391 sectors is recorded on the innermost circumferential track in the zone 12 of the sixth hard disk. The data of 391 sectors in the range T1 from the left side in the figure is transferred by way of 5:1 RAID, and the data of 170 sectors on the right hand of the range T1 is transferred by way of 2:1 RAID. In this case, the size of 1 packet transfer block is 128 words. Therefore, the 391 transfer loops are in the range T1 and the 170 transfer loops are in the range T2.

In the examples shown FIG. 57 to FIG. 61, only the number of transfer loops is different from that shown in FIG. 56, and other operations are the same as those shown in FIG. 56.

As described in the step S12-8 of the flow chart shown in FIG. 26, for example, when the parity data and subblock data of 1 frame are stored in the data buffer 212, the parity data and subblock data of 1 frame are transferred directly to the hard disk 201, but, for example, when the parity data and subblock data of 10 frames are stored in the data buffer 212, the controller 262 schedules the order of data transfer according to SCAN algorithm.

For example, it is assumed that the number of hard disk 201 is 6 and the data is recorded as shown in FIG. 62, then the data buffered in the third address which indicates the place where the data to be transferred to the hard disk 201 having disk ID of 3 is held is the second subblock data S1-2 of the frame of the number 1, the first subblock data S2-1 of the frame of the number 2, the parity data P3 of the frame of the number 3, the fourth subblock data S5-4 of the frame of the number 5, the third subblock data S6-3 of the frame of the number 6, the second subblock data S7-2 of the frame of the number 7, the first subblock data S8-1 of the frame of the number 8, and the parity data P9 of the frame of the number 9.

The subblock data S1-2 is disposed on the outer circumference, the subblock data S2-1 is disposed on the inner circumference, the parity data P3 is disposed on the outer circumference, the subblock data S5-4 is disposed on the outer circumference, the subblock data S6-3 is disposed on the inner circumference, the subblock data S7-2 is disposed on the outer circumference, the subblock data S8-1 is disposed on the inner circumference, and the parity data P9 is disposed on the outer circumference. Therefore, if these data are recorded in the order from S1-2, to S2-1, P3, S5-4, S6-3, S7-2, S8-1, and P9, the head of the hard disk having disk ID of 3 reciprocates between the outer circumference and the inner circumference of the hard disk, the reciprocation causes delayed access.

To avoid such delay, the controller 262 schedules the transfer of the video data from the frame of number 1 to the frame of number 10 so that the plurality of data is transferred to the disk 201 in the order from the data disposed on the outermost circumference with reference to the block map 304 (FIG. 15) formed respectively. In detail, the data are arranged in the order from the data recorded on the outermost circumference with reference to the block map 304 shown in FIG. 15, then the data is arranged in the order S1-2, P3 S5-4, S7-2, P9, S8-1, S6-3, and S2-1. By scheduling the order of the data arrangement as described herein above, the controller 262 suppresses the head migration distance for recording to the minimum to improve the access speed.

When the data recorded in the hard disk 201 as described herein above is reproduced, the operation reverse to the recording is performed. The operation is summarized as described herein under.

When the controller 262 receives an command of reproduction of one or more frames from the host personal computer 3, the controller 262 reads the start logical sector of the frame of the number which is indicated to be reproduced with reference to the block map 304, and determines the physical address corresponding to the logical sector with reference to the physical address table 302. The controller 262 requests the buffer controller 211 through the control bus 252 to take an access to the determined physical address. The buffer controller 211 controls the SCSI controller 202 to reproduce the data from the address specified by the physical address of the hard disk 201 in response to the request. The reproduction data is supplied from the SCSI controller 202 to the buffer controller 211, and written in the data buffer 212.

In this case also, the controller 262 waits until reproduction request of 10 frames is accumulated as described herein above, when the controller 262 accepts reproduction request of 10 frames, the controller 262 schedules the order so that the head migration distance is suppressed to the minimum, and requests the buffer controller 212 to reproduce the image data of 10 frames according to this schedule.

The controller 262 generates a sequence program for DMA transfer of the data stored in the data buffer 212 to the RAID controller 282 with reference to the block map 304. This sequence program supplied to the FIFO 501 of the DMA controller 281 through the control bus 252. The sequence program (DMA command) specifies the address of the data buffer 212 on the operand as described herein above, and also the number of loops are specified on the command. The DMA controller 281 reads out the data written in the data buffer 212 correspondingly to the command, and receives it through the DMA bus 251, and transfers it to the RAID controller 282.

The RAID controller 282 corrects the input data sequentially in real time as described herein above.

The error-corrected video data output from the RAID controller is supplied to the video processing section 283, and the clock is changed to a clock of a lower frequency. The data output from the video processing section 283 is supplied from the input-output controller 284 to the matrix switcher section 21 of the editing system 1 through the SDI.

The matrix switcher section 21 indicates the output processor 32-2 to convert the video data entered from the prescribed channel of the SDI to the video signal of SDI format, and to delivers to the main monitor 4 for displaying. Thus a user can view an image recorded in the hard disk 201.

When a prescribed indication is entered from the host personal computer 3, the matrix switcher section 21 of the editing system 1 supplies the video data taken in from the disk recorder 2 to the video processing section 22. In the video processing section 22, the demultiplexer circuit 41-1 takes in a key signal contained in the input video packet of SDI format, and delivers it to the key signal processing circuit 51-1. The demultiplexer circuit 41-2 delivers the video signal component taken out from the input video packet of SDI format to the video signal processing circuit 51-2.

When a user controls the host personal computer 3 to enter a prescribed command, the control block 45 of the video processing section 22 receives the command from the host personal computer 3 through the control bus 25, and controls the wipe signal generating circuit 52-1 correspondingly to this command. The wipe signal generating circuit 52-1 generates a wipe signal corresponding to the command from the control block 45, and supplies the wipe signal to the key signal processing circuit 51-1 and the video signal processing circuit 51-2. The key signal processing circuit 51-1 and the video signal processing circuit 51-2 process the key signal and the video signal correspondingly to the wipe signal entered from the wipe signal generating circuit 52-1 and delivers it to the mix circuit 71-2.

Also the demultiplexer circuit 41-3 and demultiplexer circuit 41-4 extract a key signal and video signal of another channel in the same manner as the demultiplexer circuits 41-1 and demultiplexer circuit 412, and respectively delivers to the key signal processing circuit 51-3 and the video signal processing circuit 51-4. The wipe signal generating circuit 52-2 generates a wipe signal correspondingly to the command from the control block 45, and delivers it to the key signal processing circuit 51-3 and the video signal processing circuit 51-4. The key signal processing circuit 51-3 and the video signal processing circuit 51-4 process the key signal and video signal correspondingly to the wipe signal entered from the wipe signal generating circuit 52-2, and respectively deliver to the frame memory 61-1 and frame memory 61-2.

The three dimensional address generation circuit 63 receives the command from the host personal computer 3 through the control block 45, and delivers a three dimensional address coordinate corresponding to this command to the frame memory 61-1 and frame memory 61-2. As the result, the key signal and video signal which are converted to the three dimensional coordinate respectively are read out from the frame memory 61-1 and the frame memory 61-2, and supplied respectively to the interpolator 62-1 and the interpolator 62-2. The interpolator 62-1 and the interpolator 62-2 perform interpolation respectively on the input key signal and video signal correspondingly to the three dimensional coordinate address from the three dimensional address generation circuit 63, and deliver to the mix circuit 71-2.

The background video signal which the demultiplexer circuit 41-5 has extracted from the prescribed input of the matrix switcher section 21 is supplied to the mix circuit 71-1. The mix circuit 71-1 mixes the video signal which has been subjected to special effect delivered from the interpolators 62-1 and 62-2 with the background video signal delivered from the demultiplexer circuit 41-5 properly, and delivers the mixed video signal to the mix circuit 71-2. The mix circuit 71-2 mixes the output from the mix circuit 71-1 with the output of the key signal processing circuit 51-1 for processing a key signal which has been subjected to transition effect and the output of the video signal processing circuit 51-2 properly, and delivers the mixed video signal.

The output of the mix circuit 71-2 and the mix circuit 71-1 is supplied to the matrix switcher section 21.

When a prescribed command is entered from the host personal computer 3 in the matrix switcher section 21, the video signal processed in the video processing section 22 is selected properly, and supplies to any one of output processors 32-3 to 32-12, further supplied from any one of output combiners 33-1 to 33-10 to the disk recorder 2, and written in the hard disk 201.

On the other hand, in the case that the audio signal has been entered to the matrix switcher section 21, the control block 34 selects it properly, and supplies it to the audio processing section 23. In the audio processing section 23, the separators 81-1 to 81-3 separate the embedded audio signal from the input SDI signal, and supplies it to the mixer block 83. In the mixer block 83, the control block 86 adjusts the variable resistors 91-1 to 91-6 to a prescribed value properly corresponding to the command from the host personal computer 3. As the result, the audio signal separated by the separators 81-1 to 81-3 is adjusted to a prescribed level, and supplied subsequently and added to the adder 92-1 or the adder 92-2.

The audio signal delivered from the adder 92-1 or the adder 92-2 is entered to the embedded circuit 85, subjected to time axis compression, and converted to an embedded audio signal, and subsequently supplied to any prescribed one of the combiners 33-1 to 33-10 of the matrix switcher section 21. The combiners 33-1 to 33-10 superimpose the input audio signal on the vertical return segment of the input video signal, supply it to the disk recorder 2, and the superimposed signal is recorded in the hard disk 201.

The audio signal delivered from the adder 92-1 or the adder 92-2 of the mixer block 83 comes out from the speaker 6 through the amplifier 5.

The video data processed in the editing system is supplied properly from the output processor 32-1 to the host personal computer 3.

In this disk recorder 2, because high speed access is possible, it is possible that the multi-channel video data is reproduced simultaneously from the hard disk 201 and processed simultaneously in the video block 271. Therefore, it is also possible that the video data of a plurality of channels reproduced simultaneously from the hard disk 201 is synthesized to form a synthesized image of 1 channel.

Further as shown in FIG. 63, it is assumed that, for example, the stream A, stream B, and stream C are respectively reproduced from the source VTR 9 and recorded. The stream A consists of the frame $A_1$ to frame $A_5$ which are continuous in the time, the stream 2 consists of the frame $B_1$ to frame $B_5$ which are continuous in the time, and the stream 3 consists of the frame $C_1$ to frame $C_5$ which are continuous in the time. These frame $A_1$ to frame $A_5$, frame $B_1$ to frame $B_5$, and frame $C_1$ to frame $C_5$ are streams which are to be reproduced in the order of suffix numbers.

In the state that the stream A to stream C is stored in the hard disk 201, when the host personal computer 3 specifies these respective frames in frame unit in the order of, for example, the frame $A_4$ of the stream A, the frame $B_1$ of the stream B, the frame $A_1$ of the stream A, and the frames $C_3$ and $C_1$ of the stream C, the respective frames are reproduced in the order in real time, and delivered to the main monitor 4 for displaying. In this case, the streams of the frame $A_4$, $B_1$, $A_1$, $C_3$, and $C_1$ are not recorded actually in the hard disk 201, but merely the order of frames to be reproduced is specified on the host personal computer 3 side. In detail, when a data string of the frame corresponding to the stream 1 is supplied from the host computer 3 to the controller 262 of the CPU block 261 of the disk recorder 2, the controller 262 stores it in the RAM 263. The controller 262 of the CPU block 261 sequentially reads out the image data of the respective frames from the hard disk 201 in the order corresponding to the data string stored in the RAM 263 and reproduce it.

Similarly, as shown in FIG. 63, merely by performing the process that the host personal computer 3 specifies the data string of frames $B_3$, $B_2$, $C_1$, $A_1$, and $A_2$ and the data string is transferred to the disk recorder 2 and stored in the RAM 263, the stream corresponding to the stored data string is read out from the hard disk 201 as the stream 2 and reproduced. In the case that a plurality of monitors are used for monitoring, the stream 1 and stream 2 are delivered simultaneously to respective monitors for displaying.

Next, the detailed structure of the audio block 231 of the disk recorder 2 to which the audio signal is supplied is described with reference to FIG. 64 herein under. The DMA controller 241 supplies an audio signal supplied from the FIFO 502 to the buffer controller 211-8 through the DMA bus 251 for DMA-transferring it to the corresponding data buffer 212-8, and reads the audio signal read out from the data buffer 212-8 though the DMA bus and supplies it to the FIFO 501.

The FIFO 501 delivers the audio signal supplied from the DMA controller 241 to any FIFO of the FIFO's 504-1 to 504-24 based on the command supplied from the controller 262 to the FIFO 503 through the control bus 252. The FIFO 504 supplies the audio signal entered from the FIFO's 505-1 to 505-24 to the DMA controller 241.

The FIFO 504-i, FIFO 505-i, channel DSP 506-i, ring buffer 507-i, and interface (I/F) 508-i (i=1, 2, . . . ) constitutes one slot module having audio signal recording/reproducing function. Therefore, there is a 24 channel slot module in the audio block 231. The operation of the slot module will be described with reference to FIG. 66 hereinafter.

The channel DSP 506-i stores the audio signal supplied from the FIFO 504-i in the ring buffer 507-i, reproduces and fades the data, and delivers it to the interface 508-i. The channel DSP 506-i stores the audio signal supplied from the interface 508-i in the ring buffer 507-i, reproduces the data, and delivers it to the FIFO 505-i. The interface 508-i delivers the audio signal reproduced from the ring buffer 507-i to the fixed speed reproduction system namely normal bus 514 and the variable speed reproduction system namely variable bus 515.

The cross fade DSP 513 controls the parallel mixers 509-1 and 509-2 to cross-fade 24 reproduction signals entered from respective slot modules through the normal bus 514, and to deliver the synthesis signal of 8 channels. Each of the synthesis signals $O_0$ to $O_{15}$ is added with reproduction signals $I_0$ to $I_{23}$ for 24 channels which are multiplied by coefficients $K_i$ ($K_i$=0 or 1) as shown in the following equation (13).

$$O_n = K_0 I_0 + K_1 I_1 + \ldots + K_{23} I_{23} (n=0 \text{ to } 15) \quad (13)$$

The variable speed reproduction processor 510 synthesizes the reproduction signal of 24 channels entered through the variable bus 515 to form the synthesis signal of 4 channels in the same manner as the parallel mixer 509, and performs varying-speed (program play) processing such as expansion or compression of the time axis and delivers it. The musical interval of reproduction signal delivered from the variable speed reproduction processor 510 is changed and kept constant regardless of the degree of varying-speed reproduction.

Because the parallel mixers 509-1 and 509-2 and the variable speed reproduction processor 510 operate independently, it is possible to process the reproduction signal supplied from the same slot module using the parallel mixers 509-1 and 509-2 and variable speed reproduction processor 510.

The router DSP 511 implements compensation of delay due to the difference in process time between the parallel mixer 509 and the variable speed reproduction processor 510 based on the program recorded in the RAM 512, and delivers the signal of 16 channels out of the 20 channels which is the total of the signal of 16 channels delivered from the parallel mixer 509 (fixed speed reproduction system) and the signal of 4 channels delivered from the variable speed reproduction processor 510 (variable speed reproduction system) to the input-output (I/O) controller 242 according to the command from the controller 262.

Figure 65:
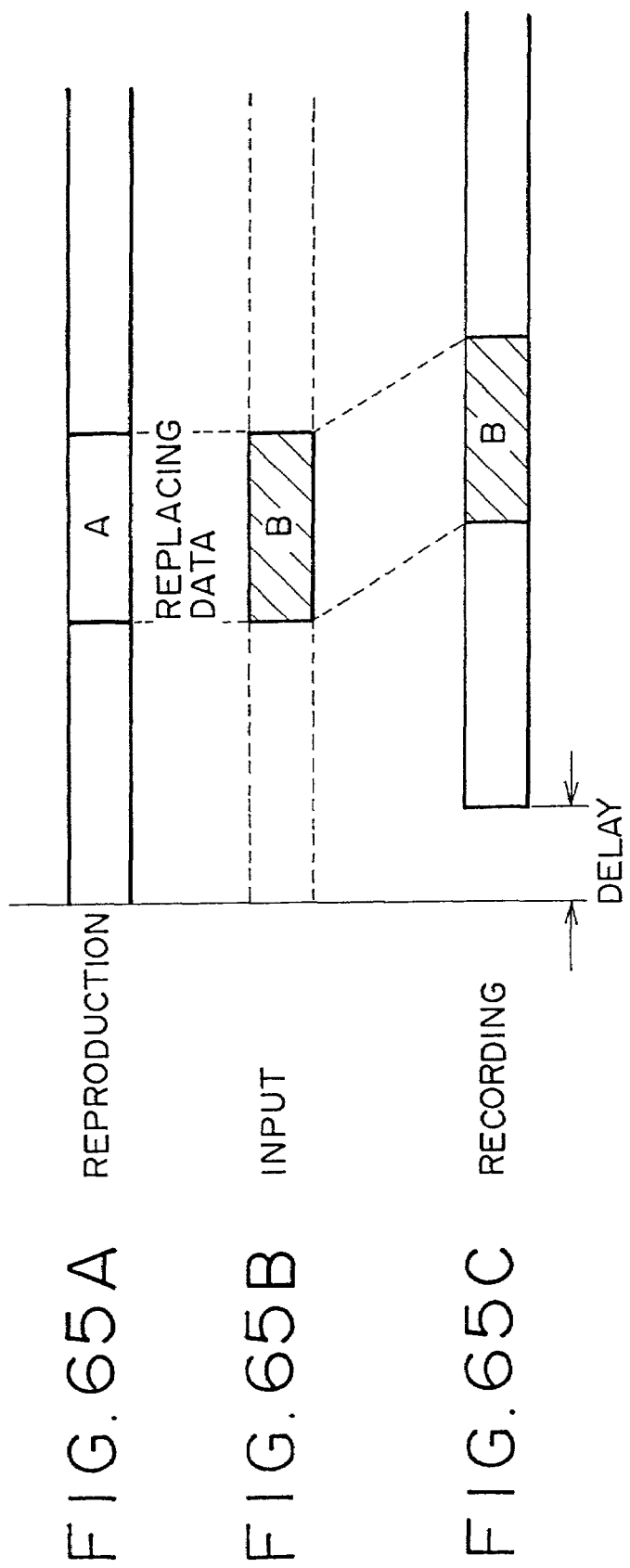
FIGS. 65A to 65C are diagrams for describing insert processing of audio.

In this embodiment, while the audio signal is reproducing, a part of the audio signal is rewritten synchronously with the sound. In detail, as shown in FIG. 65A, the audio signal which contains a part A to be modified (replaced) is reproduced, at the timing of reproduction of the part A to be modified, the input of data B for replacing is received as shown in FIG. 65B, and the data B to be placed on the position where the part A to be modified is recorded as shown in FIG. 65C.

Figure 64:
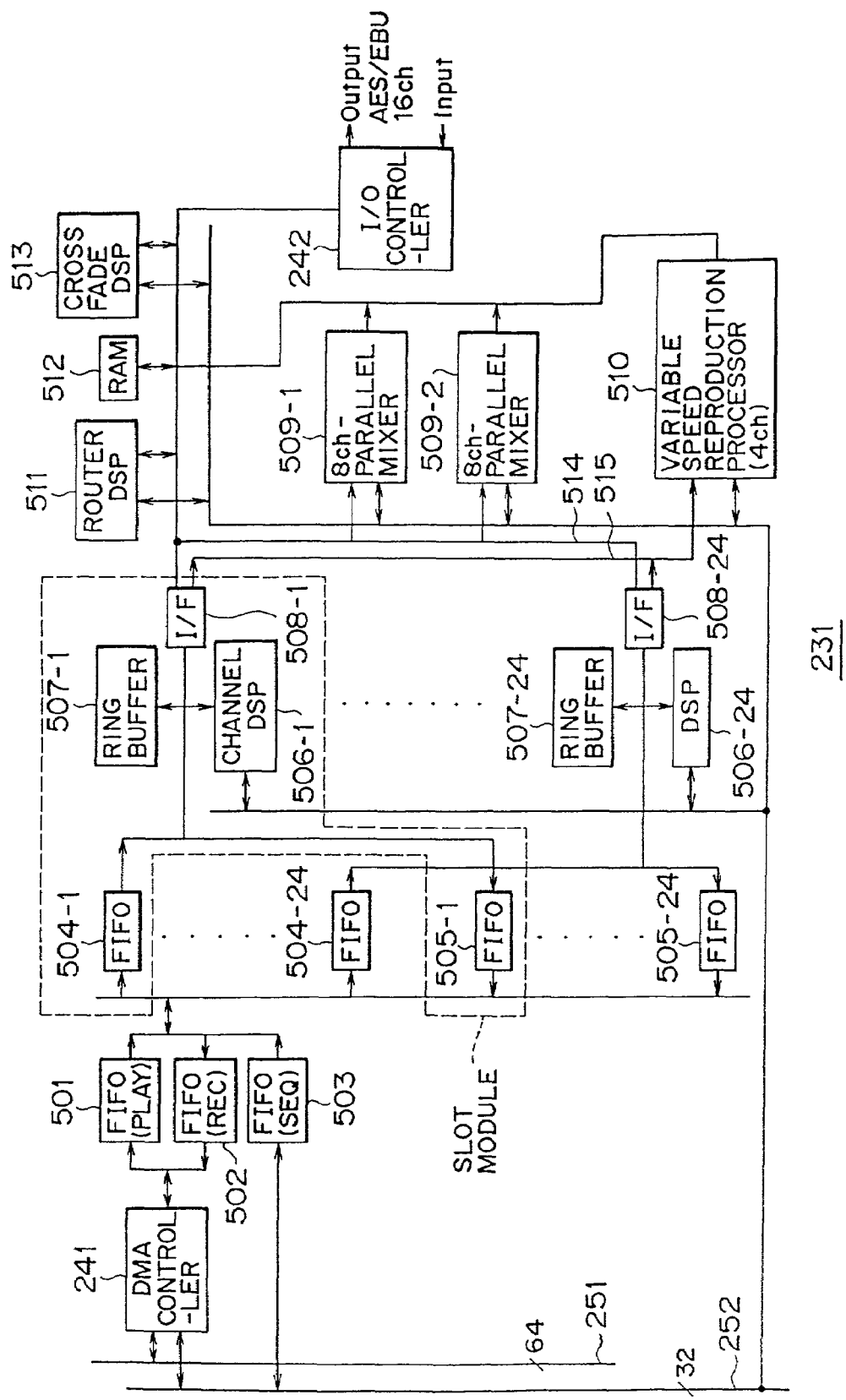
FIG. 64 is block diagram for illustrating an exemplary detailed structure of the audio block 231 shown in FIG. 7.
Figure 66:
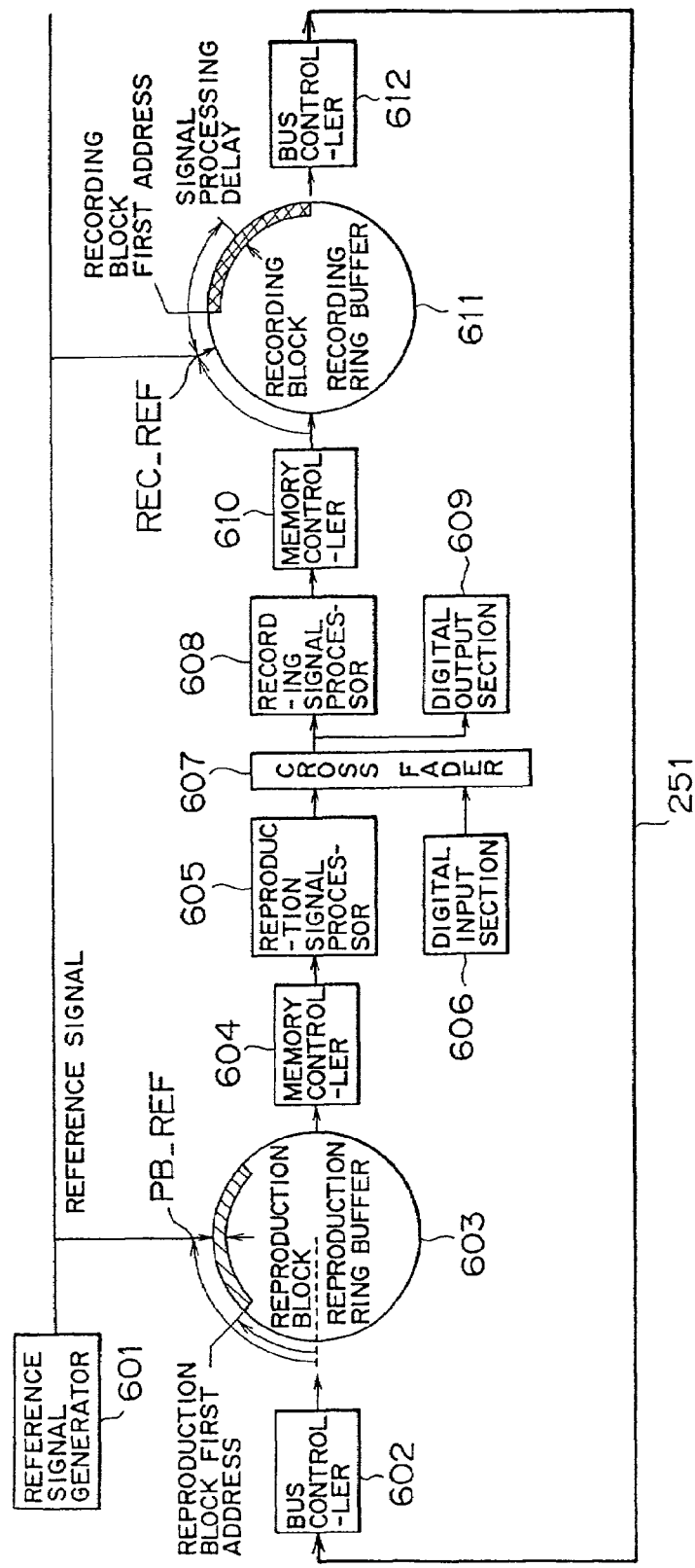
FIG. 66 is a block diagram for illustrating processing performed by the audio block 231 shown in FIG. 64.
Figure 67:
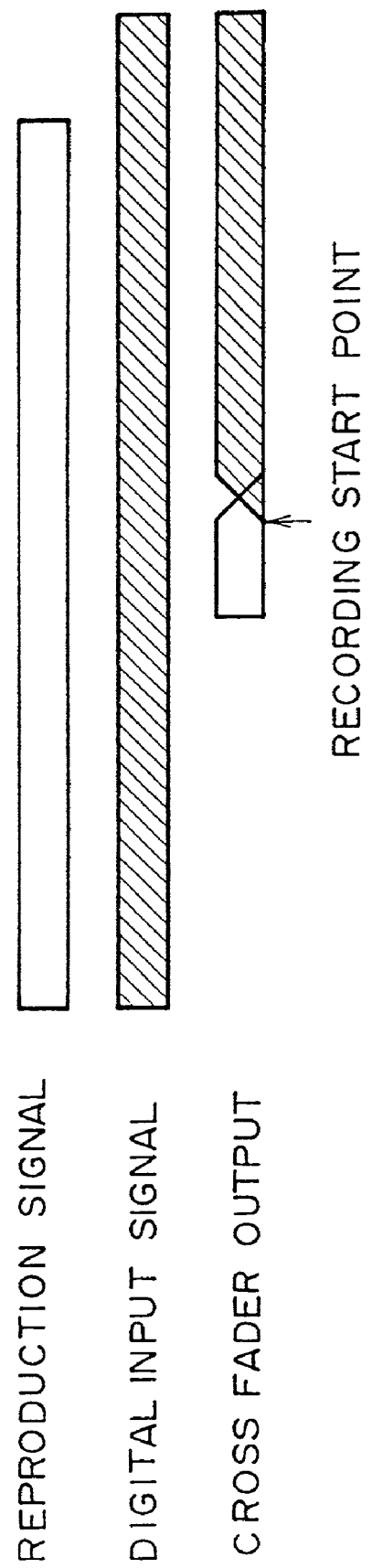
FIG. 67 is a diagram for describing processing performed by the cross fader 607 shown in FIG. 66.

FIG. 66 shows the partial structure for performing such process, which corresponds to the structure of the audio block 231 shown in FIG. 64 mainly.

A reference signal generator 601 generates a reference signal and supplies it to a reproduction ring buffer 603 and a recording ring buffer 611. The frequency of the reference signal is arbitrary, and only the simultaneity is required. The reference signal generator 601 is equivalent to the controller 262, and in this embodiment, generates reference signals every 1 frame period of the video signal. Such operation allows the reference signal generator 601 to generate the proper reference signal even if the video signal is changed from the normal reproduction to variable speed reproduction (program play).

A bus controller 602 is equivalent to the DMA controller 241, reads out the audio signal from the hard disk 201 through the DMA bus 251, and transfers it to the reproduction buffer 603. Transfer is discontinuous temporally.

The reproduction ring buffer 603 and recording ring buffer 611 are independent buffers each other logically, and are under address management in the form of a ring. However, the reproduction ring buffer 603 and the recording ring buffer 611 are combined physically, and equivalent to the ring buffer 507. The reproduction ring buffer 603 records the transferred data in the address specified by the bus controller 602, and delivers the address for indicating the timing when a reference signal is supplied from the reference signal generator 601 to a memory controller 604.

The memory controller 604 reproduces the discontinuous data recorded in the reproduction ring buffer 603 using the clock of fixed frequency of 48 kHz, and delivers it to a reproduction signal processor 605 as the continuous signal. The reproduction signal processor 605 performs prescribed processing such as level calculation, interpolation processing for variable speed reproduction, and frequency characteristic change on the continuous signal, and delivers it to a cross fader 607. The memory controller 604 and the reproduction signal processor 605 are equivalent to the channel DSP 506.

The cross fader 607 is equivalent to the cross fader DSP 513, and switches any one of the reproduction signal from the reproduction signal processor 605 and the digital input signal from a digital input section 606 (equivalent to the input-output controller 242), and delivers the signal to the subsequent sections. When the cross fader 607 is switched to the reproduction signal side, the reproduction signal delivered from the reproduction signal processor 605 is delivered to the subsequent stage, on the other hand, when the cross fader 607 is switched to the digital input signal side, the digital input signal delivered from the digital input section 606 is delivered to the subsequent stage, and during switching transition, the reproduction signal and digital signal are faded in or faded out and synthesized, and delivered to the subsequent stage.

The output signal from the cross fader 607 is delivered from a digital output section 609 (equivalent to the input-output controller 242) to the outside of the apparatus for monitoring, and delivered to a recording signal processor 608, in which subjected to processing such as level change and frequency characteristic change, and delivered to a memory controller 610. The memory controller 610 stores the signal continuously in the arbitrary address of the recording ring buffer 611. The recording signal processor 608 and the memory controller 610 are equivalent to the channel DSP 506.

The recording ring buffer 611 delivers the address which indicates the timing when the reference signal is supplied from the reference signal generator 601 to the memory controller 610.

The audio signal to be recorded in the reproduction ring buffer 603 and the recording ring buffer 611 is generally managed in the form of block having arbitrary data size, and the signal reproduced from these buffers 603 and 611 is managed in block unit. In this embodiment, 1 block is composed of 128 k byte audio signal corresponding to 10 frame video signal.

Figure 68:
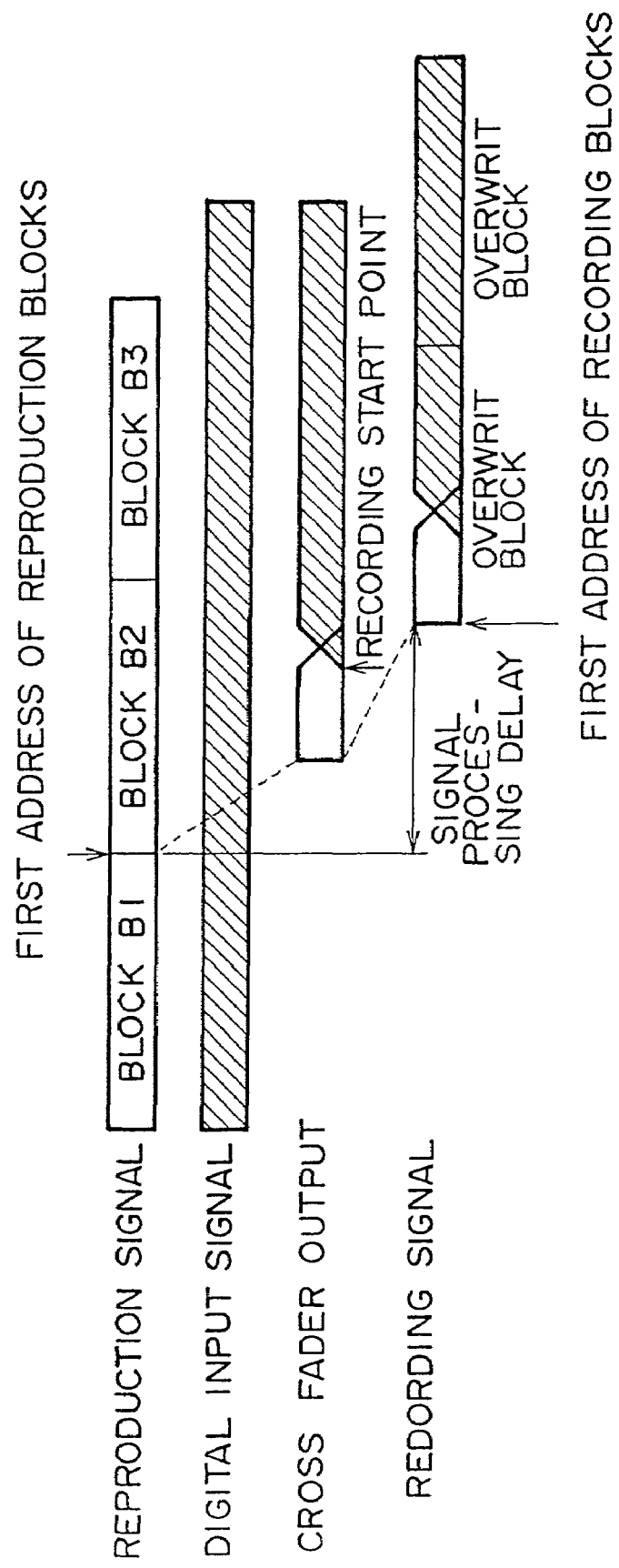
FIG. 68 is a diagram for describing processing performed by the cross fader 607 shown in FIG. 66.

For example as shown in FIG. 68, in the case that the signal is switched to the digital input signal entered from the digital input section 606 in the middle of the block B2 of the reproduction signal reproduced from the reproduction ring buffer 603 and recorded in the recording buffer 611, the reproduction signal is faded out and the digital input signal is faded in as described herein above as the output from the cross fader 607. The timing when the output signal (recording signal) is recorded in the recording ring buffer 611 delays from the reproduction signal due to processing in the memory controller 604, reproduction signal processor 605, cross fader 607, recording signal processor 608, and memory controller 610.

If the recording signal is segmented in block unit at the quite same phase as that of block segment of the reproduction signal when the recording signal is re-segmented into block unit, blocks B2, B3 of the original reproduction signal are replaced with overwrite blocks WB 2 and WB3, and the capacity of the hard disk 201 can be utilized usefully. In the case that overwrite blocks WB2 and WB3 are not overwritten on the blocks B2 and B3 and recorded on other area, the order of reproduction may be simply B1, WB2, and WB3.

To segment the recording signal into block unit in the quite same phase as the segment block of the reproduction signal, it is required to know the head address of the recording block (overwrite block WB2) in the recording ring buffer 611 correctly.

Figure 69:
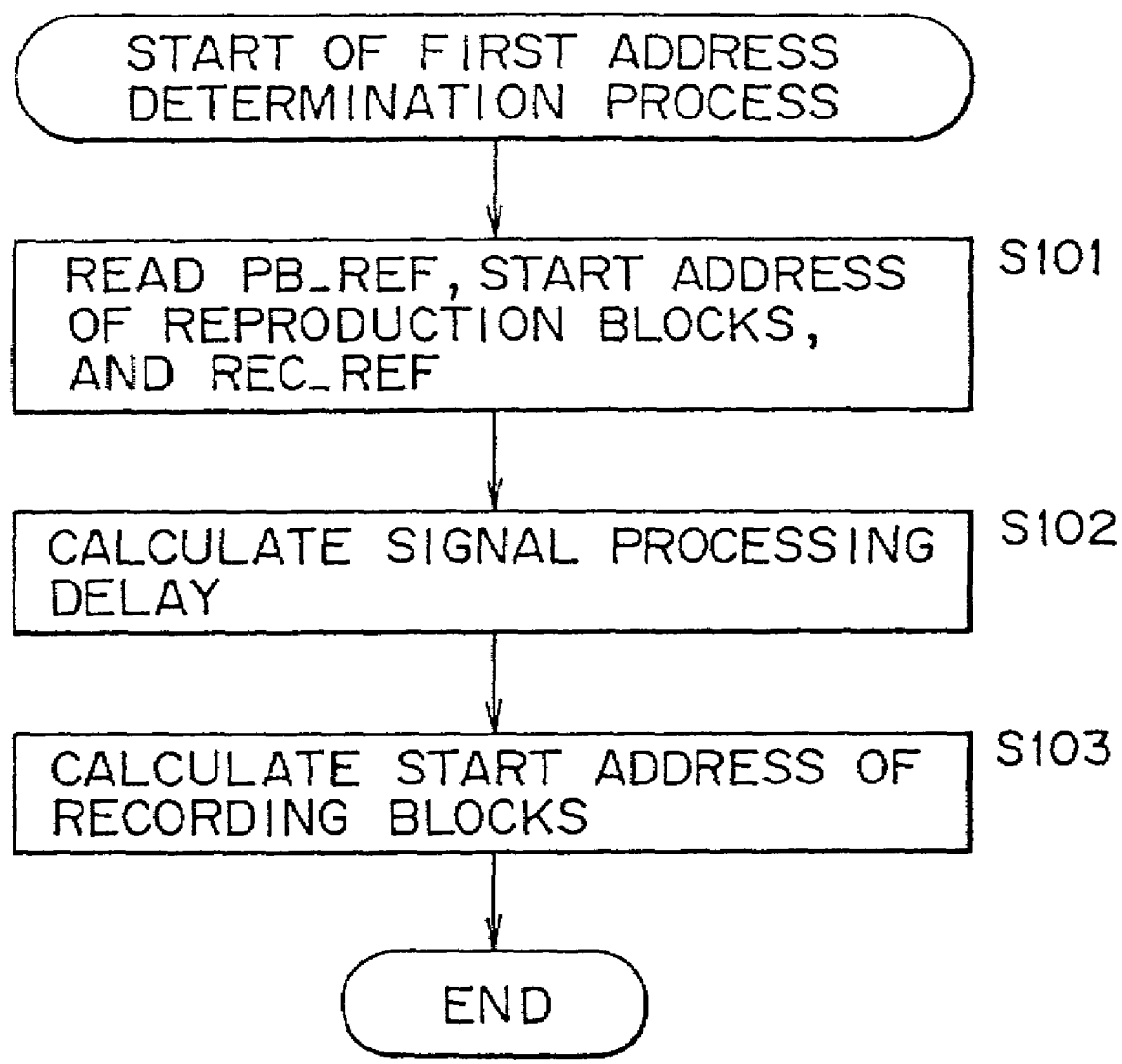
FIG. 69 is a flow chart for describing head address calculation processing performed by the recording block.

Processing to know the head address of the recording block is described with reference to a flow chart shown in FIG. 69. In the step S101, the head address of the block B2 in the reproduction ring buffer 603 and the position (PB_REF) of the reproduction ring buffer 603 located when the reference signal is supplied are read out by the memory controller 604, and delivered to the controller 262. When, the memory controller 610 delivers the position (REC_REF) of the recording ring buffer 611 corresponding to the same reference signal to the controller 262.

In the step S102, the controller 262 calculates the address quantity (signal processing delay) resultant from the rotation of the recording buffer 611 while the reproduction signal from the reproduction ring buffer 603 is processed in the memory controller 604, the reproduction signal processor 605, the cross fader 607, the recording signal processor 608, and the memory controller 610.

In the step S103, the controller 262 adds the signal processing delay to the head address of the reproduction block in the reproduction ring buffer 603, and further adds the difference (REC_REF-PB_REF) between the position (PB_REF) of the reproduction ring buffer 603 and the position (REC_REF) of the recording ring buffer 611 obtained when the same reference signal is supplied, and the head address of the recording signal block is thereby calculated.

recording block head address=reproduction block
head address+signal processing delay+REC_
REF−PB_REF (14)

Figure 70:
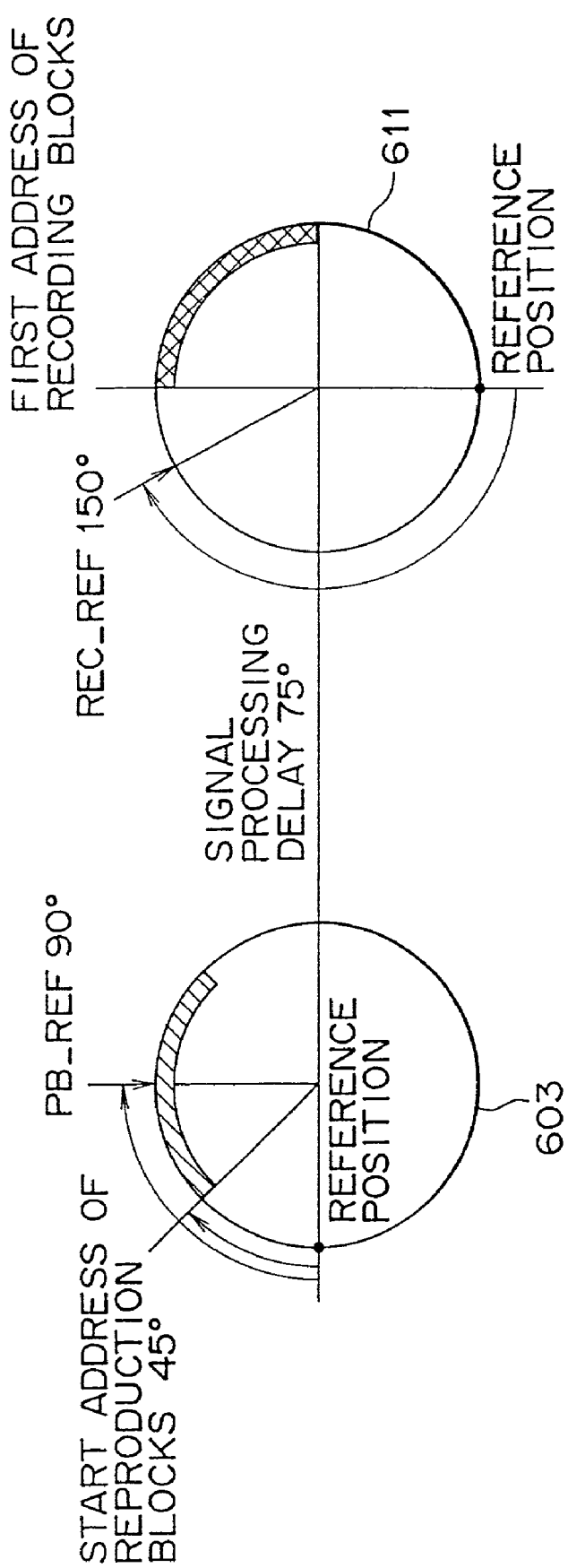
FIG. 70 is a diagram for describing head address calculation processing performed by the recording block.

For example, as shown in FIG. 70, in the diagram in which addresses of the reproduction ring buffer 603 and the recording ring buffer 611 are represented by the rotation angle from the arbitrary reference position respectively, the reproduction block head address is 45 degrees, PB_REF is 90 degrees, and REC_REF is 150 degrees. If the signal processing delay is 75 degrees, it gives the recording reproduction block head address of 180 degrees (=45+75+150−90), and the calculation result indicates the position at 180 degrees from the arbitrary reference position of the recording ring buffer 611.

The controller 262 stores this recording block head address, and DMA-transfers the data recorded in the recording block head address first, which has been calculated and stored, to the DMA bus 251 through the bus controller 612 when the recording block data (overwrite block WB2) is recorded on the hard disk 201.

The description returns to FIG. 66. The bus controller 612 reads the signal recorded on the recording ring buffer 611 as a discontinuous burst data, and delivers it to the DMA bus 251. This data is recorded on the hard disk 201.

Figure 71:
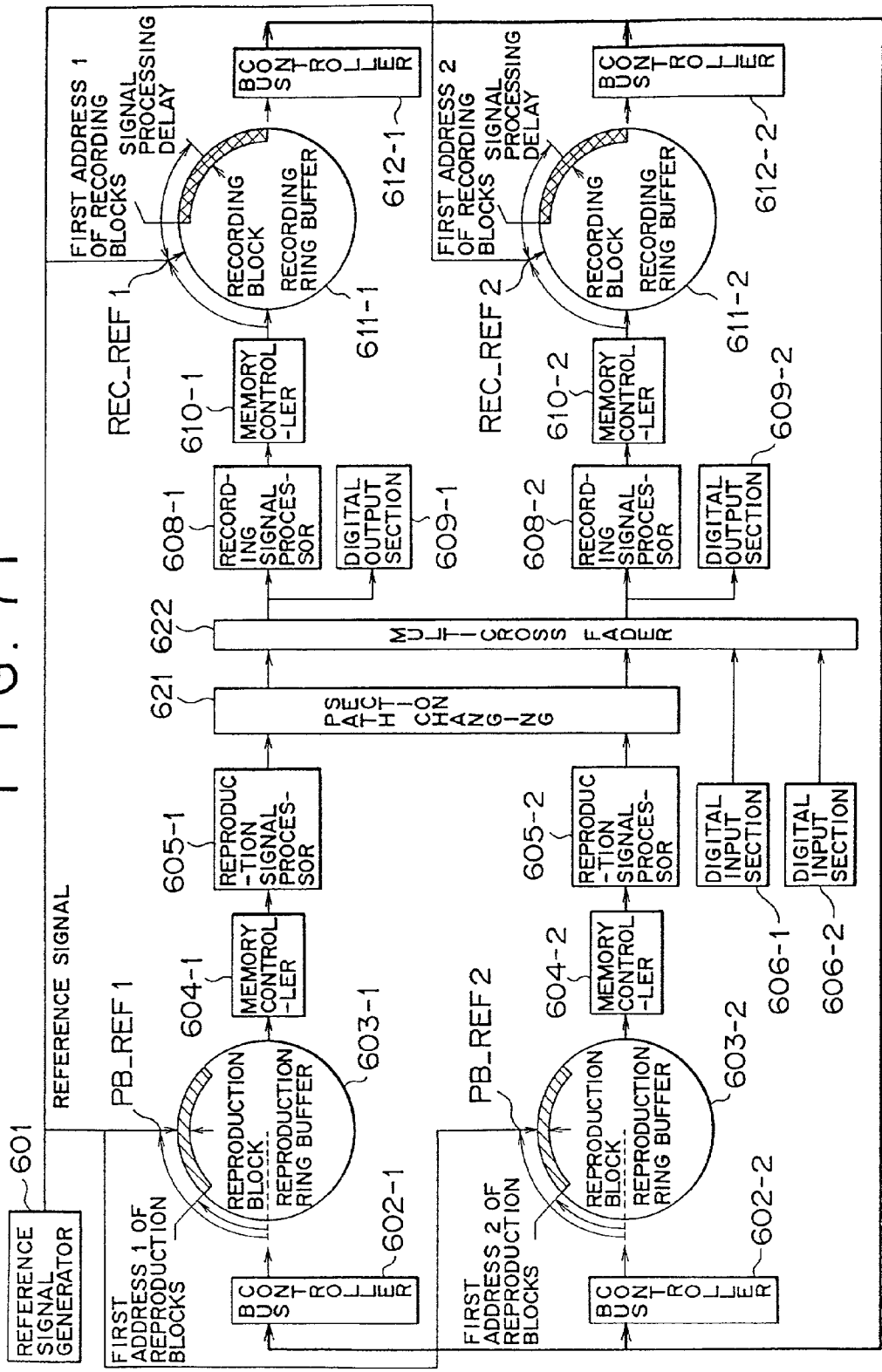
FIG. 71 is a block diagram for illustrating processing performed by the audio block 231 shown in FIG. 64.

FIG. 71 shows a structure comprising a plurality of reproduction signal blocks shown in FIG. 66 (bus controller 602, reproduction ring buffer 603, memory controller 604, and reproduction processor 605) and a plurality of recording signal blocks (recording signal processor 608, digital output section 609, memory controller 610, recording ring buffer 611, and bus controller 612) shown in FIG. 66, added with a path changing section 621. In FIG. 71, two reproduction ring buffers 603-1 and 603-2 and two recording ring buffers 611-1 and 611-2 are shown, however, there are 24 buffers respectively.

The path changing section 621 is equivalent to the router DSP 511, and supplies the reproduction signal from the reproduction signal processors 605-1 and 605-2 to the arbitrary input of a multi-cross fader 622 which is connected to the recording signal processor 608-1 or recording signal processor 608-2. The multi-cross fader 622 mixes the input reproduction signal with the digital input signal entered from the digital input sections 606-1 and 606-2 gradually, and delivers the mixed signal to the recording processors 608-1 and 608-2. The number of inputs and the number of outputs of the path changing section 621 are not necessarily equal, for example, it is possible that the output of both reproduction ring buffers 603-1 and 603-2 is supplied to the recording signal processor 608-1 and recorded on the recording ring buffer 611-1.

For example, the recording block head address 2 in the recording buffer 611-2 at the time when the reproduction signal reproduced from the reproduction ring buffer 603-1 is recorded on the recording ring buffer 611-2 is calculated from the following equation (15).

recording block head address 2=reproduction block head address 1+signal processing delay+*REC_REF*2−*PB_REF*1  (15)

REC_REF 2 is the address of the recording ring buffer 611-2 corresponding to the reference signal, and PB_REF 1 is the address of the reproduction ring buffer 603-1 corresponding to the same reference signal. Further, the reproduction block head address 1 is the head address of the reproduction block of the reproduction ring buffer 603-1.

As described herein above, by introducing the path changing section 621, the reproduction ring buffers 603-1 and 603-2 and the recording ring buffers 611-1 and 611-2 are used in any arbitrary combination, and the independence of the reproduction signal block and the recording signal block is improved.

Figure 72:
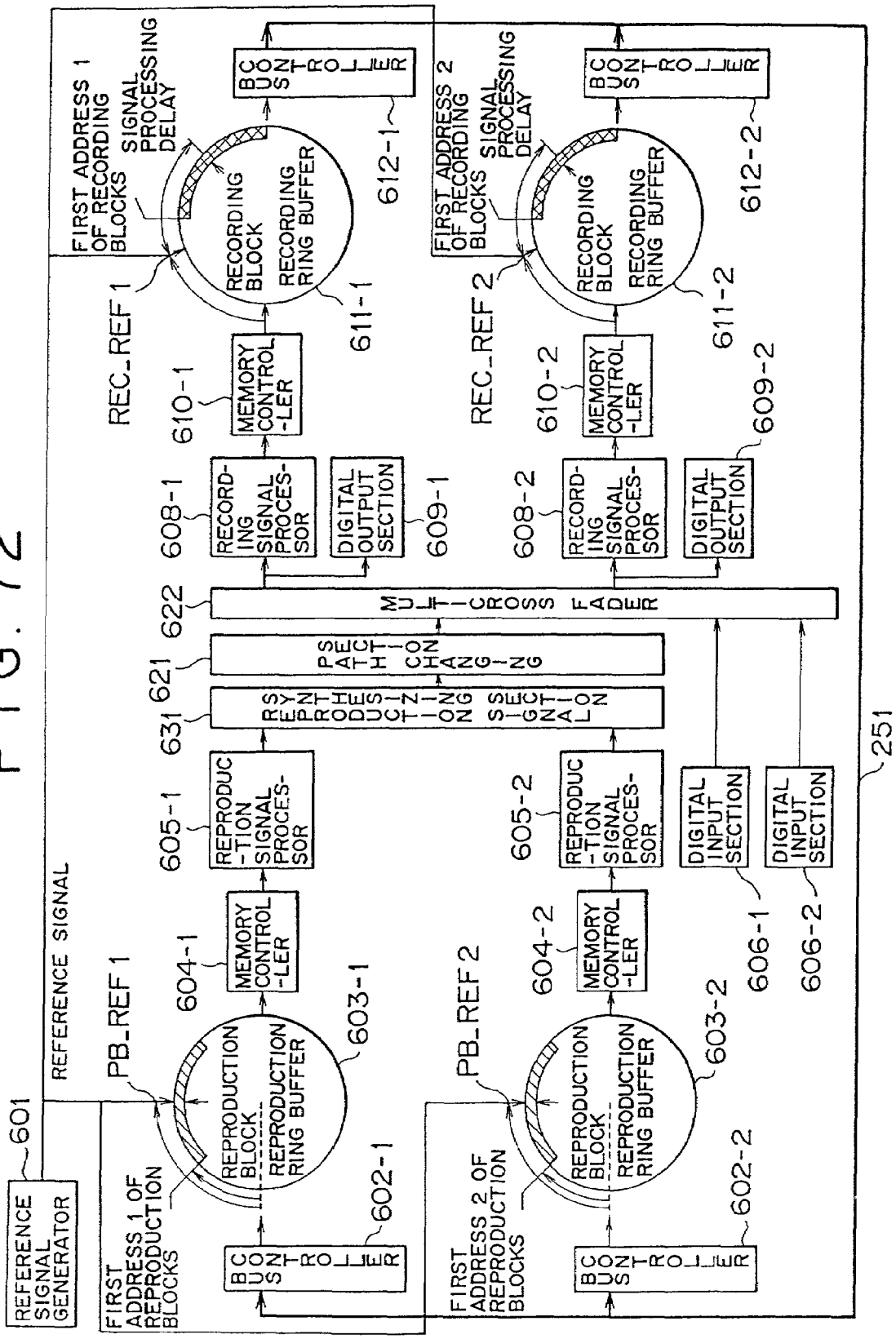
FIG. 72 is a block diagram for illustrating processing performed by the audio block 231 shown in FIG. 64.

FIG. 72 is the structure which is structured by adding a reproduction signal synthesizing section 631 to the structure shown in FIG. 71, the reproduction signal synthesizing section 631 is equivalent to the parallel mixer 509 which is controlled by the router DSP 511. The reproduction signal synthesizing section 631 synthesizes the reproduction signal from a plurality of reproduction signal processors 605 (in this example, reproduction signal processors 605-1 and 605-2) in any arbitrary combination. For example, in the case that reproduction signals $P_1$ to $P_4$ from 4 reproduction signal processors 605 are combined arbitrarily to synthesize synthesis signals $M_1$ to $M_4$, synthesis signals $M_1$ to $M_4$ are calculated according to the following equation (16).

synthesis signal $M_1 = K_1 P_1 + K_2 P_2 + K_3 P_3 + K_4 P_4$ synthesis signal $M_2 = K_5 P_1 + K_6 P_2 + K_7 P_3 + K_8 P_4$ synthesis signal $M_3 = K_9 P_1 + K_{10} P_2 + K_{11} P_3 + K_{12} P_4$ synthesis signal $M_4 = K_{13} P_1 + K_{14} P_2 + K_{15} P_3 + K_{16} P_4$ Coefficients $K_1$ to $K_{16}$ are 0 or 1.

Figure 73:
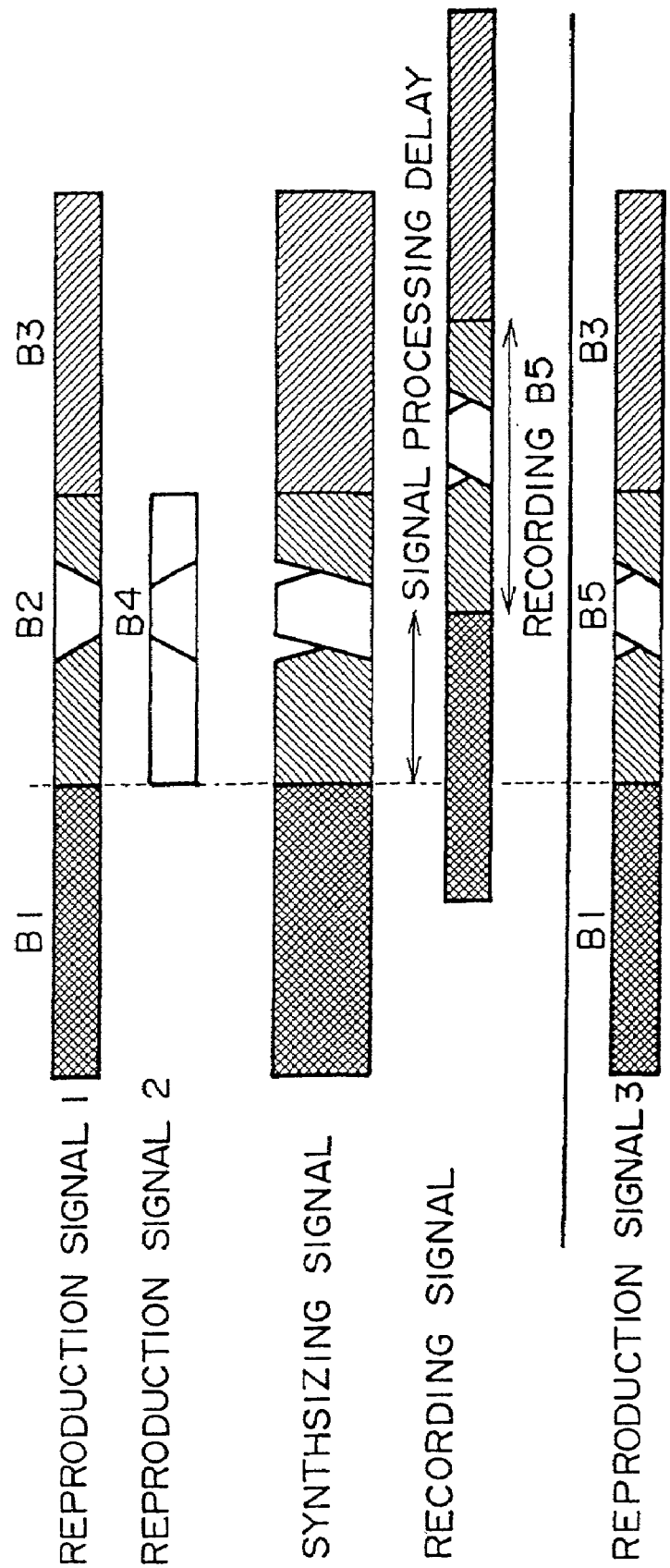
FIG. 73 is a diagram for describing an example of the signal which the multi-cross fader 622 shown in FIG. 72 synthesizes.

According to the structure shown in FIG. 72, the synthesis signal which is formed by connecting a plurality of reproduction signals as shown in FIG. 73 intermittently can be generated. In detail, the block B2 of the reproduction signal 1 and the block B4 of the reproduction signal 2 are combined, and the combined synthesis signal (block B5) can be recorded. When this recorded signal is reproduced, the signal is reproduced in the order of block B1, block B5, and block B3.

As described herein above, the reproduction signal processing block and the recording signal processing block are highly independent, and can be combined arbitrarily, therefore for example, when a signal processing block is in failure, the process which is performed by this signal processing block can be performed by another signal processing block. Further, for example, when it is required to synthesize many reproduction signals in a short time, a prescribed number of reproduction signals out of many reproduction signals is synthesized and recorded temporarily, and residual reproduction signals are combined to the recorded signal, and the number of reproduction signal processing blocks which are operated simultaneously can be reduced thereby.

Further, for example, 24 channel reproduction signal processing blocks and recording signal processing blocks are used as 6 independent apparatuses, each apparatus comprises 4 channel reproduction signal processing blocks and recording signal processing blocks. Alternatively, arbitrary number of reproduction signal processing blocks and recording signal processing blocks out of 24 channel reproduction signal processing blocks and recording signal processing blocks are allocated for use as the audio signal corresponding to 6 channel video signal.

Next, the reference signal generated from the reference signal generator 601 is described. As described herein above, in the case of this embodiment, the reference signal is generated at the timing when the sync signal of 1 frame video signal is reproduced (video frame frequency). Therefore, in the case that the audio signal corresponding to the video signal is reproduced at a normal rate, the period of reproduction of 1 frame is regarded as fixed period, the generation timing of the reference signal can be calculated, and it is not necessarily required that the reference signal is generated every frame.

However, the NTSC video frame frequency is 30000/1001 Hz, the ratio to 48 kHz, that is the audio sampling frequency, is 30000/1001:48000=1:1601.6, namely ininteger form, 5 frame 8008 words. As it is obvious from this ratio, the sampling period of the audio signal coincides with the video frame period only once per 5 frame video signal. As the result, when the audio signal is reproduced corresponding to the video signal from an arbitrary video frame, the deviation between the video signal and audio signal is accumulated gradually with time. To avoid this problem, it has been general to divides 8008 words, which is the number of samplings corresponding to 5 frames of the video signal, into, for example, 1602+1601+1602+1601+1602 (words) so that the sampling period of the audio signal is coincident with an arbitrary frame. Because the number of words is 1601 words or 1602 word and is not the same regarding the audio signal corresponding to each frame, it is not possible to calculate correct generation timing of REC_REF around the reference signal using generation timing of one reference signal.

Figure 74:
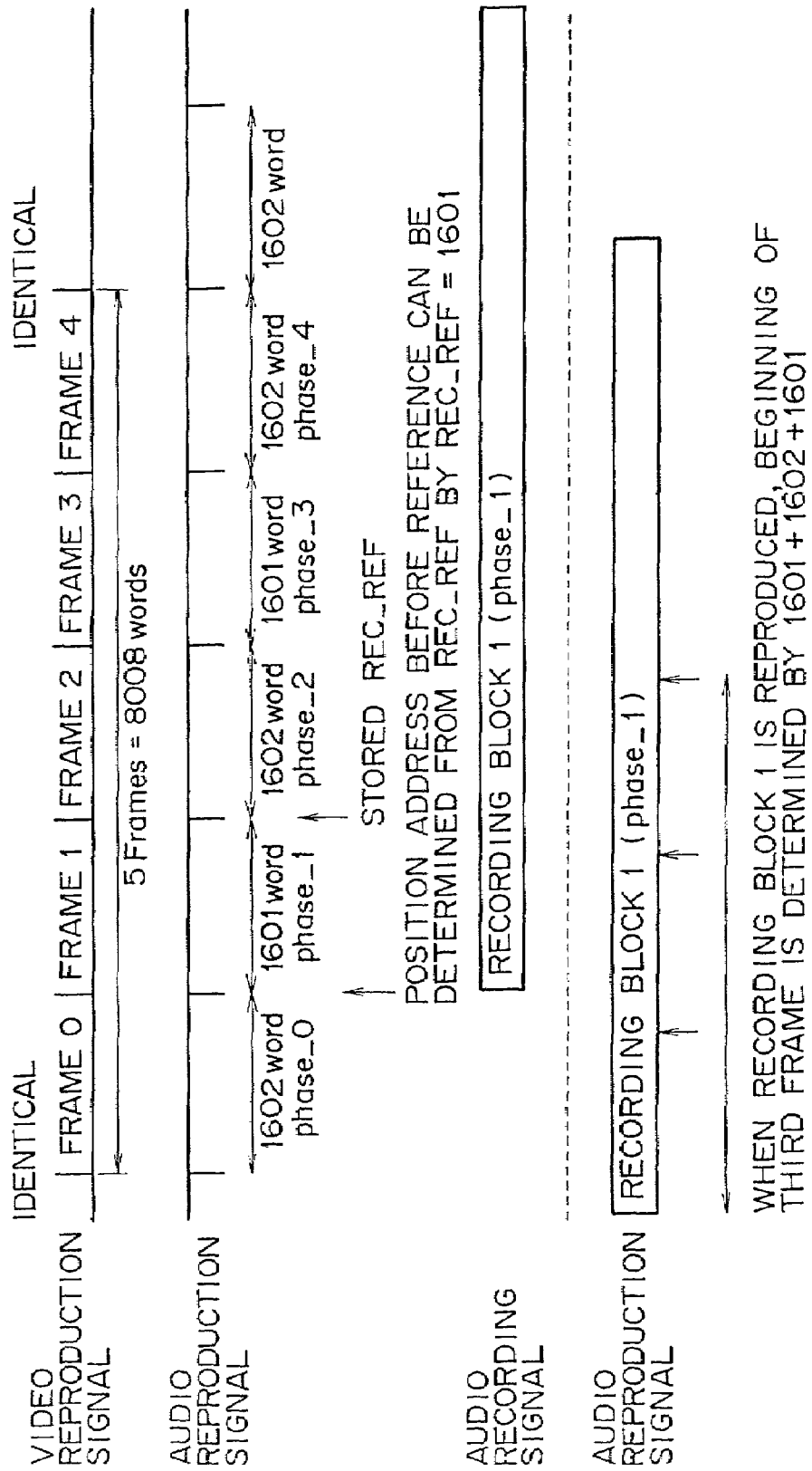
FIG. 74 is a diagram for describing the phase of the audio signal.

To calculate correctly the REC_REF around the reference signal from the reference signal in an arbitrary frame, as shown in FIG. 74, the phase 0 to phase 4 are set to the audio signal corresponding to the frame 0 to the frame 4 of the video signal, and the information is recorded. The phase 0, phase 2, and phase 4 consist of 1602 words respectively, and the phase 1 and phase 3 consists of 1601 words respectively.

For example, when the phase 1 and the following phases of the audio reproduction signal reproduced from the reproduction ring buffer 603 are recorded on the recording buffer 611, the information for indicating that the head of the recording block (recording BLOCK 1) is the phase 1 is recorded simultaneously together with the audio signal. This recording block is recorded on the hard disk 201 through the bus controller 612, and the DMA bus 251. In this case, when this block (recording BLOCK 1) is reproduced, the frame position is determined by referring the head phase information, for example, when the recording block is reproduced from the frame position of the third from the head of the corresponding video signal, the third frame position is determined correctly by calculating 1601+1602+1601 (words) because the head is the phase 1.

This phase information is the same for all the recording ring buffers 611 always regardless of the existence of record.

As described herein above, the variable speed reproduction processor 510 is capable of variable speed reproduction without changing musical interval of the input audio signal. To perform such processing, the source sound data string X(n), which is divided to segments (in this example, segment [0] to segment [E]) having a prescribed number of sampling N (N is a number of 2 to the power) as shown in FIG. 75A, and then, the data of the basic pitch period (described hereinafter) extending over two segments is thinned from the adjacent two segments as shown in FIG.

Figure 75:
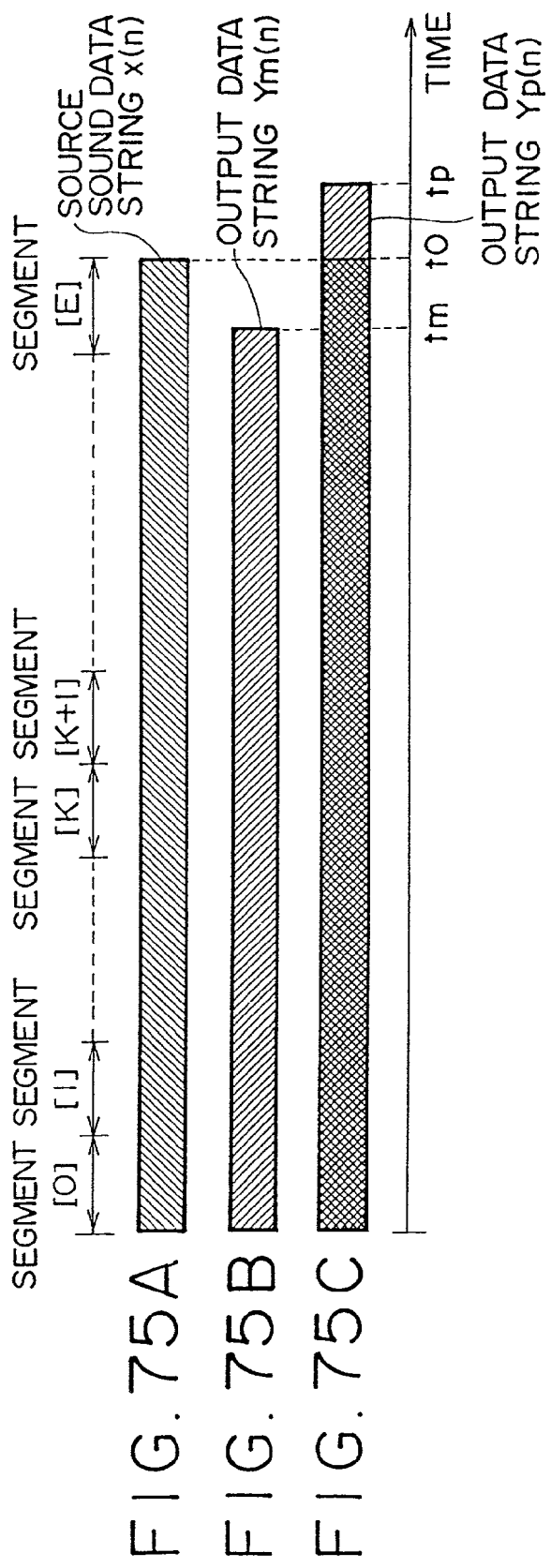
FIGS. 75A to 75C are diagrams for describing processing performed by the variable speed reproduction processor 510 shown in FIG. 64.

75B for compression-reproduction, and on the other hand, the data of the basic pitch period is interpolated between the adjacent segments as shown in FIG. 75C for expansion-reproduction.

FIG. 76 shows the detailed structure of the variable speed reproduction processor 510 for performing such processing. A memory 701 stores the input audio signal, and delivers the audio signal stored based on control of a memory control section 703 to a pitch extraction section 702 and an audio concatenation processor 704. The pitch extraction section 702 extracts the basic pitch period of the input audio signal, and supplies it to the audio concatenation processor 704 and the memory control section 703.

Generally, the autocorrelation function is used to determine the basic pitch period P of discrete-time sequence (source sound data sequence) X(n). The auto correlation function φ(m) of the discrete-time sequence (source sound data sequence) X(n) is calculated from the following equation (17).

$$\phi(m) = (\Sigma X(n) \cdot X(n+m))/N \quad m=0, 1, 2 \ldots, N-1 \quad (17)$$

Herein, m is correlation lug, and Σ is the sum of n from 0 to N−1.

Assuming that N is a number of 2 to the power in the equation (17), then calculation of 1/N can be performed by the shift circuit, and the autocorrelation function φ(m) is calculated from the result of the following equation (18).

$$\phi'(m) = (\Sigma X(n) \cdot X(n+m)) \quad m=0, 1, 2, \ldots, N-1 \quad (18)$$

Herein, m is correlation lug, and Σ is the sum of n from 0 to N−1.

Figure 77:
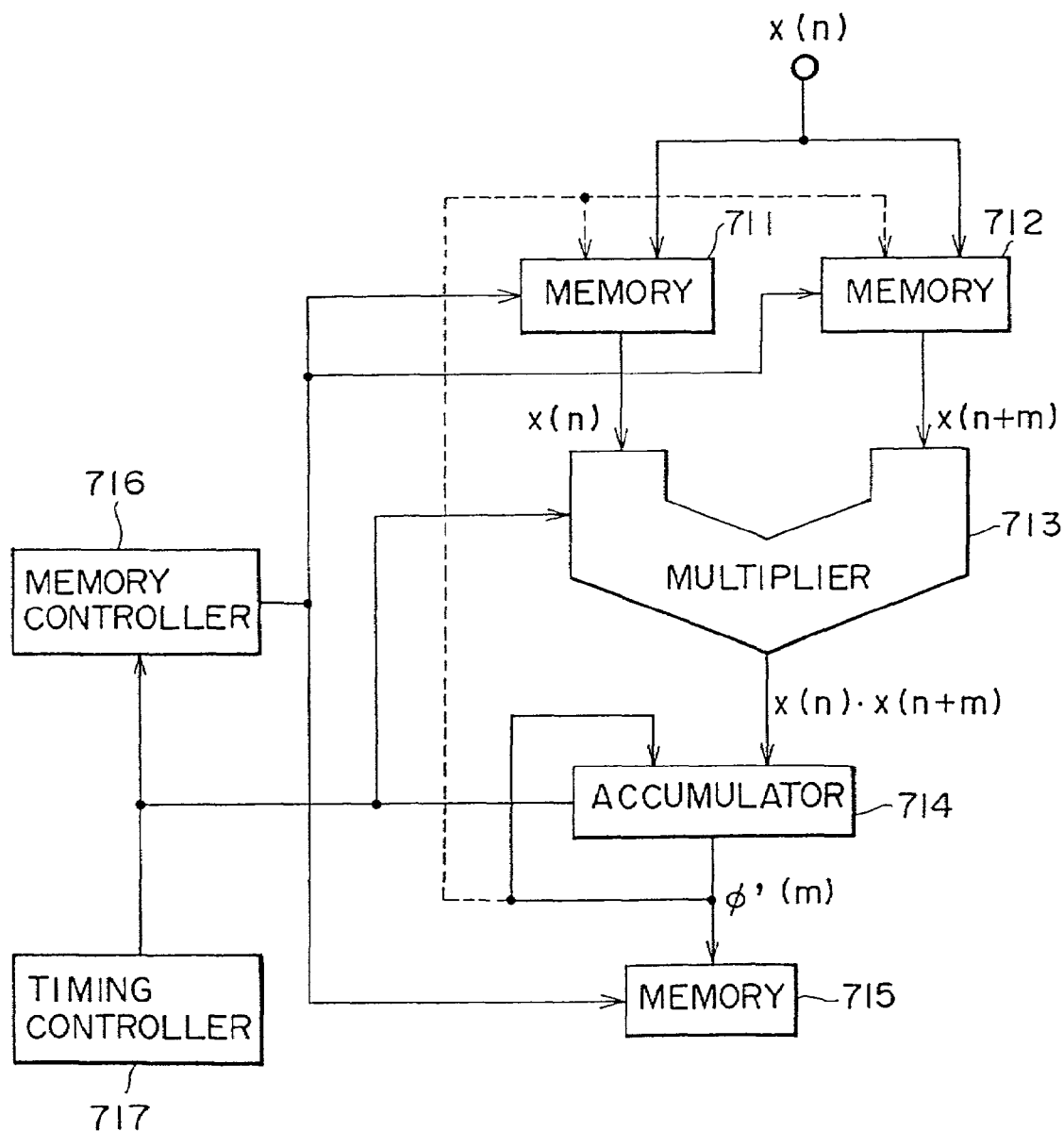
FIG. 77 is a block diagram for illustrating the detailed structure of the pitch extraction section shown in FIG. 76.
Figure 78:
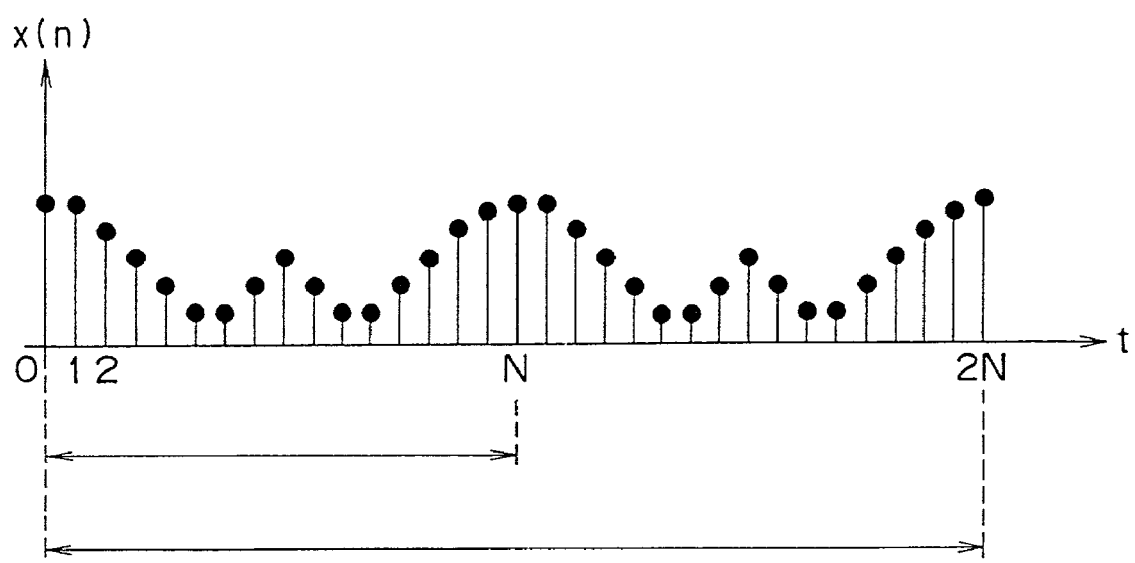
FIG. 78 is a graph for describing the source sound data string.
Figure 82:
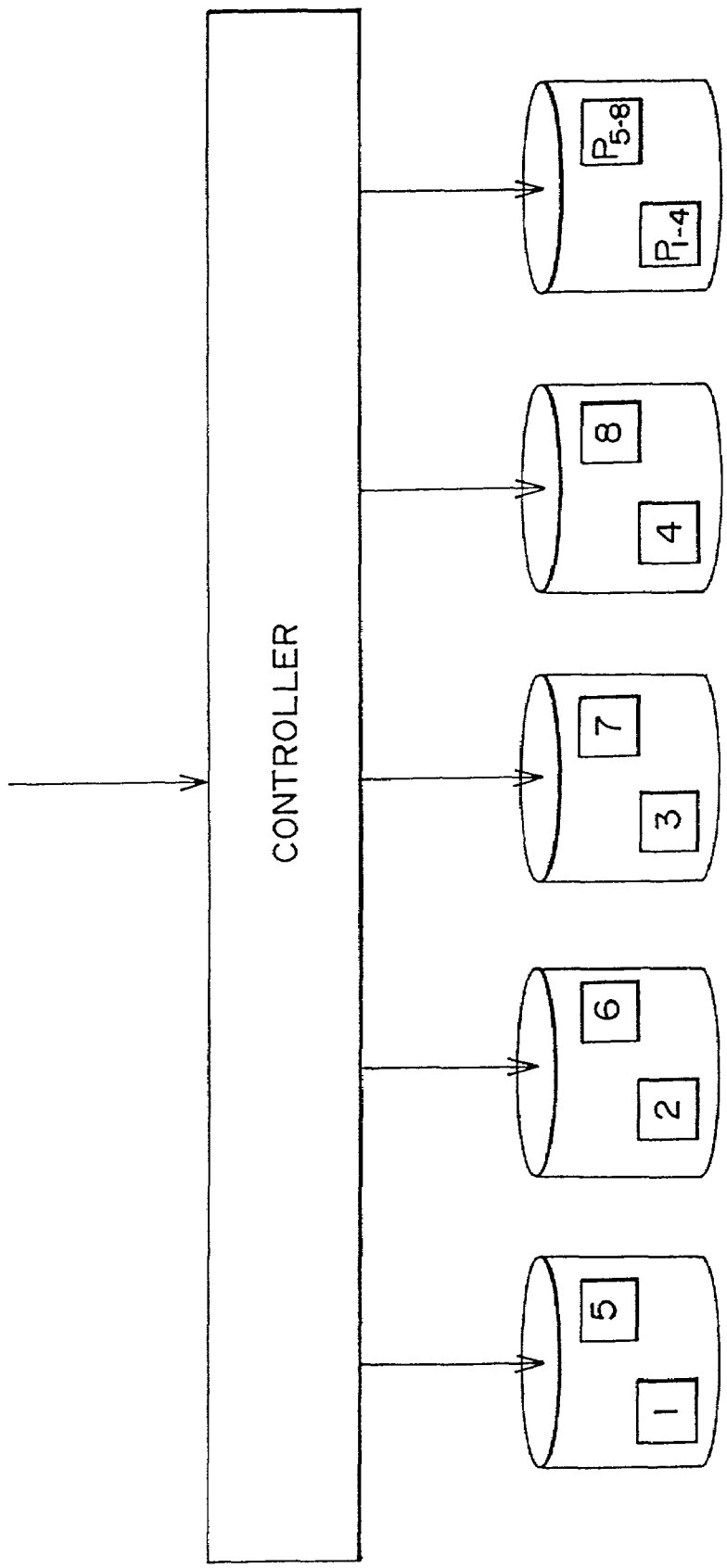
FIG. 82 is a diagram for describing the conventional RAID.

FIG. 77 shows the detailed structure of the pitch extraction section 702 for performing calculation of the equation (18). After all the source sound data sequence X(0) to X(2N) as shown in FIG. 78 is entered in memories 711 and 712, a memory controller 716 controls the memories 711 and 712 to deliver the source sound data sequence X(n) or X(n+m) simultaneously one by one to a multiplier 713. The multiplier 713 multiplies the input source sound data sequence X(n) and X(n+m) and delivers it to an accumulator 714. The accumulator 714 calculates the accumulated sum of X(n)·X(n+m) wherein n is from 0 to N−1 entered sequentially from the multiplier 713. A memory 715 is controlled by the memory controller 716 so as to store φ'(m) namely the calculation result of the accumulator 714. A timing controller 717 controls the operation timing of the multiplier 713, accumulator 714, and memory controller 716.

The value of m that maximizes any one of φ'(m) (m=1, 2, . . . , N−1) stored in the memory 715 is extracted as the basic pitch period P.

Further in this embodiment, the autocorrelation function is calculated after all the source sound data sequence X(0) to X(2N) is entered to the memories 711 and 712, however, because φ'(m) of the equation (18) can be calculated as long as the source sound data sequence X(0) to X(N−1+m) is available, a method in which calculation of φ'(m) starts at the time point when the source sound data sequence X(0) to X(N−1+m) is written in the memories 711 and 712, and after calculation is completed, the source sound data sequence X(N−130 m+1) is written in the memories 711 and 712 and supplied to the subsequent stage for calculation of φ'(m+1).

FIGS. 79A to 79F show the time axis compression reproduction processing performed by the audio concatenation processing 704. This processing is performed by thinning X(0) to X(p) namely source sound data of the basic pitch period from the continuous (adjacent) segment [K] and segment [K−1] containing N source sound data string as shown in FIG. 79A.

In detail, the audio concatenation processor 704 generates a data string as shown in FIG. 79B that the part of the pitch period P of the segment [K] is removed (thinned) from the signal shown in FIG. 79A. The reproduction time of the source sound data string X(P+1) to X(2N−1) is shifted to the left side on the time axis by the basic pitch period P (shifted forward). However, if the data string is reproduced as it is, noise will be generated at the portion where the temporally discontinuous part is reproduced continuously. To prevent generation of the noise, fade processing is performed.

In detail, the data string shown in FIG. 79B is supplied to the cross fade DSP 513 as the fade-in data string Xin (n). The fade-in gain coefficient string Kin (n) is multiplied to the fade-in data string Xin (n). This value increases linearly to 0 to 1. On the other hand, the source sound data string X(0) to X(p) (the data string of the pitch period P shown in FIG. 79A) to be thinned shown in FIG. 79D is the fade-out data string Xout (n). FIG. 79E shows the fade-out gain coefficient string K out (n) to be multiplied to the fade-out data string Xout (n), and the value decreases to 1 to 0.

The built-in circuit in the audio concatenation processor 704 shown in FIG. 80 performs calculation of the following equation (19) using the data string described herein above, and delivers an output data string Yn shown in FIG. 79F.

$$Y(n) = Kin(n) \cdot Xin(n) + Kout(n) \cdot Xout(n) \quad (19)$$

Multiplication of the first term of the right side member in the equation shown above is performed by a multiplier 731, multiplication of the second term is performed by a multiplier 733, and addition of both products is performed by an adder 732.

The above-mentioned processing is performed on a prescribed pair out of the segment [0] to the segment [E], then reproduction time is shortened without change of musical interval and an output data string Ym (n) with suppressed ion generation is obtained.

FIGS. 81A to 81F show the time axis expansion reproduction processing by the audio concatenation processor 704. This processing is performed by adding the source sound data of the basic pitch period to continuous (adjacent) segment [K] and segment [K+1] containing N source sound data strings as shown in FIG. 81A.

In detail, the audio concatenation processor 704 generates a data string (the data string to which the data of the basic pitch period P is interpolated), which data string is formed by shifting the source sound data string X(N−P) to X(2N−1) to the right by the basic pitch period P on the time axis as shown in FIG. 81B, correspondingly to the pitch period P from the pitch extraction section 702. This data string is the fade-in data string Xin (n). FIG. 81C shows the fade-in gain coefficient string Kin (n) to be multiplied to the fade-in data string Xin (n), the value increases linearly to 0 to 1. FIG. 81D shows the source sound data string X(0) to X(2N−1) and this data string is the fade-out data string Xout (n). This data string is the same data string as the data string shown in FIG. 81A. FIG. 81E shows the fade-out gain coefficient string Kout (n) to be multiplied to the fadeout data string Xout (n), and the value decreases to 1 to 0.

The built-in circuit in the audio concatenation processor 704 performs calculation shown by the equation (19) using the data described herein above, and an output data string Y (n) shown in FIG. 81F is delivered.

The above-mentioned processing is performed on a prescribed pair out of the segment [0] to segment [E] shown in FIGS. 75A to 75C, and an output data string Yp (n) with expanded reproduction is thereby obtained without changing of musical interval.

The number of channels of blocks, buses, and SDI in the above-mentioned embodiments are only examples, and can be changed as required. Further the number of subblocks which are formed by dividing 1 frame data and the number of words of a packet transfer block which are formed by dividing further each subblock can be also changed as required. The RAID can be set to an arbitrary number.

Computer programs used for performing the abovementioned processes may be supplied to users in the form of distribution media comprising information recording media such as magnetic disks and CD-ROM, and also through the network distribution media such as the internet and digital satellite.

What is claimed is:

1. An editing system comprising:
storing means for storing audio data to be reproduced;
synthesizing means for synthesizing a plurality of channels of said audio data;
changing means for changing the reproduction speed of said audio data without affecting an interval thereof; and
supplying means for supplying the audio data synthesized by said synthesizing means and the audio data whose reproduction speed is changed by said changing means to arbitrary output channels,
wherein said changing means changes the reproduction speed of said audio data without changing the pitch, and
wherein said changing means interpolates data of a pitch period between adjacent segments of said audio data.

2. An editing method comprising:
a storing step of storing audio data to be reproduced;
a synthesizing step of synthesizing said audio data of a plurality of channels;
a changing step of changing the reproduction speed of said audio data without affecting an interval thereof; and
a supplying step of supplying the audio data synthesized in said synthesizing step and the audio data whose reproduction speed is changed in said changing step to arbitrary output channels,
wherein said changing step changes the reproduction speed of said audio data without changing the pitch, and
wherein said changing step interpolates data of a pitch period between adjacent segments of said audio data.

3. A computer-readable medium storing a computer program which controls an editing system to perform a process comprising:
a storing step of storing audio data to be reproduced;
a synthesizing step of synthesizing said audio data of a plurality of channels;
a changing step of changing the reproduction speed of said audio data without affecting an interval thereof;
wherein said changing step changes the reproduction speed of said audio data without changing the pitch, and
wherein said changing step interpolates data of a pitch period between adjacent segments of said audio data; and
an outputting step of outputting the audio data synthesized in said synthesizing step and the audio data whose reproduction speed is changed in said changing step to arbitrary output channels.

* * * * *